US010362590B2

(12) United States Patent
Hong et al.

(10) Patent No.: US 10,362,590 B2
(45) Date of Patent: Jul. 23, 2019

(54) METHOD FOR TRANSMITTING UPLINK DATA AND APPARATUS FOR SAME

(71) Applicant: KT CORPORATION, Gyeonggi-do (KR)

(72) Inventors: Sung-pyo Hong, Seoul (KR); KyungJun Lee, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 138 days.

(21) Appl. No.: 15/024,484

(22) PCT Filed: Sep. 4, 2014

(86) PCT No.: PCT/KR2014/008311
§ 371 (c)(1),
(2) Date: Mar. 24, 2016

(87) PCT Pub. No.: WO2015/046780
PCT Pub. Date: Apr. 2, 2015

(65) Prior Publication Data
US 2016/0242193 A1     Aug. 18, 2016

(30) Foreign Application Priority Data

Sep. 26, 2013    (KR) ..................... 10-2013-0114769
Nov. 26, 2013    (KR) ..................... 10-2013-0144656
(Continued)

(51) Int. Cl.
*H04W 72/12*        (2009.01)
*H04B 7/26*          (2006.01)
*H04W 76/10*        (2018.01)

(52) U.S. Cl.
CPC .......... *H04W 72/12* (2013.01); *H04B 7/2612* (2013.01); *H04W 76/10* (2018.02)

(58) Field of Classification Search
CPC ..... H04W 72/12; H04W 76/02; H04B 7/2612
See application file for complete search history.

(56) References Cited

U.S. PATENT DOCUMENTS 7,346,363 B2     3/2008   Lee et al.
2009/0104890 A1    4/2009   Wang et al.
(Continued)

OTHER PUBLICATIONS

Anna Larmo et al., "The LTE Link-Layer Design", IEEE Communications Magazine, Apr. 2009, pp. 52-59, vol. 47, No. 4.
(Continued)

*Primary Examiner* — Pao Sinkantarakorn
*Assistant Examiner* — Kabir U Jahangir
(74) *Attorney, Agent, or Firm* — IP Legal Services, LLC

(57) ABSTRACT

Provided are a method and an apparatus for transmitting uplink data from a terminal to base stations. In particular, the terminal establishes dual connectivity with a plurality of base station, and the terminal transmits and receives uplink and downlink traffic through multiple carriers by distinguishing paths. More specifically, the method may include receiving upper layer signaling which includes information for establishing dual connectivity with a first base station and a second base station, establishing dual connectivity between the first base station and the second base station, based on the upper layer signaling, and submitting a PDCP PDU for each of one or more wireless bearers, from a PDCP object to an RLC entity, which is a peer to the second station based on the upper layer signaling.

9 Claims, 36 Drawing Sheets

(30) Foreign Application Priority Data

Mar. 14, 2014 (KR) .................. 10-2014-0030422
Apr. 11, 2014 (KR) .................. 10-2014-0043696

(56) References Cited

U.S. PATENT DOCUMENTS

| | | |
|---|---|---|
| 2010/0118752 A1 | 5/2010 | Suzuki et al. |
| 2012/0281564 A1 | 11/2012 | Zhang et al. |
| 2013/0135987 A1 | 5/2013 | Wang et al. |
| 2013/0242783 A1 | 9/2013 | Horn et al. |
| 2013/0242897 A1 | 9/2013 | Meylan et al. |
| 2013/0242965 A1 | 9/2013 | Horn et al. |
| 2014/0126399 A1* | 5/2014 | Damnjanovic ... H04W 72/1252 370/252 |
| 2015/0043492 A1* | 2/2015 | Baek .................. H04W 76/15 370/329 |
| 2016/0150440 A1* | 5/2016 | Lee .................. H04W 28/0278 455/422.1 |

OTHER PUBLICATIONS

Renesas Mobile Europe, "On protocol stack impacts of dual connectivity", R2-132405, 3GPP TSG-RAN WG2 Meeting #83, Barcelona, Spain, Aug. 19-23, 2013.
3GPP, "3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.3.0 (Jun. 2013).

* cited by examiner

FIG. 8

RadioResourceConfigDedicated information element

```
DRB-ToAddModList ::=          SEQUENCE (SIZE (1..maxDRB)) OF DRB-ToAddMod

DRB-ToAddMod ::=     SEQUENCE {
    uLSCellIndex/uLENBIndex       SCellIndex/ENBIndex,      OPTIONAL
    dLSCellIndex/dLENBIndex       SCellIndex/ENBIndex,      OPTIONAL
    eps-BearerIdentity            INTEGER (0..15)           OPTIONAL,  -- Cond DRB-Setup
    drb-Identity                  DRB-Identity,
    pdcp-Config                   PDCP-Config               OPTIONAL,  -- Cond PDCP
    rlc-Config                    RLC-Config                OPTIONAL,  -- Cond Setup
    logicalChannelIdentity        INTEGER (3..10)           OPTIONAL,  -- Cond DRB-Setup
    logicalChannelConfig          LogicalChannelConfig      OPTIONAL,  -- Cond Setup
    ...
}
```

FIG.9

RadioResourceConfigDedicated information element

```
DRB-ToAddModList ::=      SEQUENCE (SIZE (1..maxDRB)) OF DRB-ToAddMod

DRB-ToAddMod ::=    SEQUENCE {
    uLSCellIndex/uLENBIndex  SCellIndex/ENBIndex,
    eps-BearerIdentity       INTEGER (0..15)          OPTIONAL,    -- Cond DRB-Setup
    drb-Identity             DRB-Identity,
    pdcp-Config              PDCP-Config              OPTIONAL,    -- Cond PDCP
    rlc-Config               RLC-Config               OPTIONAL,    -- Cond Setup
    logicalChannelIdentity   INTEGER (3..10)          OPTIONAL,    -- Cond DRB-Setup
    logicalChannelConfig     LogicalChannelConfig     OPTIONAL,    -- Cond Setup
    ...
}
```

FIG.10

RadioResourceConfigDedicated information element

```
DRB-ToAddModList ::=        SEQUENCE (SIZE (1..maxDRB)) OF DRB-ToAddMod

DRB-ToAddMod ::=   SEQUENCE {
    SCellIndex/ENBIndex         SCellIndex/ENBIndex,        OPTIONAL,
    upDownIndicator             INTEGER(0..3)/              OPTIONAL,
    eps-BearerIdentity          INTEGER (0..15)             OPTIONAL,   -- Cond DRB-Setup
    drb-Identity                DRB-Identity,
    pdcp-Config                 PDCP-Config                 OPTIONAL,   -- Cond PDCP
    rlc-Config                  RLC-Config                  OPTIONAL,   -- Cond Setup
    logicalChannelIdentity      INTEGER (3..10)             OPTIONAL,   -- Cond DRB-Setup
    logicalChannelConfig        LogicalChannelConfig        OPTIONAL,   -- Cond Setup
    ...
}
```

FIG.11

RadioResourceConfigDedicated information element

```
RadioResourceConfigDedicatedSCell-r10 ::= SEQUENCE {
-- UE specific configuration extensions applicable for an SCell
    physicalConfigDedicatedSCell-r10         PhysicalConfigDedicatedSCell-r10    OPTIONAL,    -- Need ON
    ...,
    [[ mac-MainConfigSCell-r11               MAC-MainConfigSCell-r11                                         OPTIONAL    -- Cond SCellAdd
    ]]
    drb-ToAddModList                         DRB-ToAddModList                    OPTIONAL,
}

DRB-ToAddModList ::=                         SEQUENCE (SIZE (1..maxDRB)) OF DRB-ToAddMod DRB-ToAddMod ::=            SEQUENCE {
    uLSCellIndex/uLENBIndex                  SCellIndex/ENBIndex,                OPTIONAL,
    dLSCellIndex/dLENBIndex                  SCellIndex/ENBIndex,                OPTIONAL,
    eps-BearerIdentity                       INTEGER (0..15)                                                 OPTIONAL,    -- Cond DRB-Setup
    drb-Identity                             DRB-Identity,
    pdcp-Config                              PDCP-Config                                                     OPTIONAL,    -- Cond PDCP
    rlc-Config                  RLC-Config                                                     OPTIONAL          -- Cond Setup
    logicalChannelIdentity      INTEGER (3..10)                                                OPTIONAL,         -- Cond DRB-Setup
    logicalChannelConfig                     LogicalChannelConfig                              OPTIONAL,         -- Cond Setup
    ...
}
```

FIG.12

RadioResourceConfigDedicated information element

```
RadioResourceConfigDedicatedSeNB-r12/RadioResourceConfigDedicatedSCell-r12 ::=    SEQUENCE {
-- UE specific configuration extensions applicable for an SCell
physicalConfigDedicatedSCell-r10         PhysicalConfigDedicatedSCell-r10   OPTIONAL,    -- Need ON
...
[[ mac-MainConfigSCell-r11              MAC-MainConfigSCell-r11                         OPTIONAL    -- Cond SCellAdd
]]
drb-ToAddModList                        DRB-ToAddModList                                OPTIONAL
}

DRB-ToAddModList ::=   SEQUENCE (SIZE (1..maxDRB)) OF DRB-ToAddMod

DRB-ToAddMod ::=       SEQUENCE {
  ulSCellIndex/uLENBIndex               SCellIndex/ENBIndex,                OPTIONAL,
  eps-BearerIdentity                    INTEGER (0..15)                                 OPTIONAL,   -- Cond DRB-Setup
  drb-Identity                          DRB-Identity,
  pdcp-Config                           PDCP-Config                                     OPTIONAL,   -- Cond PDCP
  rlc-Config                            RLC-Config                          OPTIONAL,               -- Cond Setup
  logicalChannelIdentity                INTEGER (3..10)                     OPTIONAL,               -- Cond DRB-Setup
  logicalChannelConfig                  LogicalChannelConfig                OPTIONAL,               -- Cond Setup
  ...
}
```

FIG.13

RadioResourceConfigDedicated information element

```
RadioResourceConfigDedicatedSeNB-r12/RadioResourceConfigDedicatedSCell-r12 ::=    SEQUENCE {
-- UE specific configuration extensions applicable for an SCell
    physicalConfigDedicatedSCell-r10          PhysicalConfigDedicatedSCell-r10    OPTIONAL,    -- Need ON
    ...,
    [[ mac-MainConfigSCell-r11               MAC-MainConfigSCell-r11              OPTIONAL    -- Cond SCellAdd
    ]]
    drb-ToAddModList                          DRB-ToAddModList                    OPTIONAL
}

DRB-ToAddModList ::=    SEQUENCE (SIZE (1..maxDRB)) OF DRB-ToAddMod

DRB-ToAddMod ::=    SEQUENCE {
    SCellIndex/SeNBIndex        SCellIndex/ENBIndex,                OPTIONAL,
    upDownIndicator             INTEGER(0..3)/(True/False)          OPTIONAL
    eps-BearerIdentity          INTEGER (0..15)                                   OPTIONAL,    -- Cond DRB-Setup
    drb-Identity                DRB-Identity,
    pdcp-Config                 PDCP-Config                                       OPTIONAL,    -- Cond PDCP
    rlc-Config                  RLC-Config                          OPTIONAL,                  -- Cond Setup
    logicalChannelIdentity      INTEGER (3..10)                     OPTIONAL,                  -- Cond DRB-Setup
    logicalChannelConfig        LogicalChannelConfig                                           -- Cond Setup
    ...
}
```

FIG. 14

SeNBSCellToAddMod information element

```
SeNBSCellToAddModList-r12 ::=      SEQUENCE (SIZE (1..maxSCell-r10)) OF SCellToAddMod-r12
UpDownIndicatorSCell/UpDownIndicatorSeNB      INTEGER(0..3)/(True/False)     OPTIONAL,
SCellToAddMod-r10 ::=     SEQUENCE {
    sCellIndex-r10              SCellIndex-r10,
    cellIdentification-r10      SEQUENCE {
        physCellId-r10              PhysCellId,
        dl-CarrierFreq-r10          ARFCN-ValueEUTRA
    }                                                              OPTIONAL,  -- Cond SCellAdd
    radioResourceConfigCommonSCell-r10      RadioResourceConfigCommonSCell-r10    OPTIONAL,  -- Cond
SCellAdd
    radioResourceConfigDedicatedSCell-r10   RadioResourceConfigDedicatedSCell-r10  OPTIONAL,  -- Cond
SCellAdd2
    ...
}
```

FIG.18

RLC-Config information element

```
RLC-Config ::=          CHOICE {
    am
        ul-AM-RLC-SeNB              SEQUENCE {
        dl-AM-RLC-SeNB                  UL-AM-RLC,
        ul-AM-RLC-MeNB-Feedback         DL-AM-RLC
        dl-AM-RLC-MeNB                  UL-AM-RLC,
                                        DL-AM-RLC
    }, UL-AM-RLC ::=           SEQUENCE {
    t-PollRetransmit        T-PollRetransmit,
    pollPDU                 PollPDU,
    pollByte                PollByte,
    maxRetxThreshold        ENUMERATED {
                                t1, t2, t3, t4, t6, t8, t16, t32}
}

DL-AM-RLC ::=           SEQUENCE {
    t-Reordering            T-Reordering,
    t-StatusProhibit        T-StatusProhibit
}
```

FIG.19

RLC-Config information element

```
RLC-Config ::=         CHOICE {
    am                     SEQUENCE {
        ul-AM-RLC-SeNB         UL-AM-RLC,
        dl-AM-RLC-SeNB         DL-AM-RLC
        up-down-split-indicator INTEGER(0,1)
    }, UL-AM-RLC ::=          SEQUENCE {
    t-PollRetransmit       T-PollRetransmit,
    pollPDU                PollPDU,
    pollByte               PollByte,
    maxRetxThreshold       ENUMERATED {
                               t1, t2, t3, t4, t6, t8, t16, t32}
}

DL-AM-RLC ::=          SEQUENCE {
    t-Reordering           T-Reordering,
    t-StatusProhibit       T-StatusProhibit
}
```

FIG.20
RLC-Config information element

```
RLC-Config ::=     CHOICE {
    am
        ul-AM-RLC-SeNB        SEQUENCE {
        dl-AM-RLC-SeNB            UL-AM-RLC,
                                  DL-AM-RLC
    }, UL-AM-RLC ::=                 SEQUENCE {
    t-PollRetransmit              T-PollRetransmit,
    pollPDU                       PollPDU,
    pollByte                      PollByte,
    maxRetxThreshold              ENUMERATED {
                                      t1, t2, t3, t4, t6, t8, t16, t32}
}

DL-AM-RLC ::=                 SEQUENCE {
    t-Reordering                  T-Reordering,
    t-StatusProhibit              T-StatusProhibit
}
```

FIG.31

| Index | LCID values |
|---|---|
| 00000 | CCCH |
| 00001-01010 | Identity of the logical channel |
| 01011 | PDCP Short BSR |
| 01100 | PDCP Long BSR |
| 01101 | PDCP Truncated BSR |
| 01110-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

FIG.32
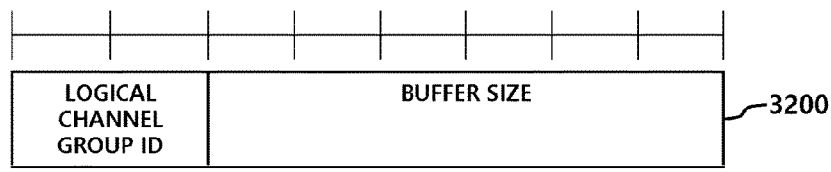
PDCP SHORT/TRUNCATED BSR MAC CONTROL
ELEMENT FORMAT
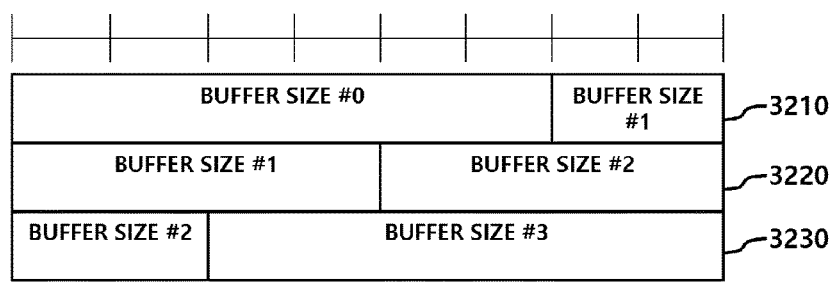
PDCP SHORT/TRUNCATED BSR MAC CONTROL
ELEMENT FORMAT

METHOD FOR TRANSMITTING UPLINK DATA AND APPARATUS FOR SAME

CROSS REFERENCE TO RELATED APPLICATIONS

This application is a National Stage Patent Application of PCT International Patent Application No. PCT/KR2014/008311 (filed on Sep. 4, 2014) under 35 U.S.C. § 371, which claims priority to Korean Patent Application Nos. 10-2013-0114769 (filed on Sep. 26, 2013), 10-2013-0144656 (filed on Nov. 26, 2013), 10-2014-0030422 (filed on Mar. 14, 2014), and 10-2014-0043696 (filed on Apr. 11, 2014), the teachings of which are incorporated herein in their entireties by reference.

TECHNICAL FIELD

The present disclosure relates to a method and an apparatus of a user equipment for transmitting uplink data to a base station. The present disclosure relates to a method and an apparatus of a user equipment configuring dual connectivity to a plurality of base station, for using a uplink path different from a downlink path in transmitting and receiving uplink and downlink user data traffic through multiple carriers.

Also, the present disclosure relates to a method and an apparatus for transmitting a buffer status report used to provide information on an amount of data available for transmission from uplink buffers of a user equipment to a base station when the user equipment configures dual connectivity with one or more base stations and transmits uplink user data in a small cell environment.

BACKGROUND ART

With the progress of communication systems, consumers such as companies and individuals have used a wide variety of wireless terminals.

A current mobile communication system has affiliated with Third Generation Partnership Project (3GPP), for example, Long Term Evolution (LTE), LTE-Advanced (LTE-A), and the like. Such a mobile communication system requires a high-speed and high-capacity communication system capable of transmitting and receiving various types of data, such as image data, wireless data, and the like, beyond providing voice-oriented services.

For such a high-speed and high-capacity communication system, there is a need for developing technology capable of increasing the capacity of a user equipment by utilizing a small cell. Specifically, there is a need for developing technology which allows the user equipment to increase traffic throughput by transmitting/receiving data by using both of a macro cell having wide coverage and a small cell having relatively narrow coverage.

Also, the transmission speed and the consumed power of the user equipment are major factors to be considered when the user equipment transmits data to a base station. Accordingly, for the high-speed and high-capacity communication system, multiple cells are simultaneously used to increase the transmission speed of transmitted uplink data while the user equipment reduces power consumed for transmitting uplink data. To this end, there is a need for a specific procedure related to a method for transmitting/receiving uplink data and downlink data in a small cell environment.

Particularly, when the user equipment transmits a large amount of data at high speed by using multiple base stations, the user equipment needs to transmit, to the base station, the accurate amount of uplink data to be transmitted in uplink. Also, there is a need for a specific method for the user equipment to transmit uplink data to be transmitted.

DETAILED DESCRIPTION OF THE INVENTION

Technical Problem

According to the aforementioned needs, an aspect of the present disclosure is to set an uplink transmission path to be distinguished from a downlink path in order to reduce power consumed for transmitting uplink data, when a user equipment configures dual connectivity by utilizing a small cell.

Also, a user equipment is problematic in configuring the dual connectivity in that the path loss of uplink data transmitted to a macro cell base station relatively increases due to the transmission of uplink data through the macro cell base station and a small cell base station, or the loss of the uplink data transmitted to the small cell base station occurs according to the movement of the user equipment.

Further, another aspect of the present disclosure is that a user equipment needs to transmit, to one or more base stations, buffer status information not to overlap and not to be omitted when the user equipment establishes at least one radio barrier to one or more base stations.

Technical Solution

In accordance with an aspect of the present disclosure devised to solve the aforementioned technical Problems, there is provided a method for transmitting uplink data by a user equipment. The method includes: receiving higher layer signaling including information for configuring dual connectivity with a first base station and a second base station; configuring the dual connectivity with the first base station and the second base station based on the higher layer signaling; and submitting a Packet Data Convergence Protocol (PDCP) Protocol Data Unit (PDU) of each of one or more radio bearers to a Radio Link Control (RLC) entity configured to be a peer to the first base station or the second base station based on the higher layer signaling, by a PDCP entity.

Also, the one or more radio bearers correspond to a radio bearer configured to be split over the first base station and the second base station.

Also, the higher layer signaling further includes one of an index and distinguishing information for identifying an uplink cell or an uplink base station in order to transmit the uplink data to one of the first base station and the second base station.

Also, the index or the distinguishing information includes i) a value for configuration for transmitting the uplink data through the first base station and ii) a value for configuration for transmitting the uplink data through the second base station.

Also, the method further includes, after the submitting of the PDCP PDU of each of the one or more radio bearers to the RLC entity, performing a Logical Channel Prioritization (LCP) procedure by a Media Access Control (MAC) entity configured to be a peer to the first base station or the second base station.

Further, the LCP procedure performs an LCP process on logical channels to deliver uplink data through the first base station or the second base station.

In accordance with another aspect of the present disclosure, there is provided a method of a first base station for controlling uplink data transmission of a user equipment. The method includes: generating higher layer signaling including information for configuring dual connectivity to the user equipment; transmitting the higher layer signaling to the user equipment; and configuring a split radio bearer for the user equipment.

Also, the higher layer signaling further includes an index or distinguishing information for identifying an uplink cell or an uplink base station in order to transmit the uplink data to the first base station or the second base station.

Further, the index or the distinguishing information includes i) a value for configuration for transmitting the uplink data through the first base station and ii) a value for configuration for transmitting the uplink data through the second base station.

In accordance with still another aspect of the present disclosure, there is provided a user equipment apparatus for transmitting uplink data. The user equipment apparatus includes: a reception unit configured to receive higher layer signaling including information for configuring dual connectivity with a first base station and a second base station; and a control unit configured to configure the dual connectivity with the first base station and the second base station based on the higher layer signaling, and control a Packet Data Convergence Protocol (PDCP) entity to submit a PDCP Protocol Data Unit (PDU) of each of one or more radio bearers to a Radio Link Control (RLC) entity configured to be a peer to the first base station or the second base station based on the higher layer signaling.

Also, the one or more radio bearers correspond to a radio bearer configured to be split over the first base station and the second base station.

Also, the higher layer signaling further includes at least one of an index and distinguishing information for identifying an uplink cell or an uplink base station in order to transmit the uplink data to one of the first base station and the second base station.

Also, the index or the distinguishing information includes i) a value for configuration for transmitting the uplink data through the first base station and ii) a value for configuration for transmitting the uplink data through the second base station.

Also, the control unit controls a MAC entity, which is configured to be a peer to the first base station or the second base station, to perform an LCP procedure.

Further, the LCP procedure performs an LCP process on logical channels to deliver uplink data through the first base station or the second base station.

In accordance with yet another aspect of the present disclosure, there is provided a base station apparatus for controlling uplink data transmission of a user equipment. The base station apparatus includes: a control unit configured to generate higher layer signaling including information for configuring dual connectivity to the user equipment; and a transmission unit configured to transmit the higher layer signaling to the user equipment, wherein the control unit performs a control operation for configuring a split radio bearer for the user equipment.

Also, the higher layer signaling further includes at least one of an index and distinguishing information for identifying an uplink cell or an uplink base station in order to transmit the uplink data one of to the first base station and the second base station.

Further, the index or the distinguishing information includes i) a value for configuration for transmitting the uplink data through the first base station and ii) a value for configuration for transmitting the uplink data through the second base station.

In accordance with still yet another aspect of the present disclosure, there is provided a method for transmitting buffer status information by a user equipment. The method includes: configuring one or more logical channels or a Logical Channel Group (LCG), which is mapped to a split radio bearer, so as to have dual connectivity to a first base station and a second base station based on higher layer signaling; and transmitting, to the first base station or the second base station, an amount of data available for transmission in a Packet Data Convergence Protocol (PDCP) layer of the one or more logical channels or the LCG which is mapped to the split radio bearer.

Also, the amount of data available for transmission in the PDCP layer includes information on an amount of data available for transmission in the PDCP layer that the user equipment is to transmit in uplink. The amount of data available for transmission in the PDCP layer is transmitted to one or more of the first base station and the second base station in such a manner as to be distinguished from a Buffer Status Report (BSR).

Also, the PDCP buffer status information is transmitted with being included in a MAC control element.

Also, the amount of data available for transmission in the PDCP layer is distributed and included to a BSR transmitted to the first base station and a BSR transmitted to the second base station.

Also, the amount of data available for transmission in the PDCP layer is distributed based on configuration information received from the first base station or the second base station. Also, in the configuring of the one or more logical channels or the LCG, which is mapped to the split radio bearer, so as to have the dual connectivity to the first base station and the second base station according to the higher layer signaling, a BSR timer for each base station or for each cell group is configured to be included.

Further, the amount of data available for transmission in the PDCP layer is included only in one of a BSR transmitted to the first base station and a BSR transmitted to the second base station, according to the higher layer signaling.

In accordance with further another aspect of the present disclosure, there is provided a method for receiving buffer status information by a first base station. The method includes: configuring, by the first base station and a second base station, dual connectivity to a user equipment with respect to one or more logical channels or a Logical Channel Group (LCG), which is mapped to a split radio bearer, through higher layer signaling; and receiving an amount of data available for transmission in a Packet Data Convergence Protocol (PDCP) layer from the user equipment.

Also, the amount of data available for transmission in the PDCP layer is received to be distinguished from a Buffer Status Report (BSR).

Also, the amount of data available for transmission in the PDCP layer is included in a MAC control element.

Further, the amount of data available for transmission in the PDCP layer corresponds to information distributed by the user equipment, and is received in a state of being included in a BSR. Alternatively, according to the higher layer signaling, the amount of data available for transmission in the PDCP layer is included only in a BSR received by the first base station, or is included only in a BSR received by the second base station and is received without being included in the BSR received by the first base station.

In accordance with still further another aspect of the present disclosure, there is provided a user equipment apparatus for transmitting buffer status information. The user equipment apparatus includes: a control unit configured to configure one or more logical channels or a Logical Channel Group (LCG), which is mapped to a split radio bearer, to have dual connectivity to a first base station and a second base station according to higher layer signaling; and a transmission unit configured to transmit, to the first base station or the second base station, an amount of data available for transmission in a Packet Data Convergence Protocol (PDCP) layer of the one or more logical channels or the LCG which is mapped to the split radio bearer.

Also, the amount of data available for transmission in the PDCP layer includes information on an amount of data available for transmission in the PDCP layer that the user equipment is to transmit in uplink, and is transmitted to one or more of the first base station and the second base station in such a manner as to be distinguished from a Buffer Status Report (BSR).

Also, the amount of data available for transmission in the PDCP layer is transmitted with being included in a MAC control element.

Also, the amount of data available for transmission in the PDCP layer is distributed and included to a BSR transmitted to the first base station and a BSR transmitted to the second base station.

Also, the amount of data available for transmission in the PDCP layer is distributed based on configuration information received from the first base station or the second base station. Also, the control unit configures the logical channel or the LCG so as to include a BSR timer for each base station or for each cell group according to the higher layer signaling.

Further, the amount of data available for transmission in the PDCP layer is transmitted in with being included only in one of a BSR transmitted to the first base station and a BSR transmitted to the second base station according to the higher layer signaling.

In accordance with yet further another aspect of the present disclosure, there is provided a base station apparatus for receiving buffer status information. The base station apparatus includes: a control unit configured to configure dual connectivity with a second base station and a user equipment with respect to one or more logical channels or a Logical Channel Group (LCG), which is mapped to a split radio bearer, through higher layer signaling; and a reception unit configured to receive an amount of data available for transmission in a Packet Data Convergence Protocol (PDCP) layer from the user equipment.

Also, the amount of data available for transmission in the PDCP layer is received in such a manner as to be distinguished from a Buffer Status Report (BSR).

Also, the amount of data available for transmission in the PDCP layer is received with being included in a MAC control element.

Also, the amount of data available for transmission in the PDCP layer corresponds to information distributed by the user equipment, and is included in a BSR. Further, according to the higher layer signaling, the amount of data available for transmission in the PDCP layer is included only in a BSR that the first base station receives from the user equipment, or is included only in a BSR received by the second base station and is received without being included in the BSR received by the first base station.

Advantageous Effects

The above-described present disclosure is advantageous in that uplink data traffic can be transmitted through a user equipment and a particular base station having small path loss in an environment where the user equipment configures dual connectivity with multiple base stations. As a result, the power consumption of the user equipment can be reduced, and the transmission speed of uplink data can also be improved. Alternatively, the above-described present disclosure is advantageous in that uplink data traffic can be transmitted through a particular base station having large coverage in an environment where the user equipment configures dual connectivity with the multiple base stations. As a result, data loss can be reduced according to the movement of the user equipment.

Also, the present disclosure is advantageous in that an uplink buffer status report and a logical channel priority procedure are independently performed for a particular cell or a particular base station even in a dual connectivity structure.

Also, the present disclosure is advantageous in that, when the user equipment transmits buffer status information for uplink transmission, the user equipment transmits the buffer status information to one or more base stations in such a manner that the transmitted buffer status information does not overlap or is not left out.

Further, the present disclosure is advantageous in that, in transmitting buffer status information of a logical channel or a logical channel group mapped to a split radio bearer configured through dual connectivity, information on data available for transmission of a Packet Data Convergence Protocol (PDCP) entity buffer is accurately transmitted to one or more base stations, so as to provide the efficient use of radio resources.

BRIEF DESCRIPTION OF THE DRAWINGS

FIG. 8 is a view illustrating an example of radio resource configuration information according to the present disclosure.

FIG. 9 is a view illustrating another example of radio resource configuration information according to the present disclosure.

FIG. 10 is a view illustrating still another example of radio resource configuration information according to the present disclosure.

FIG. 11 is a view illustrating yet another example of radio resource configuration information according to the present disclosure.

FIG. 12 is a view illustrating still yet another example of radio resource configuration information according to the present disclosure.

FIG. 13 is a view illustrating further another example of radio resource configuration information according to the present disclosure.

FIG. 14 is a view illustrating an example of SeNBSCell-ToAddMod according to the present disclosure.

FIG. 18 is a view illustrating an example of RLC-Config on Acknowledged Mode Radio Link Control (AM RLC) according to the present disclosure.

FIG. 19 is a view illustrating another example of RLC-Config on AM RLC according to the present disclosure.

FIG. 20 is a view illustrating still another example of RLC-Config on AM RLC according to the present disclosure.

FIG. 31 is a view illustrating an example of a Logical Channel IDentifier (LCID) value for an Uplink Shared CHannel (UL-SCH) according to another embodiment of the present disclosure.

FIG. 32 is a view illustrating an example of each PDCP Buffer Status Report (BSR) MAC control element format.

MODE FOR CARRYING OUT THE INVENTION

Figure 1:
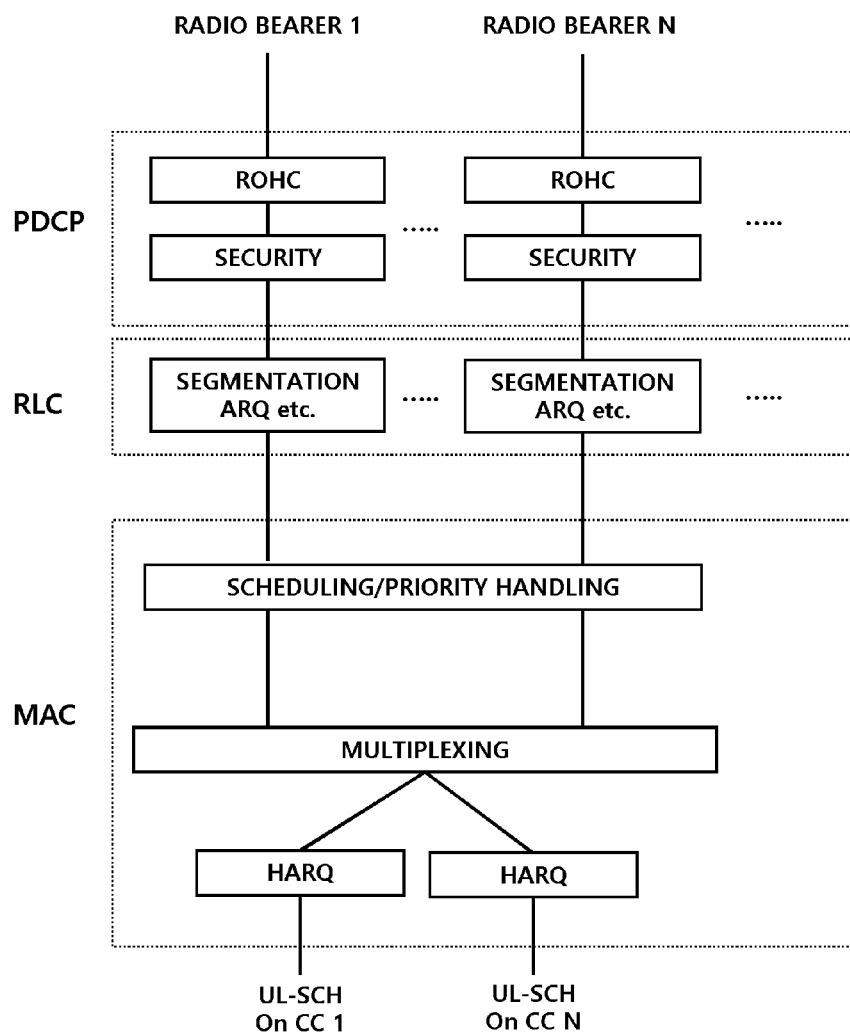
FIG. 1 is a view illustrating an uplink Layer 2 structure when carrier aggregation is configured.

Hereinafter, embodiments of the present disclosure will be described with reference to the exemplary drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

The wireless communication system may be widely installed so as to provide various types of communication services, such as a voice service, packet data, and the like. The wireless communication system may include a User Equipment (UE) and a Base Station (BS or an eNB). Throughout the specifications, the user equipment may be an inclusive concept indicating a terminal utilized in wireless communication, including a UE (User Equipment) in WCDMA, LTE, HSPA, and the like, and an MS (Mobile station), a UT (User Terminal), an SS (Subscriber Station), a wireless device, and the like in GSM.

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, in the specification, the base station or the cell may be construed to be an inclusive concept indicating a portion of an area or function covered by a BSC (Base Station Controller) in CDMA, a NodeB in WCDMA, an eNB or a sector (site) in LTE, and the like, and this concept may include various coverage areas, such as a megacell, a macrocell, a microcell, a picocell, a femtocell, a communication range of a relay node, an RRH, and an RU, and the like.

Each of the above mentioned various cells has a base station that controls a corresponding cell, and thus, the base station may be construed in two ways: i) the base station may be a device itself that provides a megacell, a macrocell, a microcell, a picocell, a femtocell, and a small cell in association with a wireless area, or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. A wireless area itself that receives or transmits a signal from the perspective of a UE or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. The user equipment and the base station are used as two inclusive transceiving subjects (Uplink and Downlink) to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Multiple access schemes may be unrestrictedly applied to the wireless communication system. The wireless communication system may utilize varied multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. An embodiment of the present disclosure may be applicable to resource allocation in an asynchronous wireless communication scheme that is advanced through GSM, WCDMA, and high speed packet access (HSPA), to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields to which the technical idea of the present disclosure is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), PCFICH (Physical Control Format Indicator CHannel), PHICH (Physical Hybrid ARQ Indicator CHannel), PUCCH (Physical Uplink Control CHannel), EDCCH (Enhanced Physical Downlink Control Channel, and the like, and may be configured as a data channel, such as PDSCH (Physical Downlink Shared CHannel), PUSCH (Physical Uplink Shared CHannel), and the like, so as to transmit data.

Meanwhile, Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and UEs.

A multiple transmission/reception points (or a transmission/reception communication system) may be a base station or a macro cell (hereinafter, referred to as an 'eNB') and at least one RRH that is connected to an eNB through an optical cable or an optical fiber and is wiredly controlled, and has a high transmission power or a low transmission power within a macrocell.

Hereinafter, a downlink refers to communication or a communication path from a multiple transmission/reception points to a UE, and an uplink refers to communication or a communication path from a UE to multiple transmission/reception points. In a downlink, a transmitter may be a part of multiple transmission/reception points and a receiver may be a part of a UE. In an uplink, a transmitter may be a part of a UE and a receiver may be a part of multiple transmission/reception points.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received or a signal is transmitted or received through a PDCCH" includes "an EPDCCH is transmitted or received or a signal is transmitted or received through an EPDCCH".

That is, a downlink control channel used herein may indicate a PDCCH or an EPDCCH, and may indicate a meaning including both a PDCCH and an EPDCCH.

In addition, for ease of description, a PDCCH, which corresponds to an embodiment of the present disclosure, may be applied to the part described using a PDCCH.

Further, high layer signaling as used herein includes RRC signaling for transmitting RRC information including RRC parameters.

An eNB executes downlink transmission to UEs. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

A small cell using a low-power node is considered as a means for coping with mobile traffic explosion. A low-power node refers to a node using lower transmission (Tx) power than that of a typical macro node.

Through Carrier Aggregation (hereinafter referred to as "CA") technology before 3rd Generation Partnership Project (3GPP) Release 11, a small cell may be built by using low-power Remote Radio Head (RRH) which is geographically-distributed antennas within macro cell coverage.

However, in order to apply the CA technology, the macro cell and the RRH cell are built to be scheduled under the control of one BS. To this end, it is required to build an ideal backhaul between the macro cell node and the RRH.

The ideal backhaul refers to a backhaul showing very high throughput and a very short delay, such as a dedicated point-to-point connection using an optical line (optical fiber) and a Line-Of-Sight (LOS) microwave.

In contrast, a non-ideal backhaul refers to a backhaul showing relatively low throughput and a relatively long delay, such as a Digital Subscriber Line (xDSL) and a non-LOS microwave.

Through the above-described single BS-based CA technology, multiple serving cells may be aggregated and may provide a service to the UE. Specifically, the multiple serving cells may be configured for the UE in a Radio Resource Control (hereinafter referred to as "RRC")-connected state, and the macro cell and the RRH cell may be configured together as a serving cell and may provide a service to the UE, when the ideal backhaul is built between the macro cell node and the RRH.

When the single BS-based CA technology is configured, the UE may have only one RRC connection with a network.

At RRC connection establishment/re-establishment/handover, one serving cell provides Non-Access Stratum (hereinafter referred to as "NAS") mobility information (e.g., a Tracking Area Identity (TAI)), and at RRC connection re-establishment/handover, one serving cell provides a security input. Such a cell is referred to as a "Primary Cell (PCell)." The PCell may be changed according to only a handover procedure. According to UE capabilities, Secondary Cells (SCells) and a PCell may be configured together as a serving cell.

A configuration of the above-described SCell may be changed according to the amount of traffic, and thus the SCell may be configured even with only a DL Component Carrier (CC). For each SCell, the use of UL resources may be configured in such a manner as to add the UL resources to DL resources. Specifically, the SCell may not be configured to use only UL resources. On the other hand, a PCell needs to always be configured with a DL CC and a UL CC together.

Also, one BS, which processes a PCell and an SCell, has different carriers (Downlink/Uplink Primary Component Carrier (DL/UL PCC) and Downlink/Uplink Secondary Component Carrier (DL/UL SCC)) in a physical layer, but may affect only a MAC layer. With respect to a higher layer (RLC/PDCP), the one BS does not affect an RLC/PDCP layer before the CA technology is introduced. Specifically, a CA operation may not be distinguished in the RLC/PDCP layer.

FIG. 1 is a view illustrating an uplink Layer 2 structure when CA is configured.

Figure 2:
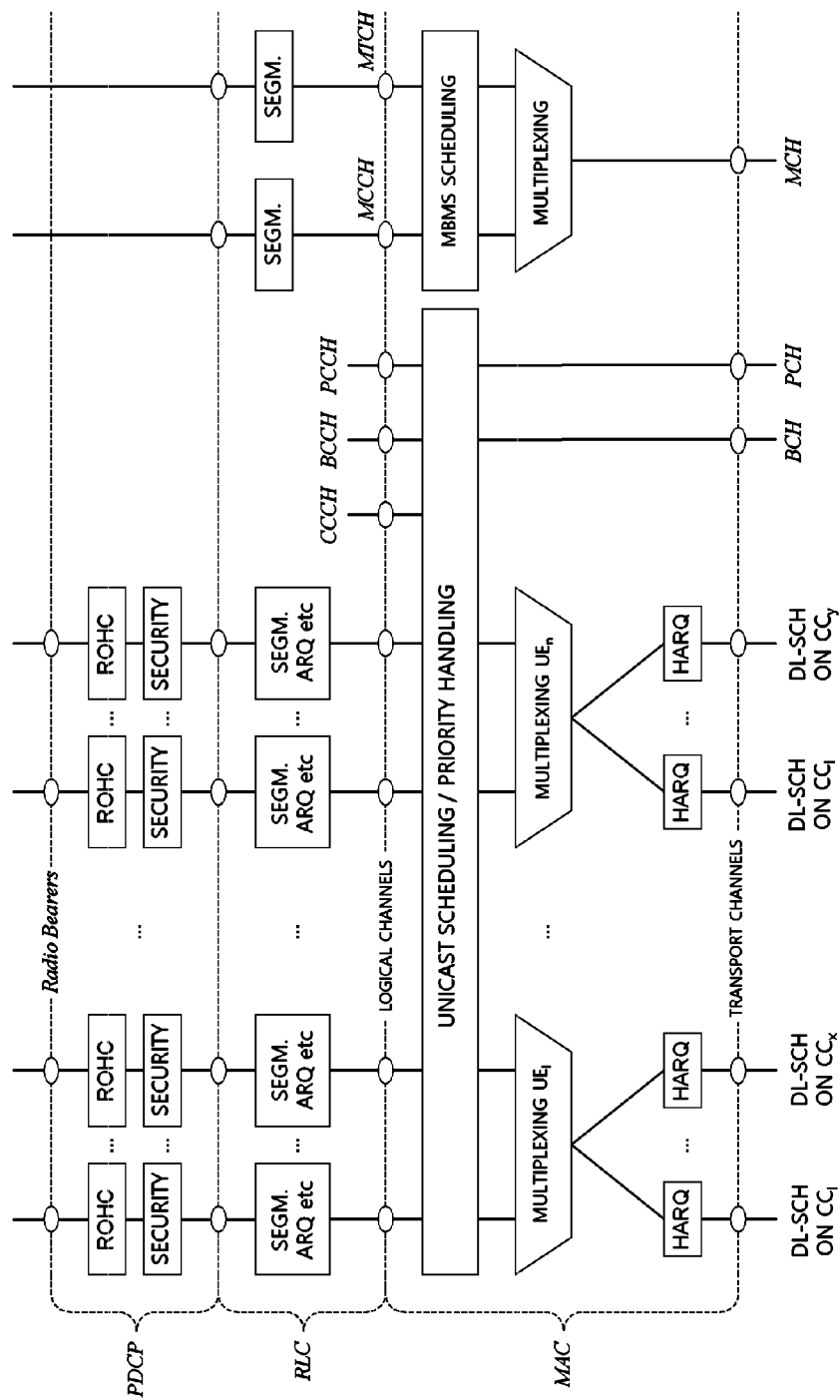
FIG. 2 is a view illustrating a downlink Layer 2 structure when carrier aggregation is configured.

FIG. 2 is a view illustrating a downlink Layer 2 structure when CA is configured.

Referring to FIG. 1 and FIG. 2, the multiple-carrier attribute of the physical layer according to the above-described single eNB-based CA affects only a MAC layer. The MAC layer has one independent Hybrid Automatic Retransmit reQuest (HARQ) entity for each serving cell in UL and in DL. Each HARQ entity processes a data stream of a CC.

Specifically, as illustrated in FIG. 1 and FIG. 2, in the single eNB-based CA, the MAC layer according to the addition and removal of an SCell configures an independent HARQ entity in each serving cell in UL and in DL, and processes a data stream of a CC.

As described above, in the typical mobile communication network, a macro cell and a small cell need to be scheduled under the control of one eNB in order to use the small cell by using the CA technology. The typical mobile communication network is problematic in that, to this end, it is necessary to build an ideal backhaul between a macro cell node and a small cell node. Accordingly, when the macro cell and the small cell are constructed by an individual eNB through a non-ideal backhaul, it is problematic that the CA technology cannot be used. Also, due to the problem of power imbalance between the macro cell having high output power and the small cell having low output power, a problem arises in that UL/DL cell borders, which can provide optimal performance in DL and in UL, are different. Thus the performance at the UL/DL cell border may be degraded. Also, a PCell is configured to always process UL traffic and DL traffic, and a SCell for only the UL traffic cannot be configured. Specifically, when the CA technology is used, although a small cell is configured as a SCell, wherein path loss between a UE and the small cell is small, the UL traffic may be delivered through the macro cell configured as a PCell. Due to the above-mentioned problems, a problem arises in that the UE uses the macro cell having large path loss in order to transmit UL traffic and thereby is forced to consume more power.

An objective of the present disclosure devised to solve the above-mentioned problems is to provide a method for delivering user plane data traffic in such a manner as to separate a UL traffic path from a DL traffic path in transmitting the user plane data traffic through a small cell under the control of a macro cell or through cooperation between the macro cell and the small cell in an environment where the macro cell and the small cell are constructed by an individual eNB through a non-ideal backhaul in a mobile communication network. Specifically, there is provided a method for providing a UL traffic path and a DL traffic path of a particular data radio bearer in such a manner that the UL traffic path is different from the DL traffic path.

Figure 3:
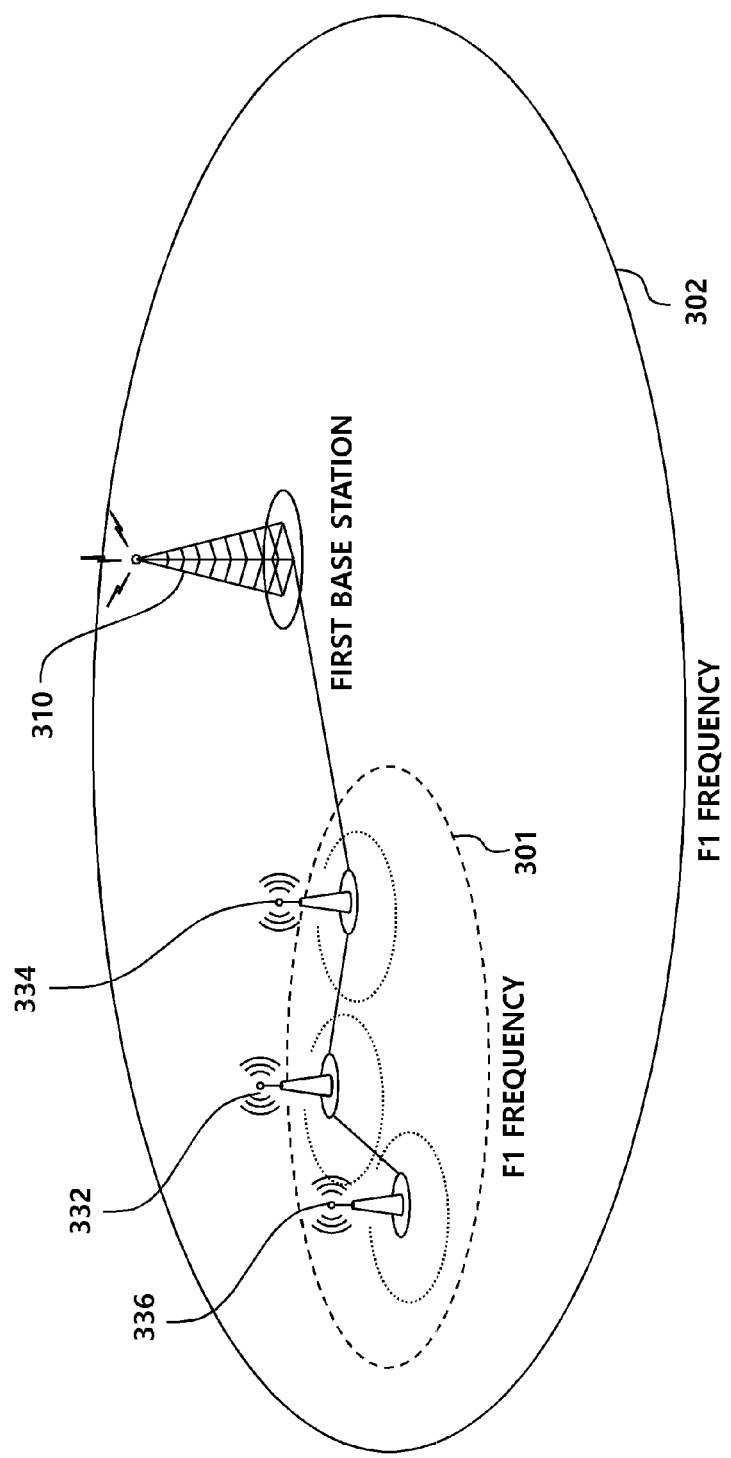
FIG. 3 is a view illustrating an example of a network configuration scenario to which embodiments of the present disclosure may be applied.

FIG. 3 is a view illustrating an example of a network configuration scenario to which the present disclosure may be applied.

Referring to FIG. 3, a macro cell 302 and small cells 301 may all have an identical carrier frequency F1. A first BS 310, which provides the macro cell, and second BSs 332, 334 and 336, which provide the respective small cells, are connected through a non-ideal backhaul. The small cells are constructed within a macro cell 302 network which is overlaid. An outdoor small cell environment and the small cell cluster 301 may be considered. A UE may receive multiple serving cells through dual connectivity with the macro cell and the small cell within the small cell cluster 301.

Figure 4:
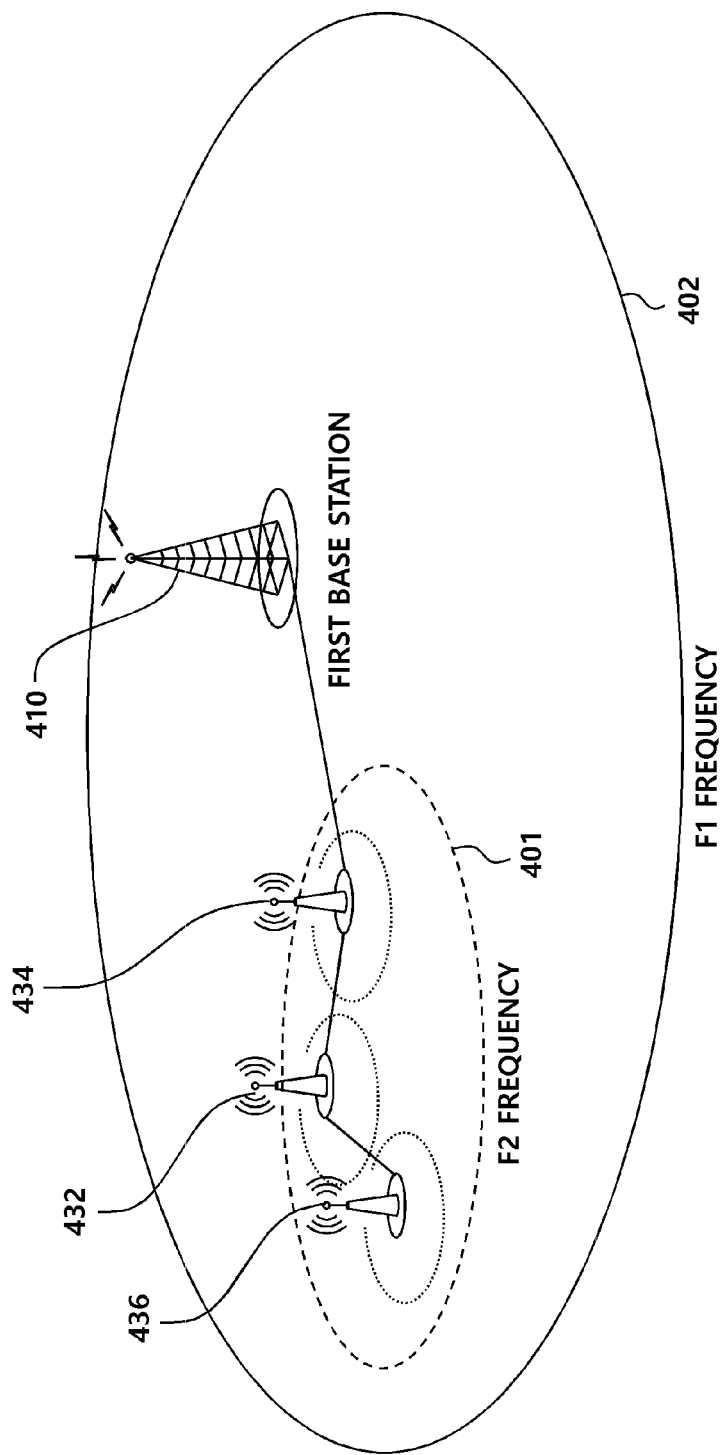
FIG. 4 is a view illustrating another example of a network configuration scenario to which embodiments of the present disclosure may be applied.

FIG. 4 is a view illustrating another example of a network configuration scenario to which the present disclosure may be applied.

Referring to FIG. 4, a macro cell 402 and small cells 401 may have different carrier frequencies F1 and F2. A first BS 410 provides the macro cell, and second BSs 432, 434 and 436 provide the respective small cells. The first BS 410 and the second BSs 432, 434, and 436 are connected through a non-ideal backhaul. The small cells are constructed within a macro cell 402 network which is overlaid. An outdoor small cell environment and the small cell cluster 401 may be considered. A UE may receive multiple serving cells through dual connectivity with the macro cell and the small cell within the small cell cluster 401. In this case, frequencies of the respective serving cell may be F1 and F2 and may be different, as illustrated in FIG. 4.

Figure 5:
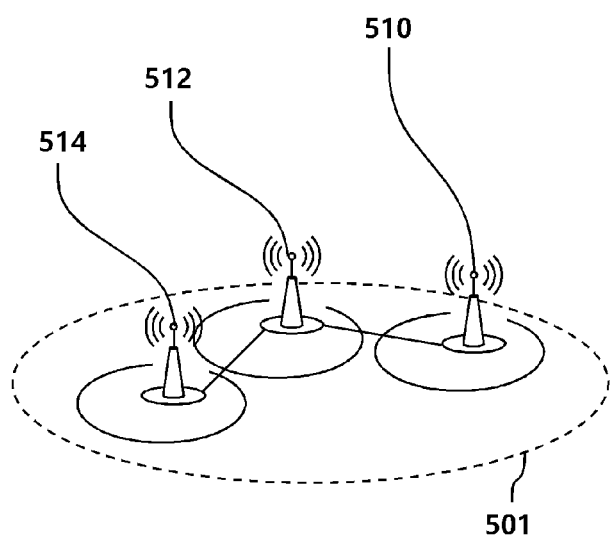
FIG. 5 is a view illustrating still another example of a network configuration scenario to which embodiments of the present disclosure may be applied.

FIG. 5 is a view illustrating still another example of a network configuration scenario to which the present disclosure may be applied.

Referring to FIG. 5, multiple small cells form a small cell cluster 501. In this case, small cell BSs 510, 512 and 514, which provide the small cells, are connected through a non-ideal backhaul. An indoor small cell environment and the small cell cluster 501 are considered. Also, an identical carrier frequency may be used between the small cells, or different carrier frequencies may be used therebetween. Coverages may overlap between the small cells.

A small cell eNB in the scenarios illustrated in FIG. 3 and FIG. 4, or a particular small eNB in the scenario illustrated in FIG. 5 may operate as a stand-alone eNB. Specifically, in order to transmit control plane data, the UE may establish one RRC connection with a small cell eNB and may establish one or more Signaling Radio Bearers (SRBs). In order to transmit user plane data, the UE may have a small cell eNB and one or more Data Radio Bearers (DRBs).

In the scenarios illustrated in FIG. 3 and FIG. 4, the UE may transmit user plane data through one or more small cell eNBs under the control of the macro cell eNB, or through cooperation between the macro cell eNB and the one or more small cell eNBs. Specifically, in order to transmit control plane data, the UE establishes the macro cell eNB and one RRC connection and establishes one or more SRBs. In order to transmit user plane data, the UE may establish the macro cell eNB and/or a small cell eNB and one or more DRBs. Similarly, in the scenario illustrated in FIG. 5, the UE may transmit user plane data through one or more other small cell eNBs under the control of any one small cell eNB, or through cooperation between any one small cell eNB and the one or more other small cell eNBs. Specifically, in order to transmit control plane data, the UE establishes any one small cell eNB and one RRC connection, and the UE establishes one or more SRBs. In order to transmit user plane data, the UE may establish any one small cell eNB and/or another small cell eNB and one or more DRBs.

The present disclosure may be performed in all of the above-described scenarios illustrated in FIG. 3 to FIG. 5. In this regard, hereinafter, the cases illustrated in FIG. 3 and FIG. 4 will be described as only examples for convenience of description and understanding. However, the present disclosure may be applied even to the case illustrated in FIG. 5.

Meanwhile, in this specification, when a UE configures dual connectivity, a BS will be described as a master BS or a first BS, which forms an RRC connection with the UE and provides a PCell that becomes a reference of a handover, or which terminates an S1-Mobility Management Entity (MME) and serves as a mobility anchor in a core network. The master BS or the first BS may be a BS which provides the above-described macro cell, or a BS which provides any one small cell in a situation of dual connectivity between small cells. Also, in a dual connectivity environment, a BS, which is distinguished from the master BS and provides additional radio resources to the UE, will be described as a secondary BS or a second BS. The first BS (or the master BS) and the second BS (or the secondary BS) may each provide at least one cell to the UE, and may be connected to each other through an interface therebetween. In order to help understanding, a cell associated with the first BS may be described as a macro cell, and a cell associated with the second BS may be described as a small cell. However, in a small cell cluster scenario, even a cell associated with the first BS may be described as a small cell.

In the present disclosure, a macro cell may signify each of one or more cells, or the macro cell may be described in the sense of collectively calling all cells associated with the first BS. Also, a small cell may signify each of one or more cells, or the small cell may be described in the sense of collectively calling all cells associated with the second BS. However, as described above, in a particular scenario such as a small cell cluster, a small cell may be a cell associated with the first BS. In this case, a cell of the second BS may be described as another small cell or still another small cell. Also, the UE may perform communication through the above-described multiple cells associated with the first BS and the above-described multiple cells associated with the second BS. In this case, a particular cell, which serves as the above-described PCell among the multiple cells associated with the first BS, may be described as a first BS PCell.

Further, a particular cell from among the multiple cells associated with the second BS may be described as a second BS PCell. The second BS PCell signifies a cell which performs all or some of functions of the above-described PCell among the cells associated with the second BS. For example, the second BS PCell may perform a function of transmitting/receiving a PUCCH. When dual connectivity is configured to the UE, the above-described cells associated with the first BS or serving cells associated with the first BS may be referred to as a "master cell group," and the above-described cells associated with the second BS or serving cells associated with the second BS may be referred to as a "secondary cell group." A cell group is used as a concept for discriminating between BSs, from the viewpoint of the UE.

Figure 6:
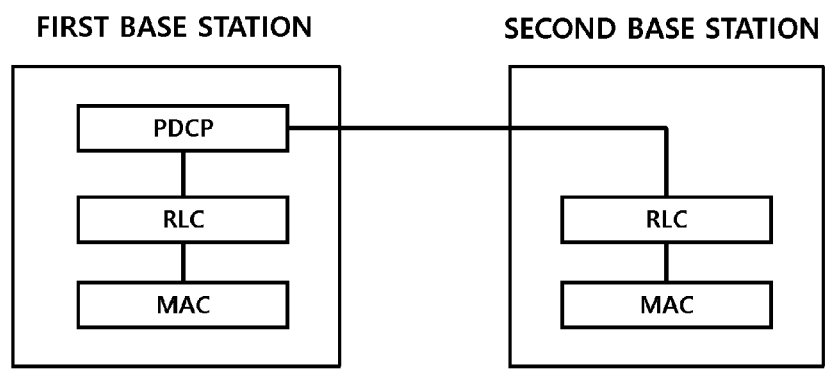
FIG. 6 is a view illustrating an example of a Layer 2 protocol structure for transmitting user plane data.

FIG. 6 is a view illustrating an example of a Layer 2 protocol structure for transmitting user plane data.

Referring to FIG. 6, user plane data may be transmitted by using radio resources, which are provided by the first BS and the second BS, for each DRB by using the protocol structure illustrated in FIG. 6. For example, a PDCP entity of the first BS may submit a PDCP PDU to an RLC entity of the first BS and an RLC entity of the second BS. Specifically, a particular radio bearer may be configured to be split at the first BS and the second BS.

Figure 7:
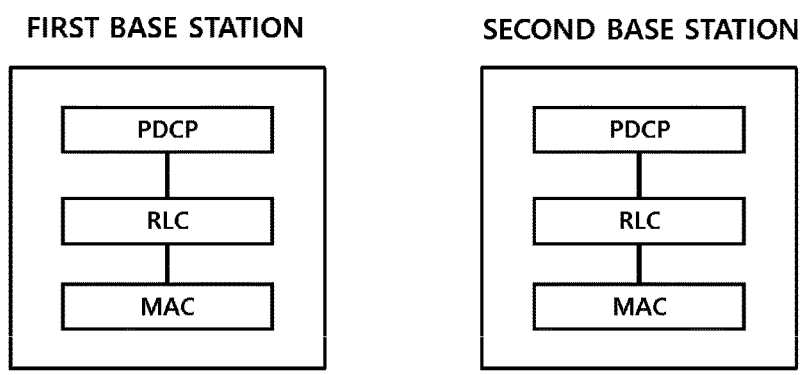
FIG. 7 is a view illustrating another example of a Layer 2 protocol structure for transmitting user plane data.

FIG. 7 is a view illustrating another example of a Layer 2 protocol structure for transmitting user plane data.

By using the protocol structure illustrated in FIG. 7 as another example of the Layer 2 protocol structure, user plane data may be transmitted only through the first BS with respect to each DRB, or the user plane data may be transmitted only through the second BS with respect to each DRB.

The scenarios or the protocol structures, which are illustrated in FIG. 3 to FIG. 7, enable the UE of the present disclosure to transmit user plane data in such a manner as to separate UL traffic from DL traffic, through one or more secondary BSs under the control of the master BS, or through cooperation between the master BS and the one or more secondary BSs. Specifically, the scenarios or the protocol structures enable the UE to select an eNB capable of providing an optimized transmission rate by considering load, path loss, coverage, and the like with respect to the given UL data traffic and the given DL data traffic. As an example of delivering UL traffic and DL traffic in such a manner as to separate the UL traffic from the DL traffic, UL traffic of all DRBs may be delivered through the UE and a secondary BS having small path loss, and DL traffic of all DRBs (or Radio Bearers (RBs)) may be delivered through the master BS.

As another example, UL traffic of particular DRB(s) may be delivered through a secondary BS, DL traffic of different particular DRB(s) may be delivered through the master BS, and both UL traffic and DL traffic of still different particular DRB(s) may be delivered through the master BS and the secondary BS. Specifically, with respect to a particular DRB which transmits user plane data by using radio resources provided by the first BS and the second BS as illustrated in FIG. 6, UL traffic may be delivered only through the second BS, and DL traffic may be delivered through the first BS and the second BS. Alternatively, with respect to another particular DRB which transmits user plane data by using radio resources provided by the first BS and the second BS as illustrated in FIG. 6, UL traffic may be delivered through the first BS and the second BS, and DL traffic may be delivered only through the first BS. Alternatively, with respect to still another particular DRB which transmits user plane data by using radio resources provided by the first BS and the second BS as illustrated in FIG. 6, both UL traffic and DL traffic may be delivered through the first BS and the second BS.

As still another example, as illustrated in FIG. 7, with respect to a particular DRB, UL/DL user plane data traffic may be transmitted only through the first BS. Alternatively, with respect to another particular DRB, UL/DL user plane data traffic may be transmitted only through the second BS. In the method in which the UE transmitting/receiving UL traffic and DL traffic in such a manner as to separate a transmission path of the UL traffic from that of the DL traffic, the UE may transmit/receive the UL traffic and the DL traffic in such a manner as to separate a transmission path of the UL traffic from that of the DL traffic, in various implementation schemes as well as the above-described examples.

Hereinafter, examples of the method for transmitting/receiving UL traffic and DL traffic by separating the UL traffic from the DL traffic will be described according respective embodiments of the present disclosure.

First Embodiment: a Method for Separating a Transmission Path of UL Traffic from that of DL Traffic in a Unit of RB When a UE establishes an RRC connection with a first BS providing a cell operating as a PCell and is in an RRC connected state, the UE may add a cell, which is associated with a second BS connected through a non-ideal backhaul, as a second BS SCell (or a serving cell).

When the first BS providing the cell operating as the PCell detects a new second BS SCell candidate and then determines the addition/modification of a second BS SCell in order to add cells associated with the second BS as a second BS SCell or in order to modify a configured second BS SCell, the first BS providing the cell operating as the PCell adds/modifies the second BS SCell through an RRC connection reconfiguration procedure.

When an RRC connection reconfiguration message, that the UE has received, includes SeNBSCellToAddModList representing a list of second BS SCells to be added/modified, the UE adds or modifies the second BS SCell. SeNB-SCellToAddMod representing second BS SCell information to be added/modified of SeNBSCellToAddModList may include the following pieces of information.

A (second BS) SCell index ((SeNB)SCellIndex): includes index information used to identify one second BS SCell within second BS SCells configured for the UE.
  A cell identifier (CellIdentification): includes Physical Cell Id (PCI) information of a second BS SCell and Absolute Radio Frequency Channel Number (ARFCN) information thereof
  Radio resource configuration common SCell information (radioResourceConfigCommonSCell): is information essential for the UE to operate in an SCell, and common radio resource configuration information is included in system information. As an example of the common radio resource configuration information, a physical layer parameter, a random access parameter, and the like may be included.
  Radio resource configuration dedicated SCell information (radioResourceConfigDedicatedSCell): includes UE-specific configuration information (e.g., physical-ConfigDedicatedSCell and mac-MainConfigSCell) applicable to an SCell.

Cell information to be added (cell addition modification information) may include second BS distinguishing information so that the UE may distinguish a second BS SCell from an SCell of a BS associated with the existing PCell. Alternatively, a second BS SCell index value may be set differently from an SCell index value of the BS associated with the existing PCell, so as to be distinguished to be a cell associated with the second BS. For example, in order to cause an SCell index to use a value other than a value used as an SCell index of the BS associated with the existing PCell, it is possible to cause the SCell index, which may currently have an integer value from 1 to 7, to have an integer value from 1 to 14. Specifically, the integer values from 1 to 7 may be used for indices of the SCells of the BS associated with the PCell, and the integer values from 8 to 14 may be used for indices of the second BS. As another example, so that an SCell index of the BS associated with the PCell may be distinguish from an SCell index of the second BS, it is possible to cause an SCell index and a representation information field, which represents being an SCell through the second BS, to be configured together, so as to be transmitted.

When a second BS SCell index included in the above-described SeNBSCellToAddMod is not a current UE configuration part, the UE adds a second BS SCell corresponding to a CellIdentification according to the received radioResourceConfigCommonSCell and the received radioResourceConfigDedicatedSCell. Specifically, when the second BS SCell index does not correspond to a second BS SCell configured for the UE, the UE adds the second BS SCell corresponding to the CellIdentification according to the received radioResourceConfigCommonSCell and the received radioResourceConfigDedicatedSCell.

When the second BS SCell index included in the SeNB-SCellToAddMod is the current UE configuration part, the UE modifies a second BS SCell according to the received radioResourceConfigDedicatedSCell. Specifically, when the second BS SCell index corresponds to a second BS SCell configured for the UE, the UE modifies the second BS SCell according to the received radioResourceConfigDedicatedS-Cell.

Before the first BS providing the cell operating as the PCell adds/modifies a second BS SCell through an RRC connection reconfiguration procedure, the pieces of information included in the above-described SeNBSCellToAdd-Mod may be interrogated through an X2 interface between the first BS and the second BS. AS another example, the pieces of information included in the SeNBSCellToAddMod may be previously configured in the first BS providing the cell operating as the PCell, may be previously stored through Operations, Administration, and Maintenance (OAM), or may be stored in the previous procedure for adding/modifying a second BS SCell, so as to be able to be used.

As described above, in adding/modifying the second BS, the UE may distinguish between the second BSs or second BS-related CCs. Accordingly, the UE of the present disclosure may distinguish a transmission/reception path of DL data (traffic) from a transmission/reception path of UL data (traffic). Specifically, for the first BS providing the cell operating as the PCell and/or a second BS providing a cell operating as an SCell, the first BS providing the cell operating as the PCell may configure radio resources by using the following method through an RRC connection reconfiguration procedure. Hereinafter, a specific embodiment of configuring radio resources will be described with reference to the accompanying drawings.

A Method for Including Cell/BS Index/Distinguishing Information for Setting a Data Transmission Path in Radio Resource Configuration Information (RadioResourceConfigDedicated)

The first BS providing the cell operating as the PCell may configure radio resources for the first BS providing the cell operating as the PCell and/or a second BS providing a cell operating as a second BS SCell (or serving cell) by using RB addition modification list (DRB-ToAddModList) information or RB release list (DRB-ToReleaseList) information of RadioResourceConfigDedicated. For example, a particular RB of the first BS providing the cell operating as the PCell may be configured to be added/modified to/in the first BS and/or the second BS providing the cell operating as the second BS SCell (or serving cell).

As an example, in the above-described connection structure illustrated in FIG. 6, RB addition modification information (DRB-ToAddMod) of an RB addition modification list (drb-ToAddModList) may include one or more pieces of information among eps-BearerIdentity (EPS bearer identifier), drb-Identity, PDCP configuration information (pdcp-Config), RLC configuration information (rlc-Config) for an RLC entity which is a peer to a first BS RLC entity and an RLC entity which is a peer to a second BS RLC entity, logicalChannelIdentity, and logicalChannelConfig.

As another example, in the above-described connection structure illustrated in FIG. 7, RB addition modification information (DRB-ToAddMod) of an RB addition modification list (drb-ToAddModList) may include one or more pieces of information among eps-BearerIdentity (EPS bearer identifier), drb-Identity, PDCP entity configuration information (pdcp-Config) which is a peer to a second BS PDCP entity, RLC entity configuration information (rlc-Config) which is a peer to a second BS RLC entity, logicalChannelIdentity, and logicalChannelConfig.

In order to deliver UL traffic and DL traffic of a particular RB in such a manner as to separate the UL traffic from the DL traffic, the first BS providing the cell operating as the PCell may include, in DRB-ToAddMod, UL cell identifier (e.g., PCI)/DL cell identifier (e.g., PCI), UL SCell index/DL SCell (or PCell) index, UL eNB identifier/DL eNB identifier, or index/distinguishing information for distinguishing between UL/DL cells/BSs by the UE. Alternatively, in order to deliver UL traffic and DL traffic of a particular RB through a particular cell, a particular second BS SCell, a particular CC, or a particular eNB in such a manner as to separate the UL traffic from the DL traffic, the first BS operating as the PCell may include, in the above-described DRB-ToAddMod, the UL cell identifier (e.g., PCI)/DL cell identifier (e.g., PCI), the UL SCell index/DL SCell (or PCell) index, the UL eNB identifier/DL eNB identifier, or the index/distinguishing information for distinguishing between UL/DL cells/BSs by the UE.

When, in adding/modifying the above-described RB, the UE receives the UL cell identifier (e.g., PCI)/DL cell identifier (e.g., PCI), the UL SCell index/DL SCell index, the UL eNB identifier/DL eNB identifier, or the index/distinguishing information for distinguishing between UL/DL cells/BSs by the UE, the UE may respectively deliver UL traffic/DL traffic of the RB through UL cell/DL cell, UL SCell/DL SCell, UL CC/DL CC, UL eNB/DL eNB, or cell group associated with the UL eNB/cell group associated with the DL eNB in such a manner as to distinguish the UL traffic from the DL traffic.

When, in adding/modifying an RB, the UE receives RadioResourceConfigDedicated which does not include the UL cell identifier (e.g., PCI)/DL cell identifier (e.g., PCI), the UL SCell index/DL SCell index, the UL eNB identifier/DL eNB identifier, or the index/distinguishing information for distinguishing between UL/DL cells/BSs by the UE, the RB may be delivered without distinguishing the UL from the DL. Specifically, the RB may be delivered through a macro cell, a Primary Component Carrier (PCC), or the first BS. As another example, the RB may be delivered through a serving cell or a serving cell eNB. For example, the RB may be delivered through the first BS and the second BS, or through a cell group associated with the first BS and a cell group associated with the second BS.

When, in adding/modifying an RB, the UE receives RadioResourceConfigDedicated which includes only a UL cell identifier (e.g., PCI), a UL SCell index, or a UL eNB identifier, with respect to the relevant RB, the UE may deliver UL traffic through a relevant cell, a relevant BS, or a cell group associated with the relevant BS. Also, with respect to the relevant RB, the UE may deliver DL traffic through a macro cell, the first BS, or a cell associated with the first BS. As another example, with respect to the relevant RB, the UE may deliver the UL traffic through a relevant cell, a relevant BS, or a cell group associated with the relevant BS. Also, with respect to the relevant RB, the UE may deliver the DL traffic through a serving cell or a serving cell eNB. Specifically, with respect to the relevant RB, the UE may deliver the DL traffic through a macro cell and a small cell, the first BS and the second BS, or a cell group associated with the first BS and a cell group associated with the second BS.

Before the first BS operating as the PCell adds/modifies and/or releases an RB through the RRC connection reconfiguration procedure, the pieces of information included in the drb-ToAddModList described above as an example may be generated according to a procedure through an X2 interface between the first BS and the second BS.

FIG. 8 is a view illustrating an example of radio resource configuration information according to the present disclosure.

Referring to FIG. 8, the above-described RadioResourceConfigDedicated may include, in DRB-ToAddMod, the UL cell identifier (e.g., PCI)/DL cell identifier (e.g., PCI), the UL SCell index/DL SCell index, the UL eNB identifier/DL eNB identifier, or the index/distinguishing information for distinguishing between UL/DL cells/BSs by the UE. Specifically, an example of the RadioResourceConfigDedicated may be configured as illustrated in FIG. 8, wherein the RadioResourceConfigDedicated includes the DRB-ToAddMod including the UL cell identifier (e.g., PCI)/DL cell identifier (e.g., PCI), the UL SCell index/DL SCell index, the UL eNB identifier/DL eNB identifier, or the index/distinguishing information for distinguishing, by the UE, between cells/BSs to deliver UL traffic and/or cells/BSs to deliver DL traffic. Specifically, for example, ENBIndex may be configured to have an integer value between 1 and 5 as an index value of a particular BS to transmit UL traffic. As another example, when it is configured that UL traffic is transmitted only through the second BS, ENBIndex may be configured to have a value of "true." If not (e.g., when it is configured that the UL traffic is transmitted only through the first BS), ENBIndex may be configured to have a value of "false." As still another example, ENBIndex may be configured to distinguish among a value for identifying a configuration of transmitting UL traffic only through the second BS, a value for identifying a configuration of transmitting the UL traffic only through the first BS, and a value for identifying a configuration of transmitting the UL traffic through the first BS and the second BS. As yet another example, ENBIndex may have a list of indices (SCellIndex/ENBIndex) as a value. Specifically, when DL traffic is processed through two BSs, ENBIndex may have two index values.

As still another example, in order to deliver UL traffic and DL traffic of a particular RB in such a manner as to separate the UL traffic from the DL traffic, the first BS operating as a PCell may include, in DRB-ToAddMod, a UL cell identifier (e.g., PCI), a UL second BS SCell index, a UL eNB identifier, or index/distinguishing information for distinguishing, by the UE, between cells/BSs to deliver UL traffic. Alternatively, in order to deliver UL traffic of a particular RB to a small cell configured as a second BS SCell, the first BS may include, in DRB-ToAddMod, a UL cell identifier (e.g., PCI), a UL second BS SCell index, a UL eNB identifier, or index/distinguishing information for distinguishing, by the UE, between cells/BSs to deliver UL traffic. Alternatively, in order to deliver UL traffic of a particular RB through a particular cell, a particular second BS SCell, a particular CC, or a particular eNB, the first BS may include, in DRB-ToAddMod, a UL cell identifier (e.g., PCI), a UL second BS SCell index, a UL eNB identifier, or index/distinguishing information for distinguishing, by the UE, between cells/BSs to deliver UL traffic.

When, in adding/modifying the above-described RB, the UE receives a UL cell identifier (e.g., PCI), a UL second BS SCell index, a UL eNB identifier, or index/distinguishing information for distinguishing, by the UE, cells/BSs to deliver UL traffic, the UE may deliver the UL traffic of the relevant RB through a relevant cell, a relevant second BS SCell, a relevant Secondary Component Carrier (SCC), a relevant BS, or a cell group associated with the relevant BS on the basis of DRB-ToAddMod. Also, the UE may deliver DL traffic of the relevant RB through a macro cell, a PCC, or the first BS in such a manner as to separate the DL traffic from the UL traffic. Alternatively, the UE may deliver the DL traffic of the relevant RB through a serving cell or a serving cell eNB in such a manner as to separate the DL traffic from the UL traffic. For example, the DL traffic of the relevant RB may be delivered through the first BS and the second BS, or a cell group associated with the first BS and a cell group associated with the second BS.

When, in adding/modifying the relevant RB, the UE receives RadioResourceConfigDedicated which does not include the UL cell identifier (e.g., PCI), the UL SCell index, the UL eNB identifier, or the index/distinguishing information for distinguishing, by the UE, between cells/BSs to deliver UL traffic, the relevant RB may be delivered without distinguishing the UL from the DL. Specifically, the relevant RB may be delivered through a macro cell, a PCC, or the first BS. Alternatively, the relevant RB may be delivered through a serving cell or a serving cell eNB. For example, the relevant RB may be delivered through the first BS and the second BS, or a cell group associated with the first BS and a cell group associated with the second BS.

Before the first BS operating as a PCell adds/modifies and/or releases an RB through an RRC connection reconfiguration procedure, the pieces of information included in the above-described drb-ToAddModList may be generated according to a procedure through an X2 interface between the first BS and the second BS.

FIG. 9 is a view illustrating another example of radio resource configuration information according to the present disclosure.

Referring to FIG. 9, DRB-ToAddMod included in the above-described RadioResourceConfigDedicated may include a UL cell identifier (e.g., PCI), a UL SCell index, a UL eNB identifier, or index/distinguishing information for distinguishing, by the UE, between cells/BSs to deliver UL traffic. As an example, ENBIndex may be configured to have an integer value between 1 and 5 as an index value of a particular BS to transmit UL traffic. As another example, when it is configured that UL traffic is transmitted only through the second BS, ENBIndex may be configured to have a value of "true." If not (e.g., when it is configured that the UL traffic is transmitted only through the first BS), ENBIndex may be configured to have a value of "false." As still another example, ENBIndex may be configured to distinguish among a value for identifying a configuration of transmitting UL traffic only through the second BS, a value for identifying a configuration of transmitting the UL traffic only through the first BS, and a value for identifying a configuration of transmitting the UL traffic through the first BS and the second BS. As yet another example, ENBIndex may have a list of indices as a value. For example, when DL traffic is processed through two BSs, ENBIndex may include two index values.

A Method for Including UL/DL Distinguishing Information in RadioResourceConfigDedicated The first BS operating as a PCell may configure radio resources for the first BS providing a cell operating as the PCell and/or a second BS providing a cell operating as a second BS SCell (or serving cell) by using an RB addition modification list (DRB-ToAddModList) or an RB release list (DRB-ToReleaseList) of RadioResourceConfigDedicated. For example, a particular RB of the first BS providing the cell operating as the PCell may be configured to be added/modified to/in the first BS and/or the second BS operating as the second BS SCell (or serving cell).

As an example, in the above-described connection structure illustrated in FIG. 6, RB addition modification information (DRB-ToAddMod) of an RB addition modification list (drb-ToAddModList) may include one or more pieces of information among eps-BearerIdentity (EPS bearer identifier), drb-Identity, PDCP configuration information (pdcp-Config), RLC configuration information (rlc-Config) for an RLC entity which is a peer to a first BS RLC entity and an RLC entity which is a peer to a second BS RLC entity, logicalChannelIdentity, and logicalChannelConfig.

As another example, in the above-described connection structure illustrated in FIG. 7, RB addition modification information (DRB-ToAddMod) of an RB addition modification list (drb-ToAddModList) may include one or more pieces of information among eps-BearerIdentity (EPS bearer identifier), drb-Identity, PDCP entity configuration information (pdcp-Config) which is a peer to a second BS PDCP entity, RLC entity configuration information (rlc-Config) which is a peer to a second BS RLC entity, logicalChannelIdentity, and logicalChannelConfig.

In order to deliver UL traffic and DL traffic of a particular RB in such a manner as to separate the UL traffic from the DL traffic, the first BS providing the cell operating as the PCell may include, in DRB-ToAddMod, a cell identifier (e.g., a PCI), a second BS SCell index, an eNB identifier, or index/distinguishing information for distinguishing between cells/BSs by the UE. Alternatively, in order to deliver UL traffic and DL traffic of a particular RB through a particular cell, a particular second BS SCell, a particular CC, or a particular eNB in such a manner as to separate the UL traffic from the DL traffic, the first BS may include, in DRB-ToAddMod, a cell identifier (e.g., a PCI), a second BS SCell index, an eNB identifier, or index/distinguishing information for distinguishing between UL/DL cells/BSs by the UE. In addition, DRB-ToAddMod may further include UL/DL distinguishing information (e.g., UpDownIndicator).

In adding/modifying the above-described RB, the UE may deliver UL (or DL) traffic of the relevant RB through a particular cell, a particular SCell, a particular CC, or a particular eNB according to the UL/DL distinguishing information. For example, when the UL/DL distinguishing information is set to a DL value, the UL/DL distinguishing information may cause the DL traffic of the relevant RB to be transmitted only through a cell/BS included in the DRB-ToAddMod. As another example, when the UL/DL distinguishing information is set to a UL/DL value, the UL/DL distinguishing information may cause the UL traffic and DL traffic of the relevant RB to be transmitted only through a cell/BS included in the DRB-ToAddMod.

Before the first BS operating as the PCell adds/modifies and/or releases an RB through an RRC connection reconfiguration procedure, the pieces of information included in the drb-ToAddModList may be generated according to a procedure through an X2 interface between the first BS and the second BS.

FIG. 10 is a view illustrating still another example of radio resource configuration information according to the present disclosure.

Referring to FIG. 10, RadioResourceConfigDedicated may include, in DRB-ToAddMod, a cell identifier (e.g., a PCI), a second BS SCell index, an eNB identifier, or index/distinguishing information and UL/DL distinguishing information for distinguishing between cells/BSs by the UE.

As an example, UL/DL distinguishing information (e.g., UpDownIndicator) may distinguish among UL, DL, and/or both directions (UL/DL) through integer values from 0 to 3. For example, when the UL/DL distinguishing information is set to a UL value, the UL/DL distinguishing information may cause UL traffic of a relevant RB to be transmitted only through a relevant cell, a relevant second BS SCell, a relevant BS, or a cell group associated with the relevant BS. In this case, DL traffic may be delivered through the first BS or a macro cell. Alternatively, in this case, the DL traffic may be delivered through a serving cell BS or a serving cell. Specifically, the DL traffic may be delivered through the first BS and the second BS. Or, the DL traffic may be delivered through a cell associated with the first BS and a cell associated with the second BS.

When the above-described UL/DL distinguishing information is set to a DL value, the UL/DL distinguishing information may cause the DL traffic of the relevant RB to be transmitted only through a relevant cell, a relevant second BS SCell, a relevant BS, or a cell group associated with the relevant BS. In this case, the UL traffic may be delivered through the first BS or a macro cell. Alternatively, in this case, the UL traffic may be delivered through a serving cell BS or a serving cell. Specifically, the UL traffic may be delivered through the first BS and the second BS. Or, the UL traffic may be delivered through a cell associated with the first BS and a cell associated with the second BS.

When the UL/DL distinguishing information is set to a UL/DL value, the UL/DL distinguishing information may cause the UL traffic and DL traffic of the relevant BS to be transmitted only through a relevant cell, a relevant second BS SCell, a relevant BS, or a cell group associated with the relevant BS.

As another example, the UL/DL distinguishing information (e.g., UpDownIndicator) may cause the UL traffic and the DL traffic to be delivered in such a manner as to distinguish the UL from the DL through integer values from 0 to 1, or true and false values. For example, when the UL/DL distinguishing information is set to 0 or "true," the UL/DL distinguishing information may cause the UL traffic to be delivered only through a relevant cell, a relevant second BS SCell, a relevant BS, or a cell group associated with the relevant BS. In this case, the DL traffic may be delivered through the first BS or a macro cell. Alternatively, in this case, the DL traffic may be transmitted through a serving cell BS and a serving cell. Specifically, the DL traffic may be delivered through the first BS and the second BS. Or, the DL traffic may be delivered through a cell group associated with the first BS and a cell group associated with the second BS.

When the UL/DL distinguishing information is set to 1 or "false," the UL/DL distinguishing information may cause the DL traffic to be delivered only through a relevant cell, a relevant second BS SCell, a relevant BS, or a cell group associated with the relevant BS. In this case, the UL traffic may be delivered through one of the first BS and a macro cell. Alternatively, in this case, the UL traffic may be delivered through one of a serving cell BS and a serving cell. Specifically, the UL traffic may be delivered through the first BS and the second BS. Or, the UL traffic may be delivered through a cell group associated with the first BS and a cell group associated with the second BS.

SeNB/SCell

A Method for Including a UL Cell Index and a DL Cell Index in Radio Resource Configuration Information (RadioResourceConfigDedicatedSeNB/RadioResourceConfigDedicatedSCell)

When the first BS provides a cell operating as a Pcell, the first BS may configure radio resources for the first BS by using one of an RB addition modification list (DRB-ToAddModList) and an RB release list (DRB-ToReleaseList) of RadioResourceConfigDedicated of the first BS. Also, the first BS may add DRB-ToAddModList or information for representing the delivery of an RB through a second BS SCell to second BS radio resource configuration information (RadioResourceConfigDedicatedSeNB/RadioResourceConfigDedicatedSCell). Accordingly, radio resources may be configured for the second BS providing a cell operating as the second BS SCell.

For example, a particular RB of the first BS providing the cell operating as the PCell may be configured to be added to the first BS and/or the second BS providing the cell operating as the second BS SCell (or serving cell).

As an example thereof, radio resources may be configured for the first BS and/or the second BS by adding DRB-ToAddModList to RadioResourceConfigDedicatedSeNB/RadioResourceConfigDedicatedSCell. The DRB-ToAddModList may be configured as described above.

In order to deliver UL traffic and DL traffic of a particular RB with the UL traffic separated from the DL traffic, the first BS providing the cell operating as the PCell may include, in DRB-ToAddMod, UL cell identifier (e.g., PCI)/DL cell identifier (e.g., PCI), UL SCell index/DL SCell index, UL eNB identifier/DL eNB identifier, or index/distinguishing information for distinguishing between UL/DL cells/BSs by the UE. Alternatively, in order to deliver the UL traffic and the DL traffic of the particular RB through a particular cell, a particular second BS SCell, a particular CC, or a particular eNB in such a manner as to separate the UL traffic from the DL traffic, the first BS may include, in DRB-ToAddMod, UL cell identifier (e.g., PCI)/DL cell identifier (e.g., PCI), UL SCell index/DL SCell index, UL eNB identifier/DL eNB identifier, or index/distinguishing information for distinguishing between UL/DL cells/BSs by the UE.

When, in adding/modifying the above-described RB, the UE receives the UL cell identifier (e.g., PCI)/DL cell identifier (e.g., PCI), the UL SCell index/DL SCell (or PCell) index, the UL eNB identifier/DL eNB identifier, or the index/distinguishing information for distinguishing between UL/DL cells/BSs by the UE, the UE may respectively deliver the UL traffic/DL traffic of the relevant RB through relevant UL cell/DL cell, relevant UL SCell/DL SCell, relevant UL CC/DL CC, or relevant UL eNB/DL eNB in such a manner as to distinguish the UL traffic from the DL traffic.

When, in adding/modifying the relevant RB, the UE receives RadioResourceConfigDedicated which does not include the UL cell identifier (e.g., PCI)/DL cell identifier (e.g., PCI), the UL SCell index/DL SCell index, the UL eNB identifier/DL eNB identifier, or the index/distinguishing information for distinguishing between UL/DL cells/BSs by the UE, the relevant RB may be delivered without distinguishing the UL from the DL. Specifically, the relevant RB may be delivered through a macro cell, a Primary Component Carrier (PCC), or the first BS. Alternatively, the relevant RB may be delivered through a serving cell or a serving cell eNB. For example, the RB may be delivered through the first BS and the second BS. Or, the RB may be delivered through a cell group associated with the first BS and a cell group associated with the second BS.

Before the first BS providing the cell operating as the PCell adds/modifies and/or releases an RB through the RRC connection reconfiguration procedure, the pieces of information included in the above-described drb-ToAddModList may be generated according to a procedure through an X2 interface between the first BS and the second BS.

FIG. 11 is a view illustrating yet another example of radio resource configuration information according to the present disclosure.

Referring to FIG. 11, the above-described RadioResourceConfigDedicated may include, in DRB-ToAddMod, a cell identifier (e.g., a PCI), a second BS SCell index, an eNB identifier, or index/distinguishing information for distinguishing between cells/BSs by the UE.

For example, ENBIndex may be configured to have an integer value between 1 and 5 as an index value of a particular BS to transmit UL traffic. As another example, when it is configured that UL traffic is transmitted only through the second BS, ENBIndex may be configured to have a value of "true." If not (e.g., when it is configured that the UL traffic is transmitted only through the first BS), ENBIndex may be configured to have a value of "false." As still another example, ENBIndex may be configured to distinguish among a value for identifying a configuration of transmitting UL traffic only through the second BS, a value for identifying a configuration of transmitting the UL traffic only through the first BS, and a value for identifying a configuration of transmitting the UL traffic through the first BS and the second BS.

In another method, in order to deliver UL traffic and DL traffic of a particular RB with the UL traffic to be separated from the DL traffic, the first BS providing a cell operating as a PCell may include, in DRB-ToAddMod, a UL cell identifier (e.g., PCI), a UL second BS SCell index, a UL eNB identifier, or index/distinguishing information for distinguishing, by the UE, between cells/BSs to deliver UL traffic. Alternatively, in order to separate and deliver UL traffic of a particular RB to a small cell configured as a second BS SCell, the first BS may include, in DRB-ToAddMod, a UL cell identifier (e.g., PCI), a UL second BS SCell index, a UL eNB identifier, or index/distinguishing information for distinguishing, by the UE, between cells/BSs to deliver UL traffic. Alternatively, in order to separate and deliver UL traffic of a particular RB through a particular cell, a particular second BS SCell, a particular CC, or a particular eNB, the first BS may include, in DRB-ToAddMod, a UL cell identifier (e.g., PCI), a UL second BS SCell index, a UL eNB identifier, or index/distinguishing information for distinguishing, by the UE, between cells/BSs to deliver UL traffic.

When, in adding/modifying an RB, the UE receives the UL cell identifier (e.g., PCI), the UL second BS SCell index, the UL eNB identifier, or the index/distinguishing information for distinguishing, by the UE, cells/BSs to deliver UL traffic, the UE may separate and deliver the UL traffic of the relevant RB through the cell, the second BS SCell, the SCC, or the eNB. Also, the UE may deliver DL traffic of the relevant RB through a macro cell, a PCC, or the first BS in such a manner as to separate the DL traffic from the UL traffic. Alternatively, the UE may deliver the DL traffic of the relevant RB through a serving cell or a serving cell eNB in such a manner as to separate the DL traffic from the UL traffic. For example, the DL traffic of the relevant RB may be delivered through the first BS and the second BS. Or, the DL traffic of the relevant RB may be delivered through a cell group associated with the first BS and a cell group associated with the second BS.

When, in adding/modifying an RB, the UE receives RadioResourceConfigDedicated which does not include a UL cell identifier (e.g., PCI), a UL SCell index, a UL eNB identifier, or index/distinguishing information for distinguishing, by the UE, between cells/BSs to deliver UL traffic, the relevant RB may be delivered without distinguishing the UL from the DL. Specifically, the relevant RB may be delivered through a macro cell, a PCC, or the first BS. Alternatively, the relevant RB may be delivered through a serving cell or a serving cell eNB. For example, the relevant RB may be delivered through the first BS and the second BS, or a cell group associated with the first BS and a cell group associated with the second BS.

Before the first BS operating as a PCell adds/modifies and/or releases an RB through an RRC connection reconfiguration procedure, the pieces of information included in drb-ToAddModList may be generated according to a procedure through an X2 interface between the first BS and the second BS.

FIG. 12 is a view illustrating still yet another example of radio resource configuration information according to the present disclosure.

Referring to FIG. 12, the above-described RadioResourceConfigDedicatedSeNB/RadioResourceConfigDedicatedSCell may include, in DRB-ToAddMod, a cell identifier (e.g., PCI), a second BS SCell index, an eNB identifier, or index/distinguishing information for distinguishing between cells/BSs by the UE. For example, ENBIndex may be configured to have an integer value between 1 and 5 as an index value of a particular BS to transmit UL traffic. As another example, when it is configured that UL traffic is transmitted only through the second BS, ENBIndex may be configured to have a value of "true." If not (e.g., when it is configured that the UL traffic is transmitted only through the first BS), ENBIndex may be configured to have a value of "false." As still another example, ENBIndex may be configured to distinguish among a value for identifying a configuration of transmitting UL traffic only through the second BS, a value for identifying a configuration of transmitting the UL traffic only through the first BS, and a value for identifying a configuration of transmitting the UL traffic through the first BS and the second BS.

SeNB/SCell

A Method for Including UL/DL Distinguishing Information in Radio Resource Configuration Information (RadioResourceConfigDedicatedSeNB/RadioResourceConfigDedicatedSCell)

When the first BS provides a cell operating as a Pcell, the first BS may configure radio resources for the first BS operating as the PCell by using an RB addition modification list (DRB-ToAddModList) or an RB release list (DRB-ToReleaseList) of RadioResourceConfigDedicated of the first BS. Also, the first BS may add DRB-ToAddModList or information for representing the delivery of an RB through a second BS SCell to second BS radio resource configuration information (RadioResourceConfigDedicatedSeNB/ RadioResourceConfigDedicatedSCell). Accordingly, radio resources may be configured for the second BS providing a cell operating as an SCell.

For example, a particular RB of the first BS providing the cell operating as the PCell may be configured to be added to the first BS and/or the second BS providing the cell operating as the second BS SCell (or serving cell).

As an example thereof, radio resources may be configured for the first BS and/or the second BS by adding DRB-ToAddModList to RadioResourceConfigDedicatedSeNB/ RadioResourceConfigDedicatedSCell. The DRB-ToAddModList may be configured as in the above-described method.

In order to deliver UL traffic and DL traffic of a particular RB with the UL traffic to be separated from the DL traffic, the first BS providing the cell operating as the PCell may include, in DRB-ToAddMod, a cell identifier (e.g., a PCI), a second BS SCell index, an eNB identifier, or index/distinguishing information for distinguishing between cells/ BSs by the UE. Alternatively, in order to deliver the UL traffic and the DL traffic of the particular RB through a particular cell, a particular SCell, a particular CC, or a particular eNB in such a manner as to separate the UL traffic from the DL traffic, the first BS may include, in DRB-ToAddMod, a cell identifier (e.g., a PCI), a second BS SCell index, an eNB identifier, or index/distinguishing information for distinguishing between cells/BSs by the UE. Also, the DRB-ToAddMod may further include UL/DL distinguishing information (e.g., UpDownIndicator).

As another example, only when the DRB-ToAddMod may be included in RadioResourceConfigDedicatedSeNB/ RadioResourceConfigDedicatedSCell, the DRB-ToAddMod may include a cell identifier (e.g., a PCI), a second BS SCell index, an eNB identifier, or index/distinguishing information for distinguishing between cells/BSs by the UE.

In adding/modifying the above-described RB, according to UL/DL distinguishing information, the UE may respectively deliver the UL (or DL) traffic of the relevant RB through a particular cell, a particular second BS SCell, a particular CC, a particular eNB, or a cell group associated with the particular eNB.

For example, when the UL/DL distinguishing information is set to a UL value, UL traffic of a relevant RB may be transmitted only through a cell/BS included in DRB-ToAddMod. In this case, DL traffic of the relevant RB may be delivered through the first BS or a macro cell. Alternatively, in this case, the DL traffic of the relevant RB may be transmitted through a serving cell BS or a serving cell. Specifically, the DL traffic of the relevant RB may be delivered through the first BS and the second BS, or a cell group associated with the first BS and a cell group associated with the second BS.

When the UL/DL distinguishing information is set to a DL value, the DL traffic of the relevant RB may be transmitted only through a cell/BS included in DRB-ToAddMod. In this case, the UL traffic of the relevant RB may be delivered through the first BS or a macro cell. Alternatively, in this case, the UL traffic of the relevant RB may be transmitted through a serving cell BS or a serving cell. Specifically, the UL traffic of the relevant RB may be delivered through the first BS and the second BS, or a cell group associated with the first BS and a cell group associated with the second BS.

When the UL/DL distinguishing information is set to a UL/DL value, the UL traffic and DL traffic of the relevant RB may be delivered only through a cell/BS included in DRB-ToAddMod.

Before the first BS operating as the PCell adds/modifies and/or releases an RB through an RRC connection reconfiguration procedure, the pieces of information included in drb-ToAddModList may be generated according to a procedure through an X2 interface between the first BS and the second BS.

FIG. 13 is a view illustrating further another example of radio resource configuration information according to the present disclosure.

Referring to FIG. 13, RadioResourceConfigDedicatedSeNB/RadioResourceConfigDedicatedSCell may include, in DRB-ToAddMod, a cell identifier (e.g., a PCI), a second BS SCell index, an eNB identifier, or index/distinguishing information and UL/DL distinguishing information for distinguishing between cells/BSs by the UE.

As an example, UL/DL distinguishing information (e.g., UpDownIndicator) may distinguish among UL, DL, and/or both directions (UL/DL) through integer values from 0 to 3.

When the UL/DL distinguishing information is set to a UL value, UL traffic of a relevant RB may be transmitted only through a relevant cell, a relevant second BS SCell, a relevant BS, or a cell associated with the relevant BS. In this case, DL traffic may be delivered through the first BS or a macro cell. Alternatively, in this case, the DL traffic may be transmitted through a serving cell BS or a serving cell. Specifically, the DL traffic may be delivered through the first BS and the second BS, or a cell group associated with the first BS and a cell group associated with the second BS.

When the UL/DL distinguishing information is set to a DL value, the DL traffic of the relevant RB may be transmitted only through a relevant cell, a relevant second BS SCell, a relevant BS, or a cell group associated with the relevant BS. In this case, the UL traffic may be delivered through the first BS or a macro cell. Alternatively, in this case, the UL traffic may be transmitted through a serving cell BS or a serving cell. Specifically, the UL traffic may be delivered through the first BS and the second BS. Or, the UL traffic may be delivered through a cell group associated with the first BS and a cell group associated with the second BS.

When the UL/DL distinguishing information is set to a UL/DL value, the UL traffic and DL traffic of the relevant BS may be transmitted only through a relevant cell, a relevant second BS SCell, a relevant BS, or a cell group associated with the relevant BS.

As another example, the UL/DL distinguishing information (e.g., UpDownIndicator) may cause the UL traffic and the DL traffic to be delivered in such a manner as to distinguish the UL from the DL through integer values from 0 to 1, or true and false values.

When the UL/DL distinguishing information is set to 0 or "true," the UL/DL distinguishing information may cause the UL traffic to be delivered through a relevant cell, a relevant second BS SCell, a relevant BS, or a cell group associated with the relevant BS. In this case, the DL traffic may be delivered through the first BS or a macro cell. Alternatively, in this case, the DL traffic may be delivered through a serving cell BS or a serving cell. Specifically, the DL traffic may be delivered through the first BS and the second BS, or a cell group associated with the first BS and a cell group associated with the second BS.

When the UL/DL distinguishing information is set to 1 or "false," the UL/DL distinguishing information may cause the DL traffic to be delivered through a relevant cell, a relevant second BS SCell, a relevant BS, or a cell group associated with the relevant BS. In this case, the UL traffic may be delivered through the first BS or a macro cell. Alternatively, in this case, the UL traffic may be delivered through a serving cell BS or a serving cell. Specifically, the UL traffic may be delivered through the first BS and the second BS. Or, the UL traffic may be delivered through a cell group associated with the first BS and a cell group associated with the second BS.

Second Embodiment: a Method for Separating a Transmission Path of UL Traffic from that of DL Traffic in a Unit of Cell, CC, or eNB A Method for Including SCell UL/DL Distinguishing Information in Second BS SCell Information to be Added/Modified (SeNBSCellToAddMod)

When a UE establishes an RRC connection with a first BS providing a cell operating as a PCell and is in an RRC connected state, the UE may add a cell, which is associated with a second BS connected through a non-ideal backhaul, as a second BS SCell (or a serving cell).

When the first BS providing the cell operating as the PCell detects a new second BS SCell candidate and then determines the addition/modification of a second BS SCell in order to add cells associated with the second BS as a second BS SCell or in order to modify a configured second BS SCell, the first BS operating as the PCell adds/modifies the second BS SCell through an RRC connection reconfiguration procedure.

When an RRC connection reconfiguration message, that the UE has received, includes SeNBSCellToAddModList representing a list of second BS SCells to be added/modified, the UE adds or modifies the second BS SCell.

In order to deliver UL traffic and DL traffic with the UL traffic to be separated from the DL traffic, the first BS providing the cell operating as the PCell may include the pieces of information below in SeNBSCellToAddMod of SeNBSCellToAddModList. Alternatively, in order to deliver UL traffic and DL traffic through a particular cell, a particular SCell, a particular CC, or a particular eNB in such a manner as to separate the UL traffic from the DL traffic, the first BS operating as the PCell may include the pieces of information below in SeNBSCellToAddMod of the above-described SeNBSCellToAddModList.

- A second BS SCell index (SeNBSCellIndex): includes index information used to identify one second BS SCell within second BS SCells configured for the UE.
- A cell identifier (CellIdentification): includes PCI information of a second BS SCell and ARFCN information thereof
- Radio resource configuration common SCell information (radioResourceConfigCommonSCell): is information essential for the UE to operate in an SCell, and common radio resource configuration information (e.g., a physical layer parameter and a random access parameter) is included in system information.
- Radio resource configuration dedicated SCell information (radioResourceConfigDedicatedSCell): includes UE-specific configuration information (e.g., physicalConfigDedicatedSCell and mac-MainConfigSCell) applicable to an SCell.
- UL/DL distinguishing information of a second BS or a second BS SCell (e.g., UpDownIndicatorSeNB and UpDownIndicatorSCell): includes distinguishing information on a direction (UL/DL) of traffic to be delivered through a second BS or a second BS SCell.

Cell information to be added (cell addition modification information) may include second BS distinguishing information so that the UE may distinguish a second BS SCell from an SCell of a BS associated with the existing PCell. Alternatively, a second BS SCell index value may be set differently from an SCell index value of the BS associated with the existing PCell, so as to be distinguished to be a cell associated with the second BS. For example, in order to cause an SCell index to use a value other than a value used as an SCell index of the BS associated with the existing PCell, it is possible to cause the SCell index, which may currently have an integer value from 1 to 7, to have an integer value from 1 to 14. The integer values from 1 to 7 may be used for indices of the SCells of the BS associated with the PCell, and the integer values from 8 to 14 may be used for indices of the second BS. Alternatively, so that an SCell index of the BS associated with the PCell may be distinguish from an SCell index of the second BS, it is possible to cause an SCell index and a representation information field, which represents being an SCell through the second BS, to be transmitted together.

When a second BS SCell index included in the above-described SeNBSCellToAddMod is not a current UE configuration part, the UE adds a second BS SCell corresponding to a CellIdentification according to the received radioResourceConfigCommonSCell and the received radioResourceConfigDedicatedSCell. Specifically, when the second BS SCell index does not correspond to a second BS SCell configured for the UE, the UE adds the second BS SCell corresponding to the CellIdentification according to the received radioResourceConfigCommonSCell and the received radioResourceConfigDedicatedSCell.

When the second BS SCell index included in the SeNBSCellToAddMod is the current UE configuration part, the UE modifies a second BS SCell according to the received radioResourceConfigDedicatedSCell. Specifically, when the second BS SCell index corresponds to a second BS SCell configured for the UE, the UE modifies the second BS SCell according to the received radioResourceConfigDedicatedSCell.

Before the first BS providing the cell operating as the PCell adds/modifies a second BS SCell through an RRC connection reconfiguration procedure, the pieces of information included in the above-described SeNBSCellToAddMod may be interrogated through an X2 interface between the first BS and the second BS. Alternatively, the pieces of information included in the SeNBSCellToAddMod may be previously configured in the first BS providing the cell operating as the PCell, may be previously stored through Operations, Administration, and Maintenance (OAM), or may be stored in the previous procedure for adding/modifying a second BS SCell, so as to be able to be used.

The second BS SCell information described hereinabove may be configured as illustrated in FIG. 14.

FIG. 14 is a view illustrating an example of SeNBSCellToAddMod according to the present disclosure.

Referring to FIG. 14, the above-described SeNBSCellToAddMod may be configured to include SCell UL/DL distinguishing information.

As an example, UL/DL distinguishing information of a second BS or a second BS SCell (e.g., UpDownIndicatorSeNB or UpDownIndicatorSCell) may distinguish among UL, DL, and/or both directions (UL/DL) through integer values from 0 to 3.

When the UL/DL distinguishing information of the second BS or the second BS SCell is set to a UL value, UL traffic of all user plane data may be transmitted only through the second BS, the second BS SCell, or a cell group associated with the second BS. In this case, DL traffic may be delivered through the first BS or a macro cell. Alternatively, in this case, the DL traffic may be transmitted through a serving cell BS or a serving cell. Specifically, the DL traffic may be delivered through the first BS and the second BS, or a cell associated with the first BS and a cell associated with the second BS.

When the UL/DL distinguishing information is set to a DL value, the DL traffic of all the user plane data may be transmitted only through the second BS, a second BS SCell, or a cell group associated with the second BS. In this case, the UL traffic may be delivered through the first BS or a macro cell. Alternatively, in this case, the UL traffic may be transmitted through a serving cell BS or a serving cell. Specifically, the UL traffic may be delivered through the first BS and the second BS. Or, the UL traffic may be delivered through a cell group associated with the first BS and a cell group associated with the second BS.

When the UL/DL distinguishing information is set to a UL/DL value, the UL/DL distinguishing information may cause the UL traffic and DL traffic of all the user plane data to be transmitted only through the second BS, a second BS SCell, or a cell group associated with the second BS.

As another example, the above-described UL/DL distinguishing information of the second BS or the second BS SCell (e.g., UpDownIndicatorSeNB or UpDownIndicatorSCell) may cause the UL traffic and the DL traffic to be delivered in such a manner as to distinguish the UL from the DL through integer values from 0 to 1, or true and false values.

When the UL/DL distinguishing information of the second BS or the second BS SCell is set to 0 or "true," the UL/DL distinguishing information may cause the UL traffic to be delivered through the second BS, the second BS SCell, or a cell group associated with the second BS. In this case, the DL traffic may be delivered through the first BS or a macro cell. Alternatively, in this case, the DL traffic may be transmitted through a serving cell BS or a serving cell. Specifically, the DL traffic may be delivered through the first BS and the second BS, or a cell group associated with the first BS and a cell group associated with the second BS.

When the UL/DL distinguishing information of the second BS or the second BS SCell is set to 1 or "false," the UL/DL distinguishing information may cause the DL traffic to be delivered through the second BS, a second BS SCell, or a cell group associated with the second BS. In this case, the UL traffic may be delivered through a macro cell BS or a macro cell. Alternatively, in this case, the UL traffic may be transmitted through a serving cell BS or a serving cell. Specifically, the UL traffic may be delivered through the first BS and the second BS. Or, the UL traffic may be delivered through a cell group associated with the first BS and a cell group associated with the second BS.

Hereinabove, the description has been made of the radio resource configuration information and the second BS SCell addition/modification procedure for delivering UL traffic and DL traffic in such a manner as to separate a transmission/reception path of the UL traffic from that of the DL traffic according to the respective embodiments of the present disclosure.

Hereinafter, with reference to the accompanying drawings, a description will be made of an embodiment of each of a network structure, the establishment of RLC configuration information through an RRC reconfiguration message, and a logical channel priority procedure for delivering UL traffic and DL traffic in such a manner as to separate a UL traffic path from a DL traffic path in transmitting user plane data traffic of the present disclosure.

Figure 15:
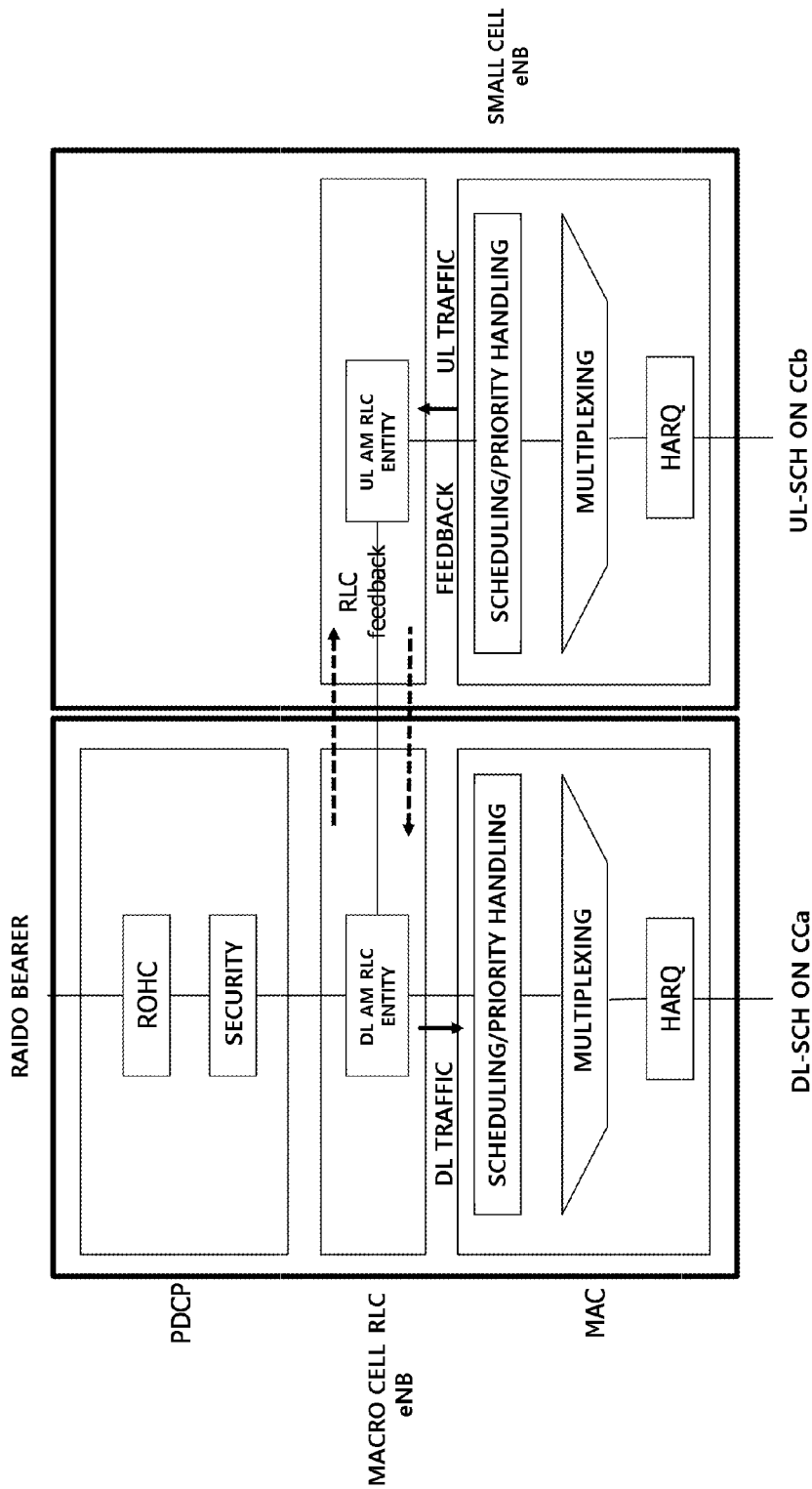
FIG. 15 is a view illustrating a Layer 2 structure of a master base station and a secondary base station according to an embodiment of the present disclosure.

FIG. 15 is a view illustrating a Layer 2 structure of a master BS and a secondary BS according to an embodiment of the present disclosure.

FIG. 15 illustrates an example of a Layer 2 protocol structure of a first BS (e.g., macro cell eNB) and a second BS (e.g., small cell eNB) for delivering UL traffic and DL traffic in such a manner as to separate a UL traffic path from a DL traffic path.

Referring to FIG. 15, with respect to one DRB, DL traffic is delivered through the first BS, and UL data traffic is delivered through the second BS. Even when multiple DRBs are processed, the configuration illustrated in FIG. 15 may be similarly applied.

Specifically, the first BS generates one PDCP entity for one DRB in a PDCP layer. An RLC entity for processing DL traffic may be separated from an RLC entity for processing UL traffic with respect to one DRB in an RLC layer which performs segmentation, Automatic Repeat reQuest (ARQ), and the like. That is, in order to perform Acknowledged Mode (AM) RLC processing, the first BS may have an entity for performing AM RLC processing on DL data (or an entity for performing AM RLC processing within the first BS). The second BS may have an entity for performing AM RLC processing on UL data (or an entity for performing AM RLC processing within the second BS).

The entity for performing AM RLC processing on DL data (or the entity for performing AM RLC processing within the first BS) and the entity for performing AM RLC processing on UL data (or the entity for performing AM RLC processing within the second BS) may perform an ARQ operation through a backhaul between the first BS and the second BS. For example, a DL AM RLC entity related to DL traffic (or an entity for performing AM RLC processing within the first BS) may perform retransmission on the basis of a feedback (e.g., an RLC status report) received through a UL AM RLC entity (or an entity for performing AM RLC processing within the second BS). Specifically, in order to provide positive and/or negative acknowledgements of RLC PDUs, an AM RLC entity may transmit a status report to the peer AM RLC entity. In other words, an entity for performing DL AM RLC processing within the UE (or an entity for performing AM RLC processing within the UE which is a peer to an entity for performing AM RLC processing within the first BS) transmits positive and/or negative acknowledgements of DL RLC PDUs, which have been received through the first BS, through the second BS. As illustrated in FIG. 15, the entity for performing DL AM RLC processing within the UE may transmit a status report to a DL AM RLC entity related to DL traffic within the first BS (or an AM RLC entity within the first BS) through the second BS.

In order to deliver DL traffic-related control information (e.g., L1 control information), the first BS may have one or more Hybrid Automatic Repeat reQuest (HARQ) entities. In order to deliver UL traffic-related control information (e.g., L1 control information), the second BS may have one or more Hybrid Automatic Repeat reQuest (HARQ) entities.

Figure 16:
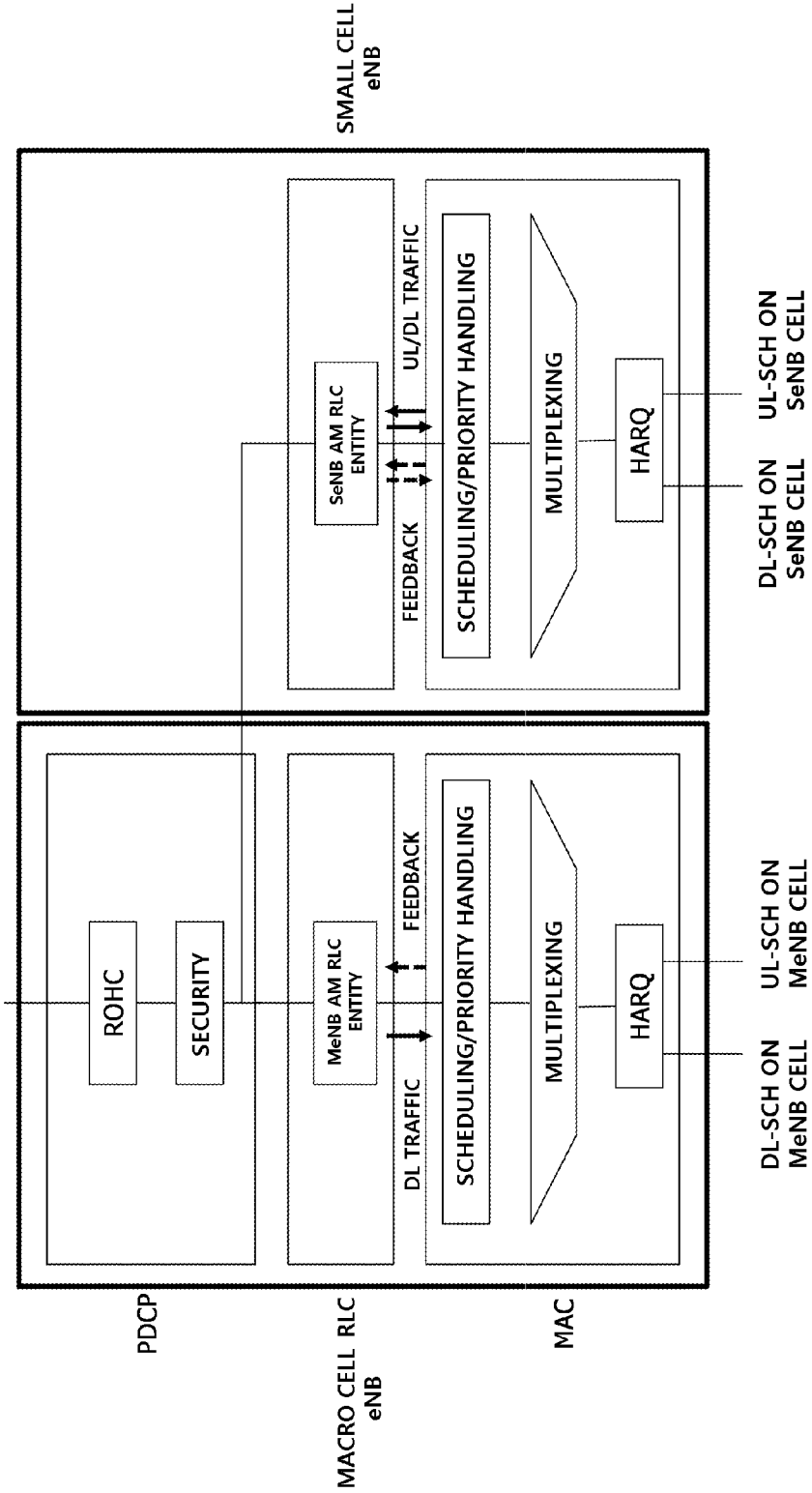
FIG. 16 is a view illustrating a Layer 2 structure of a master base station and a secondary base station according to another embodiment of the present disclosure.

FIG. 16 is a view illustrating a Layer 2 structure of a master BS and a secondary BS according to another embodiment of the present disclosure.

FIG. 16 illustrates another example of the Layer 2 protocol structure of the first BS (e.g., macro cell eNB) and the second BS (e.g., small cell eNB) for delivering UL traffic and DL traffic in such a manner as to separate the UL traffic from the DL traffic according to the present disclosure.

Referring to FIG. 16, DL traffic of one DRB is delivered through the first BS (e.g., macro cell eNB) and the second BS (e.g., small cell eNB), and UL data traffic thereof is delivered through the second BS. Even when multiple DRBs are processed, the configuration illustrated in FIG. 16 may be similarly applied.

Specifically, the first BS generates one PDCP entity for one DRB in a PDCP layer. The first BS may have an entity for performing AM RLC processing on DL traffic (or an entity for performing AM RLC processing within the first BS), in order to perform AM RLC processing with respect to one DRB in an RLC layer which performs segmentation, Automatic Repeat reQuest (ARQ), and the like. The second BS may have an entity for performing AM RLC processing on UL traffic and DL traffic (or an entity for performing AM RLC processing within the second BS).

The entity for performing AM RLC processing within the first BS and the entity for performing AM RLC processing within the second BS may perform an ARQ operation through a cell associated with the first BS and a cell associated with the second BS, respectively. For example, the entity for performing AM RLC processing within the first BS, which is configured in the first BS, may transmit an RLC PDU of DL user plane data traffic through a macro cell, the first BS, a PCC, or a cell group associated with the first BS. Also, the entity for performing AM RLC processing within the first BS, which is configured in the first BS, may perform retransmission on the basis of a feedback (e.g., an RLC status report) from an RLC receiver of DL traffic received through a macro cell, the first BS, a PCC, or a cell group associated with the first BS. The entity for performing AM RLC processing within the second BS, which is configured in the second BS, transmits/receives an RLC PDU of UL user plane data traffic and DL user plane data traffic through a small cell, the second BS, an SCC, or a cell associated with the second BS. Also, the entity for performing AM RLC processing within the second BS may transmit/receive, to/from the UE, a feedback (e.g., an RLC status report) from the RLC receiver of UL traffic received through a small cell, the second BS, an SCC, or a cell associated with the second BS. Further, the entity for performing AM RLC processing within the second BS may perform RLC retransmission on the basis of a feedback (e.g., an RLC status report) from the RLC receiver of DL traffic transmitted through a small cell, the second BS, an SCC, or a cell associated with the second BS.

In order to deliver DL traffic, related feedback (and/or control information), and the like, the first BS may have one or more HARQ entities. In order to deliver UL traffic and DL traffic, and related feedback (and/or control information), the second BS may have one or more HARQ entities.

Figure 17:
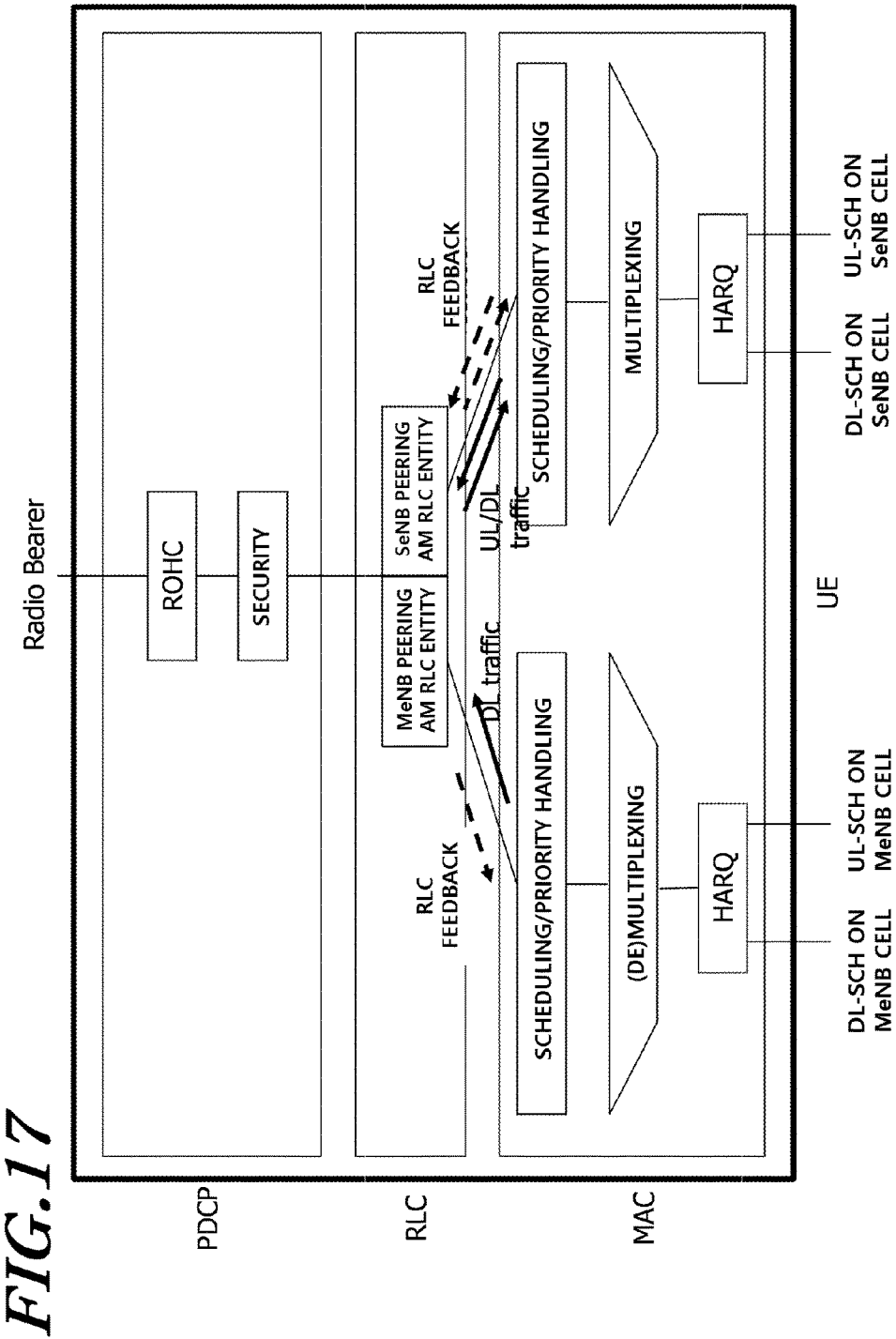
FIG. 17 is a view illustrating a Layer 2 structure of a user equipment according to still another embodiment of the present disclosure.

FIG. 17 is a view illustrating a Layer 2 structure of a UE according to still another embodiment of the present disclosure.

Referring to FIG. 17, the UE may have a Layer 2 protocol structure for delivering UL traffic and DL traffic in such a manner as to separate the UL traffic from the DL traffic.

Specifically, one PDCP entity is generated in a PDCP layer with respect to one DRB. In order to perform AM RLC processing in an RLC layer with respect to one DRB, the UE may have an entity for performing AM RLC processing on DL traffic (e.g., an entity which is a peer to an MeNB AM RLC entity) through a macro cell, a first BS (e.g., macro cell eNB), a PCC, or a cell group associated with the first BS, and may have an entity for performing AM RLC processing on UL traffic and DL traffic (e.g., an entity which is a peer to an SeNB AM RLC entity) through a small cell, a second BS (e.g., small cell eNB), or an SCC.

The AM RLC entity for processing DL traffic through a macro cell, the first BS, a PCC, or a cell group associated with the first BS may receive a DL RLC PDU through the macro cell, the first BS, the PCC, or the cell group associated with the first BS, and may transmit, to the first BS, a feedback (e.g., an RLC status report) from an RLC receiver of DL traffic through the macro cell, the first BS, the PCC, or the cell group associated with the first BS. The first BS may perform RLC retransmission on the basis of the feedback from the RLC receiver of the DL traffic.

The AM RLC entity for processing UL traffic and DL traffic through a small cell, the second BS, an SCC, or a cell associated with the second BS may transmit/receive a UL RLC PDU and a DL RLC PDU through the small cell, the second BS, the SCC, or the cell associated with the second BS. The UE may perform RLC retransmission on the basis of a feedback (e.g., an RLC status report) from the RLC receiver of UL user plane data traffic transmitted through the small cell, the second BS, the SCC, or a cell group associated with the second BS.

In a MAC layer of the UE, logical channels to transmit UL traffic through a small cell configured as a second BS SCell, the second BS, a CC of the small cell, or a cell group associated with the second BS may be mapped to a transport channel (e.g., Uplink Shared CHannel (UL-SCH)) through the small cell configured as the second BS SCell, the second BS, the CC of the small cell, or the cell group associated with the second BS. In order to deliver DL traffic, related feedback (and/or control information), and the like, the UE may have one or more HARQ entities. In order to deliver UL traffic, related feedback (and/or control information), and the like, the UE may have one or more HARQ entities.

Although the transmission of UL user plane data only through the second BS has been described with reference to FIGS. 16 and 17, the transmission of UL user plane data only through the first BS may also be similarly applied in the category of the present disclosure.

As described hereinabove, the UE may configure the RLC entities which are respective peers to the first BS and the second BS. Also, the UE may receive DL traffic through an RLC entity configured to be a peer to an RLC entity of the first BS, and may transmit UL traffic through an RLC entity configured to be a peer to an RLC entity of the second BS. Further, as another example, the UE may receive DL traffic through the RLC entity configured to be a peer to the RLC entity of the first BS and the RLC entity configured to be a peer to the RLC entity of the second BS. However, UL traffic may be processed only through the RLC entity configured to be a peer to the RLC entity of the second BS.

As described above, when in order to perform AM RLC processing in the RLC layer with respect to one DRB, an RLC entity for processing DL traffic through the first BS is separate from an RLC entity for processing UL traffic (or UL traffic and DL traffic) through the second BS, the first BS of the present disclosure may include, in DRB-ToAddMod of an RRC reconfiguration message, information (e.g., feedback AM-RLC information, UL/DL distinguishing representation information, or UL cell/BS index distinguishing information) for distinguishing between the two RLC entities.

Hereinafter, with reference to the accompanying drawings, a description will be made of respective embodiments of a case in which the information for distinguishing between the two RLC entities is included in DRB-ToAddMod of a higher layer signaling (e.g., RRC reconfiguration) message.

FIG. 18 is a view illustrating an example of RLC-Config on AM RLC according to the present disclosure.

Referring to FIG. 18, an RRC reconfiguration message may include the above-described distinguishing information in RLC-Config information on AM RLC included in DRB-ToAddMod.

For example, the above-described ul-AM-RLC-SeNB may include configuration information for an RLC entity that processes UL traffic through the second BS. The dl-AM-RLC-SeNB may include configuration information for an RLC entity that processes DL traffic through the second BS.

Information named ul-AM-RLC-MeNB-Feedback may include configuration information for an RLC entity for transmitting an RLC feedback in UL through the first BS. Information named dl-AM-RLC-MeNB may include configuration information for an RLC entity that processes DL traffic through the first BS.

FIG. 19 is a view illustrating another example of RLC-Config on AM RLC according to the present disclosure.

Referring to FIG. 19, an RRC reconfiguration message may include, in DRB-ToAddMod, RLC-Config information on AM RLC.

For example, the above-described up-down-split-indicator information may include information representing separation of UL from DL. Specifically, the up-down-split-indicator information represents that it is required to additionally configure an RLC entity, which is a peer to an RLC entity configured in each BS and is required to process RLC data or feedback information, in an existing RLC entity.

FIG. 20 is a view illustrating still another example of RLC-Config on AM RLC according to the present disclosure.

Referring to FIG. 20, an RRC reconfiguration message may include, in DRB-ToAddMod, a UL cell identifier (e.g., PCI), a UL second BS SCell index, a UL eNB identifier, index/distinguishing information for distinguishing between UL cells/BSs by the UE, UL/DL distinguishing information, or the like in order to configure a cell/BS to transmit UL data. When the above-described distinguishing information and the like are included, RLC-Config information on AM RLC enables the UE to additionally configure an RLC entity according to information before 3GPP Rel-11 by using the information before 3GPP Rel-11. For example, with respect to an RB having an identical DRB-ID, together with including first BS RLC-Config in RadioResourceConfigDedicated of the first BS (or RB information included in RadioResourceConfigDedicated of the first BS), second BS RLC-Config may be included in RadioResourceConfigDedicatedSeNB/RadioResourceConfigDedicatedSCell (or RB information included in RadioResourceConfigDedicatedSeNB/RadioResourceConfigDedicatedSCell).

As another example, when the DRB-ToAddMod of the RRC reconfiguration message includes the UL cell identifier (e.g., PCI), the UL second BS SCell index, the UL eNB identifier, the index/distinguishing information for distinguishing between UL cells/BSs by the UE, the UL/DL distinguishing information, or the like, a PDCP entity for a relevant RB may cause a PDCP PDU to be delivered to a BS (e.g., second BS) or an AM RLC entity within the UE which is a peer to an AM RLC entity configured in a cell associated with the relevant BS (e.g., second BS), which is established through the UL cell identifier (e.g., PCI), the UL second BS SCell index, the UL eNB identifier, the index/distinguishing information for distinguishing between UL cells/BSs by the UE, or the UL/DL distinguishing information. Accordingly, the UE may deliver UL traffic of the relevant RB only through the second BS or a cell associated with the second BS.

In other words, by using one or more pieces of information among the index, the identifier, and the distinguishing information, a PDCP entity of the UE may submit the PDCP PDU for transmitting UL data only to an AM RLC entity within the UE which is a peer to an RLC entity of the first BS or the second BS.

Specifically, the PDCP entity of the UE may submit the PDU to the AM RLC entity within the UE which is a peer to the RLC entity of the first BS, or may submit the PDU to the AM RLC entity within the UE which is a peer to the RLC entity of the second BS.

Hereinafter, in this specification, one of the first BS and the second BS will be described as a particular BS.

A Logical Channel Prioritization (LCP) procedure is used when a data amount is determined based on each logical channel and the type of MAC control element, which needs to be included in a MAC PDU, and the MAC PDU, is constructed.

As described above, in the MAC layer of the UE, the logical channels to deliver UL traffic through a small cell configured as a second BS SCell, the second BS, a CC of a small cell, or a cell group associated with the second BS may be mapped to a transport channel (UL-SCH) through the small cell configured as the second BS SCell, the second BS, the CC of the small cell, or the cell group associated with the second BS.

The UE may perform the LCP procedure for each small cell configured as the second BS SCell, each second BS, each small cell CC, or each cell group associated with the second BS.

For example, the UE of the present disclosure may allocate resources to logical channels belonging to a particular small cell configured as an SCell, a second BS, or a small cell CC, in the steps below for each small cell configured as an SCell, each second BS, each small cell CC, or each cell group associated with the second BS.

Step 1) the UE allocates, in decreasing priority order, resources to all logical channels which satisfy Bj>0 and belong to the particular small cell configured as the SCell, the second BS, the small cell CC, or the cell group associated with the second BS.

Step 2) the UE decreases Bj by the total size of MAC Service Data Units (SDUs) served to the logical channel in step 1.

Step 3) when any resources remain, the UE serves all of the logical channels in strict decreasing priority order until data for all of the logical channels, which belong to the particular small cell configured as the SCell, the second BS, or the small cell CC, or a UL grant is exhausted.

With respect to the LCP procedure, the UE may consider a priority for each small cell configured as the SCell, each second BS, or each small cell CC.

As described above, in accordance with at least one embodiment of the present, the method may be provided for the UE to deliver user plane data by using radio resources provided by the first BS and the second BS through a small cell under the control of a macro cell, or through a cooperation between the macro cell and the small cell in an environment where the macro cell and the small cell are constructed by an individual eNB through a non-ideal backhaul in a mobile communication network. Particularly, the UE according to at least one embodiment of the present disclosure is advantageous in that the UE can transmit UL data traffic through a small cell configured as a second BS SCell, the second BS, a small cell CC, or a cell group associated with the second BS, wherein path loss between the UE and the second BS is small. Accordingly, the present disclosure is advantageous in that even in the structure of dual connectivity through the first BS and the second BS, UL buffer status reporting and an LCP procedure can be performed only for the small cell configured as the second BS SCell, the second BS, the small cell CC, or the cell group associated with the second BS.

Figure 21:
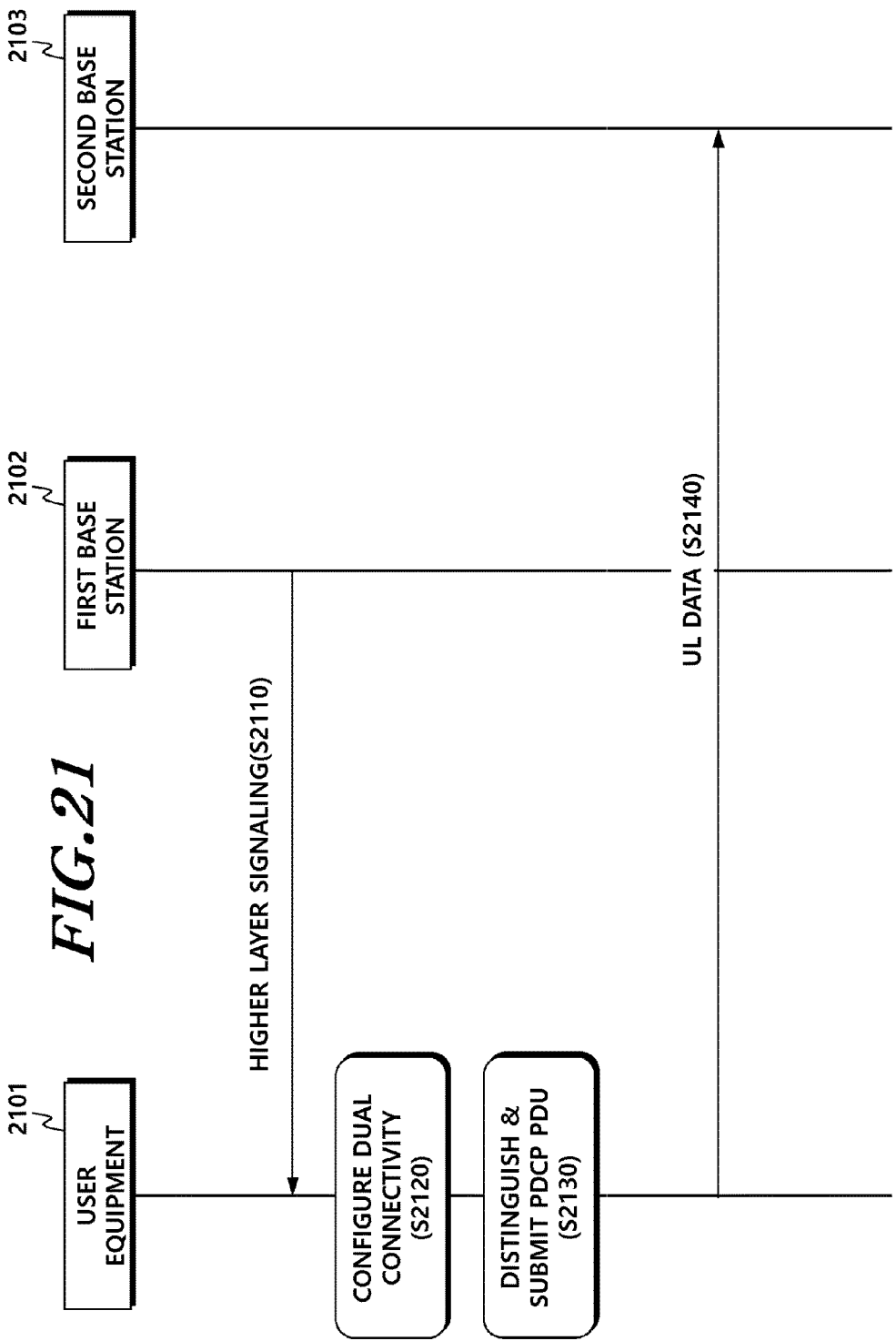
FIG. 21 is a signal flow diagram illustrating operations of a user equipment and base stations according to still another embodiment of the present disclosure.

FIG. 21 is a signal flow diagram illustrating operations of a UE and BSs according to still another embodiment of the present disclosure.

Operations of the UE, the first BS, and the second BS, of which operations may be performed in the above-described respective embodiments of the present disclosure, will be described as an example with reference to FIG. 21.

In step S2110, the UE 2101 may receive higher layer signaling from the first BS 2102. For example, the higher layer signaling may be RRC reconfiguration message. Also, the higher layer signaling may include index/identifier/distinguishing information and the like, which may distinguish, from another, a particular BS (e.g., second BS), a cell associated with the particular BS, or a cell group associated with the particular BS, which is to transmit UL user plane data according to the above-described respective embodiments of the present disclosure.

In step S2120, the UE 2101 may configure dual connectivity with the first BS 2102 and the second BS 2103. For example, the UE 2101 may configure an RB through the first BS and an RB through the second BS, as illustrated in FIG. 6 and FIG. 7. Also, the UE 2101 may configure an RB through both the first BS and the second BS. The RB through both the first BS and the second BS may be configured to be split at the first BS and the second BS, similarly to the structure illustrated in FIG. 6. Specifically, one PDCP entity and one or more RLC entities which are peers to RLC entities of the respective first BS and second BS may be configured.

In configuring the dual connectivity, the UE 2101 may configure an RLC entity which is a peer to each BS and the like.

In submitting a PDCP PDU of UL traffic to an RLC entity, a PDCP entity of the UE 2101 may configure the PDCP PDU of UL traffic by using information included in the above-described higher layer signaling. Specifically, the PDCP entity of the UE 2101 may deliver the PDCP PDU of UL traffic to an RLC entity which is a peer to an RLC entity of the particular BS (e.g., second BS) by using one or more pieces of information among the above-described index, identifier, and distinguishing information, in step S2130.

In step S2140, the delivered UL data is transmitted to the second BS 2103 through a MAC layer.

In each step, the UE, the first BS, and the second BS may be implemented by using various modified steps or various modified pieces of information according to the above-described respective embodiments of the present disclosure.

The UE of the present disclosure may configure the dual connectivity, which includes a split RB, with the first BS and the second BS, and may receive DL data through the first BS and the second BS. In transmitting UL data, the UE may transmit the UL data only to the particular BS (e.g., second BS).

Figure 22:
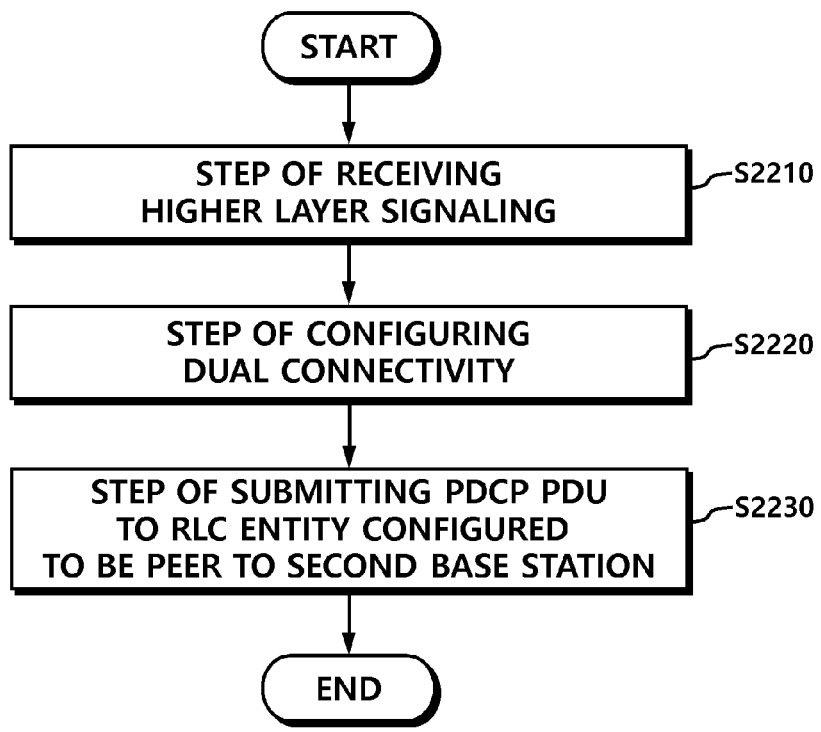
FIG. 22 is a flowchart illustrating an operation of a user equipment according to still another embodiment of the present disclosure.

FIG. 22 is a flowchart illustrating an operation of a UE according to still another embodiment of the present disclosure.

A method for transmitting UL data by the UE, according to still another embodiment of the present disclosure, may include: receiving higher layer signaling including information for configuring dual connectivity with the first BS and the second BS; configuring the dual connectivity with the first BS and the second BS based on the higher layer signaling; and submitting, by a PDCP entity, a PDCP PDU of each of one or more RBs to an RLC entity configured to be a peer to a particular BS (e.g., second BS) based on the higher layer signaling.

Referring to FIG. 22, in step S2210, the UE may receive higher layer signaling including information for configuring dual connectivity with the first BS and the second BS. As an example, the higher layer signaling may include an index or distinguishing information for identifying a UL cell or a UL BS in order to transmit UL data to the particular BS (e.g., second BS). Specifically, the higher layer signaling may include one or more pieces of information among an index, an identifier, and distinguishing information according to the above-described respective embodiments of the present disclosure. Also, the higher layer signaling may include RadioResourceConfigDedicated and may be an RRC reconfiguration message.

In step S2220, the UE may configure dual connectivity with the first BS and the second BS on the basis of the higher layer signaling. For example, the UE may configure one or more RLC entities in order to configure dual connectivity with multiple BSs connected through a non-ideal backhaul, and may configure a dedicated RB between the UE and each of the multiple BSs and may configure a split RB between the UE and the multiple BSs.

Thereafter, in step S2230, a step of submitting, by the PDCP entity of the UE, a PDCP PDU of each of one or more RBs to the RLC entity configured to be a peer to the particular BS (e.g., second BS) based on the higher layer signaling, may be further included. For example, the one or more RBs may be an RB configured to be split at the first BS and the second BS. Specifically, when the PDCP entity of the UE transmits UL user plane data, one PDCP entity may submit a PDCP PDU to an RLC entity within the UE which is configured to be a peer to an RLC entity of the particular BS (e.g., second BS). Accordingly, the UE may transmit UL data only to the second BS.

Also, after the step of submitting the PDCP PDU to the RLC entity, the UE may further include a step of performing an LCP procedure by a MAC entity configured to be a peer to the second BS. The LCP procedure may perform an LCP process on logical channels to deliver UL data through the second BS.

In addition, the UE may perform operations required by the above-described respective embodiments of the present disclosure.

Figure 23:
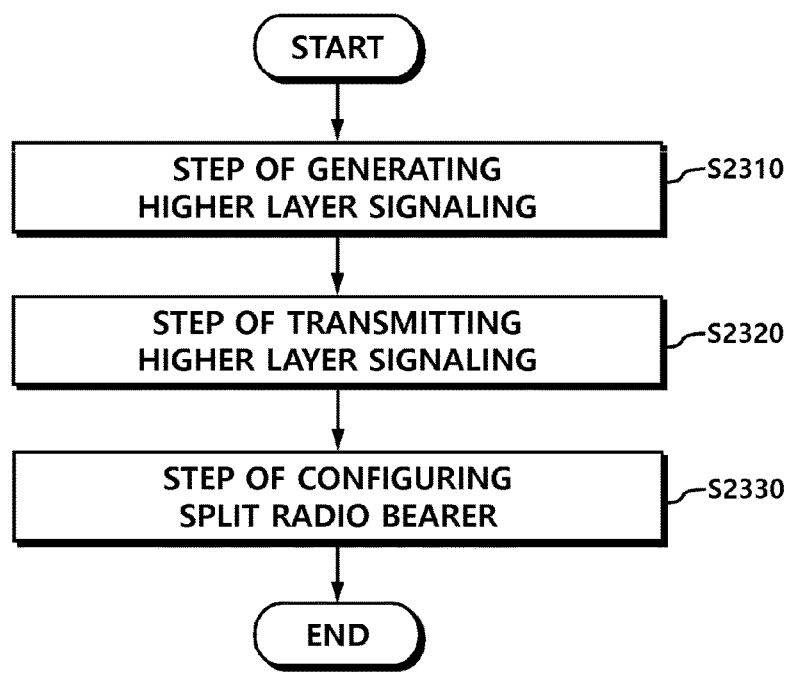
FIG. 23 is a flowchart illustrating an operation of a base station according to still another embodiment of the present disclosure.

FIG. 23 is a flowchart illustrating an operation of a BS according to still another embodiment of the present disclosure.

A method of the first BS for controlling transmission of UL data by the UE, according to still another embodiment of the present disclosure, may include: generating higher layer signaling including information for configuring dual connectivity to the UE; transmitting the higher layer signaling to the UE; and configuring a split RB for the UE.

Referring to FIG. 23, in step S2310, the first BS may generate higher layer signaling including information for configuring dual connectivity to the UE. For example, the higher layer signaling may further include an index or distinguishing information for identifying a UL cell or a UL BS in order to transmit UL data to a particular BS (e.g., second BS). Also, the higher layer signaling may include one or more pieces of information among an index, an identifier, and distinguishing information according to the above-described respective embodiments of the present disclosure.

In step S2320, the first BS may transmit the generated higher layer signaling to the UE. For example, the higher layer signaling may include RadioResourceConfigDedicated, and may be transmitted as an RRC reconfiguration message.

The first BS together with the second BS may configure dual connectivity to the UE, and may configure a split RB in step S2330. For example, the first BS may configure dual connectivity to the UE, and may configure a split RB and/or a dedicated RB as illustrated in FIGS. 6 and 7. The UE may configure dual connectivity on the basis of information of the higher layer signaling received from the first BS, and may transmit UL data of a split RB only to the particular BS (e.g., second BS).

In addition, the BS may perform operations required by the above-described respective embodiments of the present disclosure.

Figure 24:
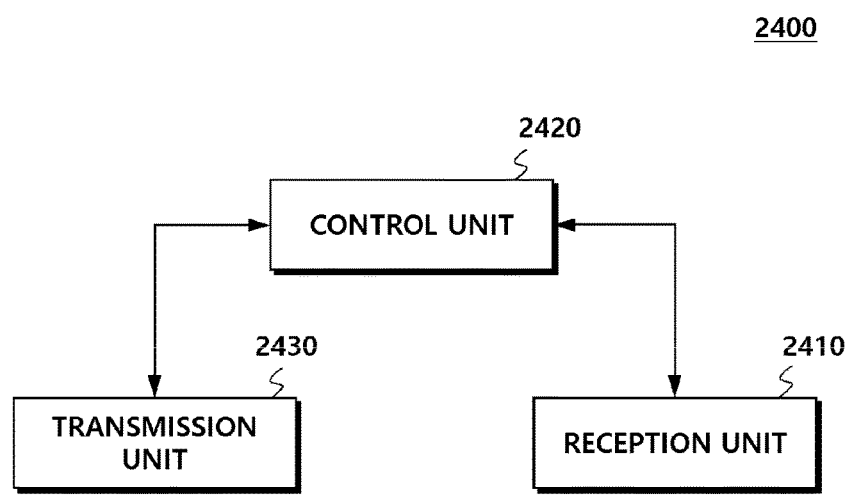
FIG. 24 is a view illustrating a configuration of the user equipment according to still another embodiment of the present disclosure.

FIG. 24 is a view illustrating a configuration of the UE according to still another embodiment of the present disclosure.

The UE 2400 according to still another embodiment of the present disclosure may include: a reception unit 2410 configured to receive higher layer signaling including information for configuring dual connectivity with the first BS and the second BS; and a control unit 2420 configured to configure the dual connectivity with the first BS and the second BS on the basis of the higher layer signaling, and control a PDCP entity to submit a PDCP PDU of each of one or more RBs to an RLC entity configured to be a peer to a particular BS (e.g., second BS) on the basis of the higher layer signaling.

Referring to FIG. 24, the UE 2400 according to still another embodiment of the present disclosure includes the reception unit 2410, the control unit 2420, and a transmission unit 2430.

The reception unit 2410 may receive higher layer signaling, DL control information and DL data, and a message from a BS through a relevant channel. For example, the higher layer signaling may include an index or distinguishing information for identifying a UL cell or a UL BS in order to transmit UL data to the particular BS (e.g., second BS). Specifically, the higher layer signaling may include one or more pieces of information among an index, an identifier, and distinguishing information according to the above-described respective embodiments of the present disclosure. Also, the higher layer signaling may include RadioResourceConfigDedicated, and may be an RRC reconfiguration message.

When multiple BSs configure dual connectivity to the UE in a mobile communication network required by the above-described respective embodiments of the present disclosure, the control unit 2420 controls an overall operation of the UE according to the delivery of UL traffic and DL traffic in such a manner as to cause a UL traffic path to differ from a DL traffic path. Also, the control unit 2420 may configure an RB configured to be split at the first BS and the second BS. Further, the control unit 2420 may control the PDCP entity of the UE to submit a PDCP PDU of each of one or more RBs to the RLC entity configured to be a peer to the particular BS (e.g., second BS) on the basis of the higher layer signaling. For example, the one or more RBs may be an RB configured to be split at the first BS and the second BS. Specifically, the control unit 2420 may control one PDCP entity to submit a PDCP PDU to an RLC entity within the UE which is configured to be a peer to an RLC entity of the particular BS (e.g., second BS).

Also, the control unit 2420 may control a MAC entity, which is configured to be a peer to the second BS, to perform an LCP procedure. For example, the control unit 2420 may control the MAC entity to perform the LCP procedure on logical channels to deliver UL data through the second BS.

The transmission unit 2430 transmits UL control information and UL data, and a message to the BS through a relevant channel. In this case, the transmission unit 2430 may transmit UL data of a split RB only to the particular BS (e.g., second BS).

Figure 25:
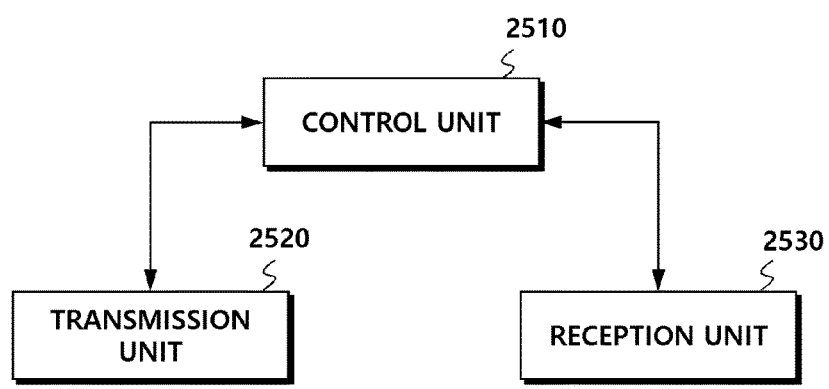
FIG. 25 is a view illustrating a configuration of the base station according to still another embodiment of the present disclosure.

FIG. 25 is a view illustrating a configuration of the BS according to still another embodiment of the present disclosure.

The first BS 2500 according to still another embodiment of the present disclosure may include: in controlling transmission of UL data by the UE, a control unit 2510 configured to generate higher layer signaling including information for configuring dual connectivity to the UE; and a transmission unit 2520 configured to transmit the higher layer signaling to the UE, wherein the control unit 2510 may perform a control operation for configuring a split RB for the UE.

Referring to FIG. 25, the BS 2500 according to still another embodiment of the present disclosure includes the control unit 2510, the transmission unit 2520, and a reception unit 2530.

When multiple BSs configure dual connectivity to the UE in a mobile communication network required by the above-described respective embodiments of the present disclosure, the control unit 2510 controls an overall operation of the BS according to a case where the dual connectivity is configured to cause a UL traffic path to differ from a DL traffic path.

Also, the control unit 2510 may generate higher layer signaling including information for configuring dual connectivity to the UE. For example, the higher layer signaling may further include an index or distinguishing information for identifying a UL cell or a UL BS in order to transmit UL data to a particular BS (e.g., second BS). Also, the higher layer signaling may include one or more pieces of information among an index, an identifier, and distinguishing information according to the above-described respective embodiments of the present disclosure. Further, the control unit 2510 may configure a split RB between the second BS and the UE. Alternatively, the control unit 2510 may configure a dedicated RB and a split RB together.

The transmission unit 2520 transmits the generated higher layer signaling to the UE. As an example, the higher layer signaling may include RadioResourceConfigDedicated, and may be transmitted as an RRC reconfiguration message. Also, the transmission unit 2520 may transmit DL data to the UE.

The reception unit 2530 is used to receive a signal, a message, or data, which is required by the above-described present disclosure, from the UE. In this regard, UL data from the UE may be transmitted through the particular BS (e.g., second BS) and may be transmitted to the first BS. When the particular BS is the first BS, UL data from the UE may be transmitted only to the first BS.

The above-described present disclosure is advantageous in that the UE can transmit UL data traffic through a particular BS in an environment where the UE configures dual connectivity with multiple BSs. For example, UL data can be transmitted through the UE and the second BS, wherein path loss between the UE and the second BS is small. Accordingly, the present disclosure is advantageous in that the power consumption of the UE can be reduced and the transmission speed of UL data can also be improved. As another example, the present disclosure is advantageous in that UL data can be transmitted through the first BS having wide coverage and accordingly, mobility performance can be improved.

Also, the present disclosure is advantageous in that a UL buffer status report and an LCP procedure are performed only for a particular cell or a particular BS even in a dual connectivity structure.

A Method for Transmitting a Buffer Status Report for UL Transmission by a UE

Hereinafter, a case will be described in which a UE transmits buffer status information for UL transmission in communicating with a BS. The UE according to still another embodiment of the present disclosure i) configures an RB between the UE and one or more BSs and ii) transmits buffer status information in order to perform UL transmission. Also, a first embodiment and a second embodiment described hereinafter signify respective embodiments of a method for transmitting a buffer status report for UL transmission by the UE according to the present disclosure and signify embodiments different from the above-described first embodiment and second embodiment for UL transmission according to the present disclosure.

Figure 26:
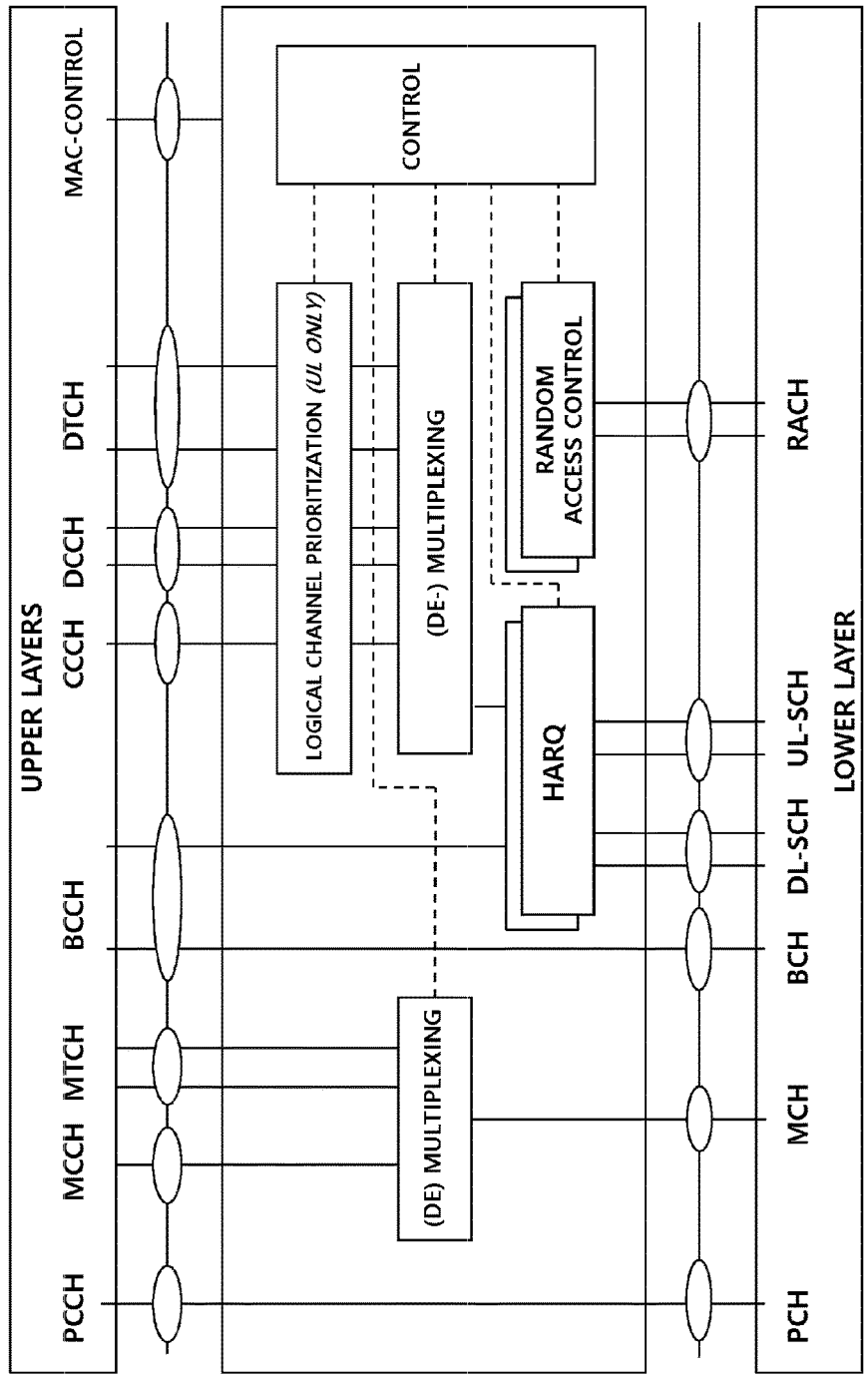
FIG. 26 is a view illustrating an example of a Media Access Control (MAC) architecture of a typical user equipment.

FIG. 26 is a view illustrating an example of a MAC architecture of a typical UE.

Referring to FIG. 26, a MAC layer may perform multiple functions. For example, the MAC layer may perform mapping between logical channels and transport channels. Also, the MAC layer may perform a function of multiplexing MAC Service Data Units (SDUs) into Transport Blocks (TBs) delivered from one logical channel or different logical channels to transport channels of a physical layer. Also, the MAC layer may perform a function of demultiplexing MAC SDUs from TBs delivered from one logical channel or different logical channels to transport channels of the physical layer. In addition, the MAC layer may perform functions, such as error correction through LCP and HARQ and the like. Further, each logical channel type may be defined according to the type of transmitted information. In one MAC layer entity, one RB is mapped to one logical channel. Hereinafter, aggregation technology between BSs connected to a non-ideal backhaul will be described as an example with reference to the accompanying drawings.

Figure 27:
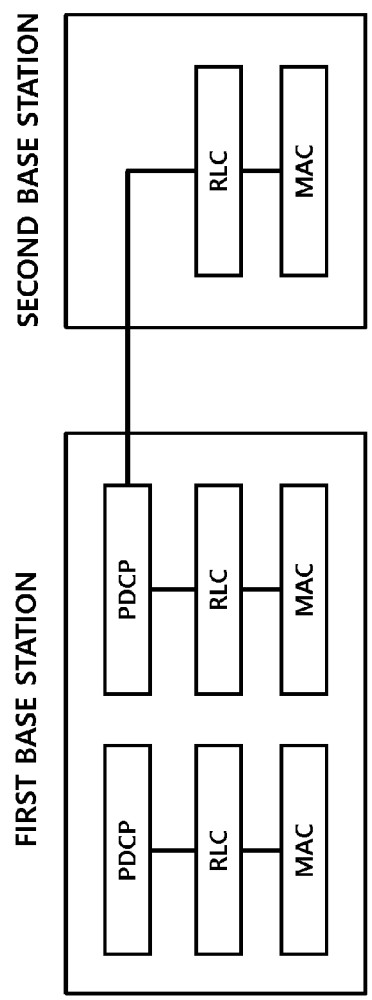
FIG. 27 is a view illustrating an example of a bearer split user plane structure.
Figure 28:
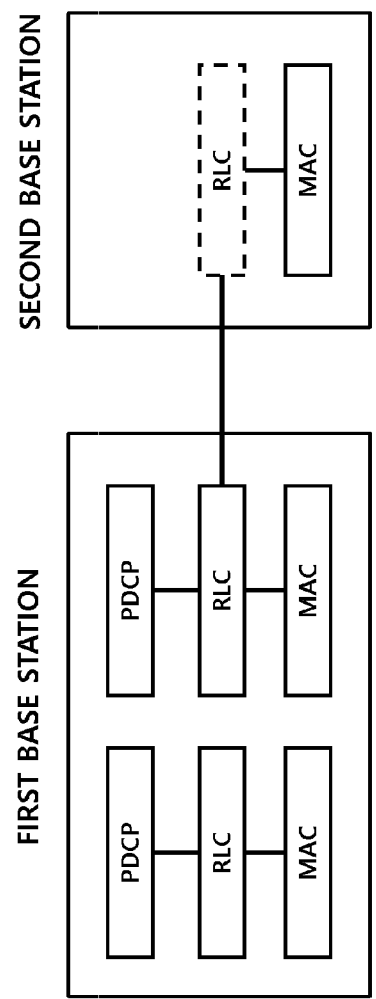
FIG. 28 is a view illustrating another example of a bearer split user plane structure.

FIG. 27 and FIG. 28 are views illustrating respective examples of a bearer split user plane structure.

Referring to FIG. 27 and FIG. 28, even when BSs have a non-ideal backhaul therebetween, radio resources of multiple BSs may be aggregated, and the aggregated radio resources may be used in order to transmit a bearer. Each BS needs to have an independent scheduler in order to perform efficient radio resource scheduling in a non-ideal backhaul environment. As an example, when a first BS (e.g., a macro cell BS, a master BS, or an MeNB) and a second BS (e.g., a small cell BS, a secondary BS, or an SeNB) are used to transmit one RB, an RLC entity and a MAC entity of each of the first BS and the second BS may be configured for a particular RB.

As an example, referring to FIG. 27, the first BS has one PDCP entity, one RLC entity, and one MAC entity for a particular RB in a bearer split structure in which one RB is split over the first BS and the second base station. Also, the second BS may have an RLC entity and a MAC entity for the relevant RB. Hereinafter, an RB (e.g., a right RB illustrated in FIG. 27) provided to each of the first BS and the second BS through an RLC entity and a MAC entity is referred to as a "split RB" as in the case of FIG. 6.

As another example, referring to FIG. 28, with respect to a bearer, the first BS may be separated from an RLC entity. Even in this case, the first BS may have one PDCP entity, one RLC entity, and one MAC entity for a particular RB. Also, in a bearer configured to be split, the second BS may have one MAC entity for the relevant RB separately from the first BS. As still another example, the second BS may further have an RLC entity.

A buffer status report procedure is a procedure used to provide information on data available for transmission from UE UL buffers to a serving cell BS. A specific buffer status report procedure is described in 3GPP TS 36.321, section 5.4.4. A Buffer Status Report (BSR) needs to be triggered when the following event occurs.

UL data becomes available for one logical channel belonging to one Logical Channel Group (LCG) in order to perform transmission in an RLC entity or a PDCP entity. Also, the data belongs to an optional LCG, and belongs to one logical channel having a higher priority than a priority of logical channels for already available data. Alternatively, no data is available for an optional logical channel from among logical channels belonging to one LCG. A BSR in this case is referred to as a "regular BSR."

A BSR, which is allocated UL resources and in a case where the number of padding bits is greater than or equal to a size obtained by adding a subheader of the BSR to a MAC control element thereof, is referred to as a "Padding BSR."

A BSR in a case where retxBSR-Timer representing a retransmission BSR timer expires and the UE has data available for transmission through an optional logical channel from among logical channels belonging to an LCG, is also referred to as a "regular BSR."

A BSR in a case where periodBSR-Timer representing a periodic BSR timer expires is referred to as a periodic BSR."

One MAC PDU may include at most one MAC BSR control element.

The UE needs to transmit at most one regular/periodic BSR within one Transmission Time Interval (TTI). When the UE has been requested to transmit multiple MAC PDUs within one TTI, the UE may include a padding BSR in an optional MAC PDU from among MAC PDUs which do not include a regular/periodic BSR.

All BSRs transmitted within one TTI always represent a buffer status after all MAC PDUs are generated with respect to the TTI. Each LCG needs to report at most one buffer status value per TTI. Also, the value needs to be reported in a state of being included in all BSRs which report buffer statuses of an LCG.

The above-described data available for transmission will be described in more detail below.

For the purpose of buffer status reporting of a MAC layer, the UE needs to consider the following elements as an amount of data available for transmission in an RLC layer.

considers RLC SDUs or segments which are not yet included in an RLC data PDU.

considers RLC data PDUs (RLC AM) which are pending for retransmission.

Meanwhile, for the purpose of buffer status reporting of the MAC layer, the UE needs to consider PDCP control PDUs and the following element as an amount of data available for transmission in a PDCP layer.

When there is an SDU which is not yet processed by a PDCP with respect to an SDU of which a PDU is not submitted to a lower layer, the UE considers the SDU itself. Also, when there is an SDU which is processed by the PDCP with respect to the SDU of which the PDU is not submitted to the lower layer, the UE considers the PDU.

Except for SDUs, of which successful delivery is represented by a PDCP status report, when there is an SDU which is not yet processed by the PDCP with respect to an SDU, of which a relevant PDU is only submitted to the lower layer before PDCP re-establishment, starting from a first SDU for delivering the relevant PDUs which are not confirmed by the lower layer, the UE considers the SDU itself. Also, when there is an SDU which is processed by the PDCP, the UE considers the PDU.

A particular bearer, such as the right bearer (a split RB) from among the bearers illustrated in FIG. 27 or FIG. 28, may be configured in such a manner that the first BS terminates an S1 user plane (S1-U) interface with respect to one bearer and one bearer is processed through the first BS and the second BS by using a bearer split user plane structure. Also, a bearer configured to be split may have a scheduler in multiple BSs in order to transmit one bearer.

As described above, an amount of data available for transmission, which is provided through the existing buffer status reporting in order to perform UL transmission, is calculated by adding up an amount of data available for transmission in the RLC layer and that in the PDCP layer.

Accordingly, a problem may occur during reporting of a buffer status by the UE, when as in the case of the particular bearer configured to be split as illustrated in FIG. 27 or FIG. 28, one bearer is configured to be processed by the first BS through the first BS and the second BS by using the bearer split user plane structure. For example, the amount of data available for transmission in the PDCP layer may be calculated in an overlapping manner when a UL buffer through the first BS is calculated and when a UL buffer through the second BS is calculated. Accordingly, when the first BS performs UL scheduling, or when the second BS performs UL scheduling, excessive scheduling may occur as compared with the total amount of UL buffers of the UE. Specifically, multiple BSRs include information on data available for transmission, which is included in one PDCP entity, in an overlapping manner. Accordingly, a problem may arise in that information on actual data available for transmission cannot be accurately transmitted to the BS.

In summary, even when different BSs are connected through a non-ideal backhaul as described above, radio resources may be aggregated by multiple BSs and data may be transmitted through the aggregated radio resources. Also, an individual BS needs a separate scheduler in order to transmit one bearer.

At this time, when a particular bearer is configured to be processed by the first BS through the first BS and the second BS by using a bearer split user plane structure, an amount of data available for transmission in the PDCP layer is calculated in an overlapping manner when the UE calculates a UL buffer through the first BS and when the UE calculates a UL buffer through the second BS. Accordingly, scheduling exceeding the total amount of UL buffers of the UE may be caused, and thus a problem may arise in that radio resources are wasted.

The present disclosure devised to solve the above-described problems provides a method for enabling a BSR to be accurate even when a particular bearer configured to be split is configured in such a manner that different BSs aggregate radio resources through a separate scheduler and transmit data through the aggregated radio resources. For example, a method which enables the UE to report, to each BS, data available for transmission corresponding to the total amount of UL buffers of logical channels of a relevant RB and thereby enables the efficient use of radio resources.

Figure 29:
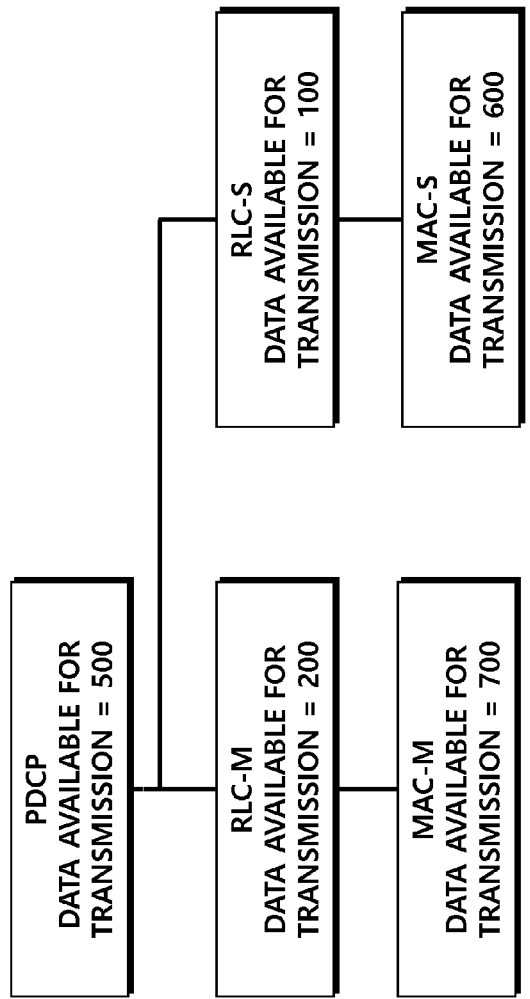
FIG. 29 is a view illustrating an example of data available for transmission of a logical channel mapped to a split radio bearer within a user equipment for describing the present disclosure.

FIG. 29 is a view illustrating an example of data available for transmission of a logical channel mapped to a split RB within a UE for describing the present disclosure.

As illustrated in FIG. 29, with respect to a split RB, the UE has an RLC entity (RLC-Master (RLC-M)) within the UE, which is a peer to an RLC entity of a master BS, and an RLC entity (RLC-Secondary (RLC-S)) within the UE which is a peer to an RLC entity of a secondary BS. Also, the UE has a MAC entity (MAC-Master (MAC-M)) within the UE, which is a peer to a MAC entity of the master BS, and a MAC entity (MAC-Secondary (MAC-S)) within the UE which is a peer to a MAC entity of the secondary BS.

Referring to FIG. 29, in an existing method for calculating data available for transmission, a MAC layer of the UE, a MAC entity thereof, or a logical channel mapped to the MAC entity thereof may add up and calculate an amount of data available for transmission in a higher layer, and thus may excessively request a BSR. For example, the UE may transmit a BSR to each BS. In this case, the MAC entity (MAC-M) within the UE which is a peer to the MAC entity of the master BS may include, in a BSR transmitted to the first BS, information on data available for transmission which is 700 obtained by adding up 500, which is data available for transmission of a PDCP entity, and 200 which is data available for transmission of the RLC entity (RLC-M) which is a peer to the RLC entity of the first BS. Similarly, the MAC entity (MAC-S) within the UE which is a peer to the MAC entity of the secondary BS may include, in a BSR transmitted to the second BS, information on data available for transmission which is 600 obtained by adding up 500, which is the data available for transmission of the PDCP entity, and 100 which is an amount of data available for transmission in an RLC (RLC-S) layer. Accordingly, it is problematic that data available for transmission, which is 500, is excessively transmitted as compared with 800 (500+200+100) which is a total of amount of data available for transmission included in the respective layers of the UE.

In order to solve the above-described problems, the present disclosure provides a method for efficiently reporting a BSR according to respective embodiments of the present disclosure proposed hereinafter. Hereinafter, for convenience of description, the description will be mainly made of, for example, a logical channel mapped to a split RB, and a similar method may be applied to not only a logical channel but also an LCG.

Also, PDCP buffer status information signifies an amount of data available for transmission in a PDCP layer.

Figure 30:
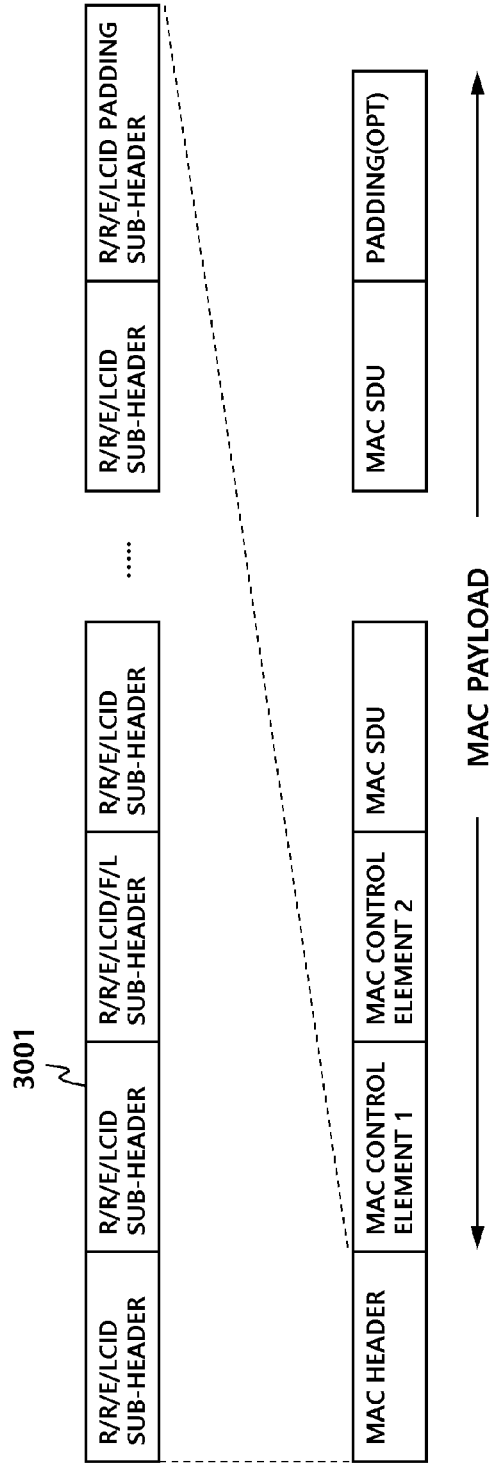
FIG. 30 is a view illustrating an example of a configuration of a MAC Protocol Data Unit (PDU) according to an embodiment of the present disclosure.

First Embodiment: a Method for Transmitting PDCP Buffer Status Information of a Logical Channel Mapped to a Split RB in Such a Manner as to Distinguish the PDCP Buffer Status Information from a BSR FIG. 30 is a view illustrating an example of a configuration of a MAC PDU according to an embodiment of the present disclosure.

Referring to FIG. 30, a MAC PDU includes one MAC header, 0 or more MAC SDUs, and 0 or more MAC control elements, and selectively includes padding.

A MAC PDU header includes one or more MAC PDU subheaders 3001. Each of the MAC PDU subheaders 3001 corresponds to a MAC SDU, a MAC control element, or padding.

A Logical Channel ID (LCID) field included in the MAC header identifies a logical channel instance of a corresponding MAC SDU, the type of a corresponding MAC control element, or the type of padding.

The UE according to the first embodiment of the present disclosure may transmit, to a BS, PDCP buffer status information on a logical channel or an LCG mapped to a split RB in such a manner as to distinguish the PDCP buffer status information from a BSR.

For example, in the case of a split RB configured in such a manner as to split one or more bearers such as the particular bearer illustrated in FIG. 27 or FIG. 28, buffer status information, which includes PDCP buffer size information of a logical channel (or an LCG including logical channels) mapped to the relevant split RB, may be separately transmitted to a BS. As an example, the PDCP buffer status information may be delivered through a MAC control element. To this end, a separate LCID value may be defined. The separate LCID value may be defined as exemplarily illustrated in FIG. 31.

FIG. 31 is a view illustrating an example of a LCID value for a UL-SCH according to another embodiment of the present disclosure.

As illustrated in FIG. 31, the UE may transmit PDCP buffer status information to the first BS and/or the second BS. Accordingly, the PDCP buffer status information may not be included in a BSR in an overlapping manner, but may be separately transmitted, so that information on accurate data available for transmission can be delivered.

As an example, the PDCP buffer status information may be included in a MAC control element and the MAC control element including the PDCP buffer status information may be transmitted to the first BS and/or the second BS. Specifically, formats of the MAC control element of the PDCP buffer status information may be divided into a PDCP Short BSR format, a PDCP Truncated BSR, and a PDCP Long BSR format. That is, a PDCP BSR may be transmitted by using a BSR format, and may be distinguished from an existing BSR by using a particular index.

FIG. 32 is a view illustrating an example of each PDCP BSR MAC control element format.

Referring to FIG. 32, the UE may transmit the PDCP buffer status information to the first BS and/or the second BS. In this case, the UE may transmit the PDCP buffer status information by using a BSR format. In order to distinguish the PDCP buffer status information from the existing BSR, a BSR, which is transmitted in a state of including only the PDCP buffer status information, may be distinguished from another by using a separate index as illustrated in FIG. 31.

Specifically, for example, a PDCP Short BSR/PDCP Truncated BSR format 3200 includes an LCG ID field and a corresponding buffer size field, as illustrated in FIG. 32. The LCG ID field is a field for identifying an LCG, on which buffer status information is to be reported, and may be configured to have a two-bit length.

Meanwhile, as illustrated in FIG. 32, the PDCP Long BSR format may include four buffer size fields (indicated by reference numerals 3210, 3220 and 3230) corresponding to respective LCG IDs #0 to #3. Although the buffer size field is configured to have 6 bits as an example in FIG. 32, a level different from that of the existing BSR may be applied to a PDCP BSR, and thereby the buffer size field may be designed to have a length less than 6 bits. For example, the buffer size field may be designed to have 3 bits which may have 8 indices, 4 bits which may have 16 indices, and 5 bits which may have 32 indices, and the like.

As an example, the buffer size field illustrated in FIG. 32 may include information on a total of amount of data available for transmission in a PDCP layer for a logical channel (or an LCG including bearer split logical channels) mapped to a split RB through the first BS and the second BS.

In this case, a BS, which has received the PDCP buffer status information, may estimate an amount of data available for transmission in a PDCP layer which may be processed through each BS. As an example thereof, the BS may calculate an amount of data available for transmission in a PDCP layer, which may be processed through each BS, by multiplying a distribution ratio of distribution to an RLC layer (or entity) which is a peer to the first BS and an RLC layer (or entity) which is a peer to the second BS in the PDCP layer (or entity) within the UE. Specifically, a total of amount of data available for transmission in the PDCP layer may be distributed according to the distribution ratio, and thereby buffer status information of the PDCP layer, which needs to be processed by each BS, may be confirmed. Each of the first BS and the second BS may subtract the value of the above-described PDCP buffer status information, which needs to be processed by each BS, from an existing BSR (a Short BSR, a Truncated BSR, or a Long BSR) calculated by adding up an amount of data available for transmission in an RLC layer and that in a PDCP layer, and thereby may confirm an amount of data available for transmission in the RLC layer of each BS. Accordingly, each BS may add up the above-described an amount of data available for transmission in the RLC layer for each BS and the amount of data available for transmission in the PDCP layer which is distributed according to the distribution ratio, and thereby may confirm data available for transmission to be transmitted in UL through each BS. Each BS may calculate actual UL radio resources (UL grant) to be scheduled through each BS by using the above-described method, and may allocate UL radio resources which need to be provided through each BS.

The distribution ratio of the distribution to the RLC layer (or entity) which is a peer to the first BS and the RLC layer (or entity) which is a peer to the second BS in the PDCP layer (entity) within the UE, may be statically preset by the first BS and the second BS. For example, the distribution ratio may be set when the first BS configures dual connectivity for a split RB to the UE through signaling between the first BS and the second BS. Alternatively, the distribution ratio may be dynamically changed according to radio quality, and may be exchanged periodically or according a particular event by using signaling through an interface between the first BS and the second BS. When the distribution ratio is dynamically calculated, the distribution ratio may be exchanged together with one or more pieces of information among a calculation cycle during which the distribution ratio is calculated, a change cycle during which the distribution ratio is changed, and a trigger condition for interface signaling. When the distribution ratio of the distribution to the RLC layer (or entity) which is a peer to the first BS and the RLC layer (or entity) which is a peer to the second BS in the PDCP layer (entity) within the UE is dynamically changed, the first BS or the second BS may provide the one or more pieces of information to the UE through RRC signaling or MAC signaling.

As another example, the buffer size field illustrated in FIG. 32 may include ratio information for calculating a total of amount of data available for transmission in a PDCP layer for a logical channel (or an LCG including bearer split logical channels) of a split RB through the first BS and the second BS.

In this case, the BS, which has received the PDCP buffer status information, may calculate the total of the amount of data available for transmission in the PDCP layer by multiplying a ratio for calculating a total of amount of data available for transmission in the PDCP layer in an existing BSR (a Short BSR, a Truncated BSR, or a Long BSR) calculated by adding up amount of data available for transmission in an RLC layer and that in the PDCP layer. Thereafter, the BS may subtract the amount of data available for transmission in the PDCP layer from the existing BSR (the Short BSR, the Truncated BSR, or the Long BSR) calculated by adding up the amount of data available for transmission in the RLC layer and that in the PDCP layer, and thereby may detect the amount of data available for transmission in the RLC layer. Accordingly, each BS may calculate actual UL radio resources (UL grant) to be scheduled through each BS, by adding up the amount of data available for transmission in the RLC layer and that in the PDCP layer which need to be processed through each BS. Each BS, which has calculated the UL radio resources, may allocate the UL radio resources which need to be provided through each BS. The above-described distribution ratio of distribution to the RLC layer (or entity) which is a peer to the first BS and the RLC layer (or entity) which is a peer to the second BS in the PDCP layer (or entity) within the UE, may be statically preset by the first BS and the second BS. For example, the distribution ratio may be set when the first BS configures dual connectivity for a split RB to the UE through signaling between the first BS and the second BS. Alternatively, the distribution ratio may be dynamically changed according to radio quality, and may be exchanged periodically or according a particular event by using signaling through an interface between the first BS and the second BS. When the distribution ratio is dynamically calculated, the distribution ratio may be exchanged together with one or more pieces of information among a calculation cycle during which the distribution ratio is calculated, a change cycle during which the distribution ratio is changed, and a trigger condition for interface signaling. When the distribution ratio of the distribution to the RLC layer (or entity) which is a peer to the first BS and the RLC layer (or entity) which is a peer to the second BS in the PDCP layer (entity) within the UE is dynamically changed, the first BS or the second BS may provide the one or more pieces of information to the UE through RRC signaling or MAC signaling.

As described above, in the first embodiment of the present disclosure, the UE may transmit the PDCP buffer status information related to the amount of data available for transmission in the PDCP layer, separately from the existing BSR.

Second Embodiment: a Method of a UE for Calculating Data Available for Transmission for Each BS According to a Distribution Ratio and Transmits the Data Available for Transmission When one or more bearers are configured as a split RB as in the case of the particular bearer illustrated in FIG. 27 or FIG. 28, the above-described data available for transmission of the logical channel (or the LCG) mapped to the split RB may be calculated in such a manner as to distinguish between BSs and may be reported through a MAC Control Element (CE) of an existing BSR (a Short BSR, a Truncated BSR, or a Long BSR).

To this end, when the UE calculates an amount of data available for transmission in a PDCP layer with respect to a logical channel (or an LCG) mapped to a split RB configured to process data through the first BS and the second BS by using a bearer split user plane structure, the UE may calculate the data available for transmission, in view of a distribution ratio of distribution to an individual BS together with the existing amount of data available for transmission in the PDCP layer.

As an example, the UE may calculate buffer status information (e.g., an amount of data available for transmission) of a PDCP layer for each BS (or for each cell group) in proportion to UL grant information within a relevant TTI received for each BS with respect to the logical channel (or the LCG) mapped to the split RB configured to process data through the first BS and the second BS (or through one or more BSs) by using the bearer split user plane structure. Alternatively, the UE may calculate the buffer status information (e.g., an amount of data available for transmission) of the PDCP layer for each BS (or for each cell group) on the basis of an average of UL grants which is calculated during a previous or recent period which is a multiple of a TTI. Specifically, the UE may calculate the buffer status information of the PDCP layer for each BS (or for each cell group), by multiplying the existing amount of data available for transmission in the PDCP layer for the relevant logical channel by a ratio of a UL grant (or an average value of UL grants which is calculated during a previous (recent) period which is a multiple of a TTI) within a relevant TTI received by each BS. For example, when a UL grant from the first BS is "a" and a UL grant from the second BS is "b," the UE may calculate buffer status information of a PDCP layer of the first BS by multiplying a total of amount of data available for transmission in the PDCP layer by a/(a+b) which is a UL grant ratio. Alternatively, in the above-described method for calculating buffer status information of a PDCP layer for each BS (or for each cell group), a DL assignment is used instead of a UL grant, or the sum of the UL grant and the DL assignment may be used. To this end, TTI cycle information for calculating the amount of data available for transmission in the PDCP layer for each BS (or for each cell group) and/or information for representing the amount of data available for transmission in the PDCP layer for each BS (or for each cell group) may be included in radio resource configuration dedicated information of an RRC message, or logical channel configuration information included in the radio resource configuration dedicated information thereof, or MAC-MainConfig configuration information included in the radio resource configuration dedicated information thereof. Alternatively, the above-described information for calculating the amount of data available for transmission in the PDCP layer may be preset for the UE.

As another example, the UE may calculate buffer status information (data available for transmission) for each BS of a PDCP layer in proportion to a UL grant provided during periodicBSR-Timer included in a MAC-MainConfig information element for each BS with respect to a logical channel (or an LCG) mapped to a split RB configured to process data through the first BS and the second BS (or through one or more BSs) by using a bearer split user plane structure. Alternatively, the UE may calculate the buffer status information (data available for transmission) for each BS (or for each cell group) of the PDCP layer in proportion to a UL grant provided during retxBSR-Timer included in the MAC-MainConfig information element. Alternatively, the UE may receive new information (e.g., a calculation cycle) required to calculate a ratio through an RRC message, and may calculate the buffer status information (data available for transmission) for each BS (or for each cell group) of the PDCP layer in proportion to a UL grant calculated according to the relevant information. That is, the UE may calculate the amount of data available for transmission in the PDCP layer for each BS (or for each cell group) by multiplying the existing amount of data available for transmission in the PDCP layer for the relevant logical channel by a ratio of a UL grant provided during periodicBSR-Timer or retxBSR-Timer for each BS. Specifically, as an example of the calculation method, when a UL grant from the first BS is "a" and a UL grant from the second BS is "b" during the above-described period, the UE may calculate an amount of data available for transmission in a PDCP layer of the first BS by multiplying a total of amount of data available for transmission in a PDCP layer by a ratio of a/(a+b). Alternatively, a DL assignment may be used instead of the above-described UL grant, or the sum of the UL grant and the DL assignment may be used. To this end, cycle information for calculating the amount of data available for transmission in the PDCP layer for each BS (or for each cell group) and/or information for representing the amount of data available for transmission in the PDCP layer for each BS (or for each cell group) may be included in radio resource configuration dedicated information of an RRC message, logical channel configuration information included in the radio resource configuration dedicated information thereof, or MAC-MainConfig configuration information included in the radio resource configuration dedicated information thereof. Alternatively, the above-described information for calculating the amount of data available for transmission in the PDCP layer may be preset for the UE.

When dual connectivity to the UE is configured, the above-described MAC-MainConfig information element for each BS may include an individual configuration parameter of a MAC entity of each BS or each cell group. For example, MAC-MainConfig (MAC-MainConfigSeNB or MAC-MainConfigSCG) of a secondary BS may include BSR timers (e.g., periodicBSR-Timer and/or retxBSR-Timer), which are included in MAC-MainConfig of a master BS, and independent BSR timers.

As still another example, the UE may equally distribute the existing amount of data available for transmission in a PDCP layer for a relevant logical channel for each BS (for each cell group) and may calculate buffer status information (data available for transmission) of a PDCP layer for each BS (or for each cell group), with respect to a logical channel (or an LCG) mapped to a split RB configured to process data through the first BS and the second BS (or through one or more BSs) by using a bearer split user plane structure. To this end, information for calculating the amount of data available for transmission in the PDCP layer for each BS (or for each cell group) and/or information for representing the amount of data available for transmission in the PDCP layer for each BS (or for each cell group) may be included in radio resource configuration dedicated information of an RRC message, logical channel configuration information included in the radio resource configuration dedicated information thereof, or MAC-MainConfig configuration information included in the radio resource configuration dedicated information thereof. Alternatively, the above-described information for calculating the amount of data available for transmission in the PDCP layer may be preset for the UE.

As yet another example, the UE may calculate PDCP buffer status information (data available for transmission) for each BS (or for each cell group) based on a ratio calculated based on a radio quality state between the UE and each BS, Radio Resource Management (RRM) measurement information, or the like with respect to the logical channel (or the LCG) mapped to the split RB configured to process data through the first BS and the second BS (or through one or more BSs) by using the bearer split user plane structure. Specifically, the UE may distribute the amount of data available for transmission in a PDCP layer for a relevant logical channel in proportion to or in inverse proportion to a radio quality state or RRM measurement information, and may calculate the amount of data available for transmission in the PDCP layer for each BS (or for each cell group). To this end, one or more pieces of information among information for calculating the amount of data available for transmission in the PDCP layer for each BS (or for each cell group), a calculation cycle, a measurement event, and information for representing the amount of data available for transmission in the PDCP layer for each BS (or for each cell group), may be included in radio resource configuration dedicated information of an RRC message, logical channel configuration information included in the radio resource configuration dedicated information thereof, or MAC-MainConfig configuration information included in the radio resource configuration dedicated information thereof. Alternatively, the above-described pieces of information may be preset for the UE.

As still yet another example, the UE may calculate the amount of data available for transmission in the PDCP layer for each BS (or for each cell group) on the basis of information on data available for transmission of the UE and that in an RLC layer which is a peer to each BS with respect to the logical channel (or the LCG) mapped to the split RB configured to process data through the first BS and the second BS (or through one or more BSs) by using the bearer split user plane structure. Specifically, the UE may distribute amount of data available for transmission in a PDCP layer for a relevant channel in proportion to or in inverse proportion to information on amount of data available for transmission in an RLC layer which is a peer to each of the first BS and the second BS, and may calculate the buffer status information (data available for transmission) of the PDCP layer for each BS. To this end, information for calculating the amount of data available for transmission in the PDCP layer for each BS (or for each cell group) and/or information for representing the amount of data available for transmission in the PDCP layer for each BS (or for each cell group), may be included in radio resource configuration dedicated information of an RRC message, logical channel configuration information included in the radio resource configuration dedicated information thereof, or MAC-MainConfig configuration information included in the radio resource configuration dedicated information thereof. Alternatively, the above-described information for calculating the amount of data available for transmission in the PDCP layer may be preset for the UE.

As further another example, the UE may receive ratio information or method information for distributing the existing amount of data available for transmission in a PDCP layer for a relevant logical channel for each BS (or for each cell group) and may calculate the buffer status information (data available for transmission) of the PDCP layer for each BS, with respect to the logical channel (or the LCG) mapped to the split RB configured to process data through the first BS and the second BS (or through one or more BSs) by using the bearer split user plane structure. Specifically, for example, the UE may receive the above-described ratio information, the above-described distribution method information, or the like through the first BS (master BS), for which an RRC connection is established. Alternatively, the UE may receive the above-described ratio information, the above-described distribution method information, or the like through the second BS (secondary BS) confirmed by the first BS (master BS), for which an RRC connection is established. Alternatively, the UE may receive the above-described ratio information, the above-described distribution method information, or the like through the first BS, and the relevant information may be information that the second BS supporting the first BS transmits through the first BS. To this end, ratio information for calculating the amount of data available for transmission in the PDCP layer for each BS (or for each cell group) and/or information for representing the amount of data available for transmission in the PDCP layer for each BS (or for each cell group), may be included in radio resource configuration dedicated information of an RRC message, logical channel configuration information included in the radio resource configuration dedicated information thereof, or MAC-MainConfig configuration information included in the radio resource configuration dedicated information thereof. Alternatively, the above-described information for calculating the amount of data available for transmission in the PDCP layer may be preset for the UE. Alternatively, a new MAC CE is defined, and the above-described ratio information and the like may be received through the newly-defined MAC CE. For example, the newly-defined MAC CE may be transmitted to the UE through the first BS (or through the first BS after being confirmed by the second BS) for which an RRC connection is established, through the second BS which is confirmed by the first BS, for which the RRC connection is established, and supports the first BS, or through the second BS supporting the first BS.

The UE may deliver/submit data (PDU) to an RLC entity within the UE which is mapped to an RLC entity of each BS in a PDCP layer within the UE on the basis of the ratio information which has received from the BS.

The UE may calculate the PDCP buffer status information for each BS by using the respective methods described as examples hereinabove. The UE may add up the calculated PDCP buffer status information for each BS (or for each cell group) and amount of data available for transmission in an RLC layer which is a peer to each BS and may transmit a BSR to each BS. Specifically, in the second embodiment of the present disclosure, a PDCP buffer status report is not separately transmitted, but is transmitted in a state of being included in an existing BSR. In this regard, the PDCP buffer status information, which is transmitted to each BS in the state of being included in the BSR, is information calculated by the above-described respective methods in such a manner as to distinguish between BSs. A MAC entity for each BS (or for each cell group) within the UE may transmit a BSR to each BS.

Accordingly, each BS may receive data available for transmission, which needs to be processed through each BS, through the BSR, and thereby may efficiently allocate UL radio resources according to buffer size information of the received BSR and can solve the problem of the overlapped transmission of buffer status information of a PDCP layer.

Third Embodiment: a Method for Performing Reporting in Such a Manner that a Method for Calculating Data Available for Transmission is Different for Each BS When one or more bearers are configured as a split RB as in the case of the particular bearer illustrated in FIG. 27 or FIG. 28, data available for transmission of a logical channel (or an LCG) mapped to the above-described split RB may be reported through a MAC CE of an existing BSR (a Short BSR, a Truncated BSR, or a Long BSR) in such a manner that the calculation method is different for each BS.

As an example, the UE may use an existing method for calculating data available for transmission, in order to calculate data available for transmission through a first BS (or a master cell group, or a MAC entity of the first BS, or a MAC entity of the first BS with the UE which is a peer to the MAC entity of the first BS) with respect to a logical channel (or an LCG) mapped to a split RB configured to process data through the first BS and a second BS by using a bearer split user plane structure. Specifically, the UE may perform BSR reporting in such a manner as to add up the existing amount of data available for transmission in a PDCP layer for a relevant logical channel within the UE and an amount of data available for transmission in an RLC layer for the first BS, as data available for transmission through the first BS. Also, the UE may perform BSR reporting by using an amount of data available for transmission in an RLC layer for the second BS within the UE, as data available for transmission through the second BS (or a secondary cell group, a MAC entity of the second BS, or a MAC entity of the second BS within the UE which is a peer to the MAC entity of the second BS). Specifically, a BSR transmitted to the second BS may not include buffer status information (data available for transmission) of a PDCP layer. The UE may determine the buffer status information (data available for transmission) of the PDCP layer according to a radio state (quality), or may configure (process) the buffer status information of the PDCP layer upon receiving information for representing that an amount of data available for transmission in a PDCP layer for a logical channel mapped to a relevant split RB through the first BS, for which an RRC connection is established, is added to data available for transmission through the first BS. To this end, an RRC message or a MAC CE may be used as a message transmitted from the BS to the UE. When the UE is configured in such a manner as to include information on the amount of data available for transmission in the PDCP layer for the split RB in the data available for transmission through the first BS, the UE may submit a PDCP PDU of the relevant split RB only to an RLC entity within the UE which is a peer to an RLC entity of the first BS. Specifically, the UE may transmit UL data of the relevant bearer only through the first BS.

As another example, the UE may use the existing method for calculating data available for transmission, in order to calculate data available for transmission through the second BS (or a secondary cell group, a MAC entity of the second BS, or a MAC entity of the second BS with the UE which is a peer to the MAC entity of the second BS) with respect to the logical channel (or the LCG) mapped to the split RB configured to process data through the first BS and the second BS by using the bearer split user plane structure. Specifically, the UE may perform BSR reporting in such a manner as to add up the existing amount of data available for transmission in a PDCP layer for a relevant logical channel within the UE and an amount of data available for transmission in an RLC layer for the second BS, as data available for transmission through the second BS. Also, the UE may perform BSR reporting by using an amount of data available for transmission in an RLC layer for the first BS within the UE, as data available for transmission through the first BS. Specifically, a BSR transmitted to the first BS may not include buffer status information (data available for transmission) of a PDCP layer. The UE may determine the buffer status information (data available for transmission) of the PDCP layer according to a radio state (quality), or may configure (process) the buffer status information of the PDCP layer upon receiving information for representing that an amount of data available for transmission in a PDCP layer for a relevant logical channel through the first BS, for which an RRC connection is established, (or through the first BS after being confirmed by the second BS), through the second BS which is confirmed by the first BS, for which the RRC connection is established, and supports the first BS, or through the first BS by the second BS supporting the first BS is added to data available for transmission through the second BS. To this end, an RRC message including new information or a newly-defined MAC CE may be used as a message transmitted from the BS to the UE. When the UE is configured in such a manner as to include the amount of data available for transmission in the PDCP layer for the split RB in the amount of data available for transmission through the second BS, the UE may submit a PDCP PDU of the relevant split RB only to an RLC entity within the UE which is a peer to an RLC entity of the second BS. Specifically, the UE may transmit UL data of the relevant bearer only through the second BS.

As still another example, the UE may select a BS which is to first allocate an amount of data available for transmission in a PDCP layer on the basis of a radio quality state between the UE and each BS, RRM measurement information, or the like, with respect to the logical channel mapped to the split RB configured to process data through the first BS and the second BS (or through one or more BSs) by using the bearer split user plane structure. To this end, one or more pieces of information among information on a BS to first allocate an amount of data available for transmission in a PDCP layer, information for selecting the BS to first allocate the an amount of data available for transmission in the PDCP layer, a measurement cycle, a measurement event, and information for representing the amount of data available for transmission in the PDCP layer, may be included in radio resource configuration dedicated information of an RRC message, logical channel configuration information included in the radio resource configuration dedicated information thereof, or MAC-MainConfig configuration information included in the radio resource configuration dedicated information thereof. Alternatively, the above-described pieces of information may be preset for the UE.

Accordingly, each BS may receive data available for transmission, which needs to be processed through each BS, through a BSR, and thereby may efficiently allocate UL radio resources according to a requested buffer size. Specifically, PDCP buffer status information is included only in a BSR transmitted to one of multiple BSs, so that it is possible to solve the problem of transmitting the PDCP buffer status information to the BSs in an overlapping manner.

As described hereinabove, according to at least one embodiment of the present disclosure, even when a particular bearer is configured in such a manner that different BSs aggregate radio resources through a separate scheduler and transmit data through the aggregated radio resources, each BS may allocate radio resources in view of only data available for transmission which is actually required.

Accordingly, the present disclosure is advantageous in that radio resources can be efficiently allocated.

Hereinafter, with reference to the accompanying drawings, a description will be again made of operations of the UE and the BSs, of which the operations required by the above-described respective embodiments of the present disclosure can be performed.

Figure 33:
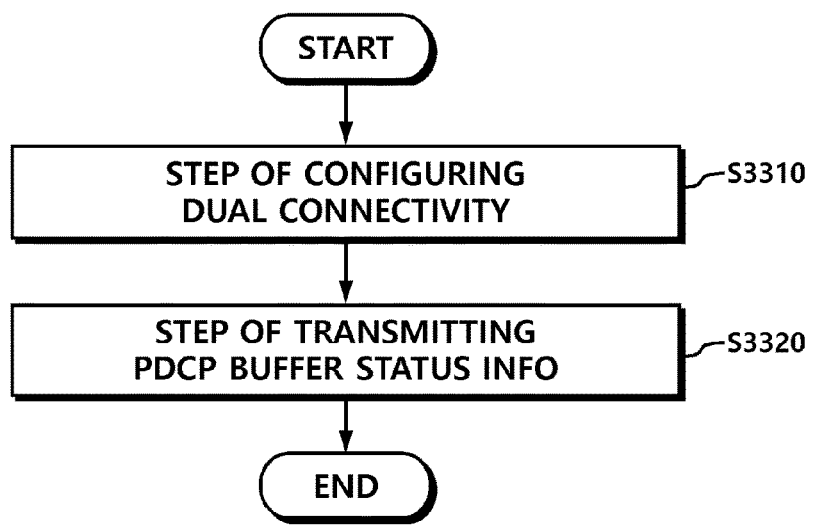
FIG. 33 is a flowchart illustrating an operation of a user equipment according to yet another embodiment of the present disclosure.

FIG. 33 is a flowchart illustrating an operation of a UE according to yet another embodiment of the present disclosure.

A method for transmitting buffer status information by the UE according to an embodiment of the present disclosure may include: configuring one or more logical channels or an LCG, which is mapped to a split RB, to have dual connectivity to the first BS and the second BS according to higher layer signaling; and transmitting, to the first BS or the second BS, an amount of data available for transmission in a PDCP layer of the one or more logical channels or the LCG.

Referring to FIG. 33, in step S3310, the UE may configure dual connectivity with the first BS and the second BS with respect to at least one logical channel or an LCG, which is mapped to a split RB, according to higher layer signaling. Specifically, as illustrated in FIG. 27 and FIG. 28, the UE may configure a bearer with at least one BS and may cause one or more bearers to be configured to be split over the first BS and the second BS.

In step S3320, the UE may transmit, to the first BS or the second BS, information on an amount of data available for transmission in a PDCP layer of the logical channel, which is mapped to the above-described bearer configured to be split, or the LCG including the corresponding logical channel.

In transmitting the information on the amount of data available for transmission in the PDCP layer, the UE may transmit the amount of data available for transmission in the PDCP layer with being included in an existing BSR according to the above-described embodiment of the present disclosure. When the amount of data available for transmission in the PDCP layer is transmitted with being included in the existing BSR, the amount of data available for transmission in the PDCP layer may be included only in a BSR transmitted to any one BS as in the third embodiment of the present disclosure.

Also, in configuring a logical channel or an LCG in a MAC entity, the UE may configure the logical channel or the LCG in the MAC entity so as to include a BSR timer for each BS or for each cell group, according to higher layer signaling.

As an example, the amount of data available for transmission in the PDCP layer may be transmitted by being included only in one of a BSR transmitted to the first BS and a BSR transmitted to the second BS, according to higher layer signaling.

As described above, the UE may transmit the amount of data available for transmission in the PDCP layer to the first BS or the second BS so as not to overlap, and the first BS and the second BS can efficiently allocate radio resources.

Figure 34:
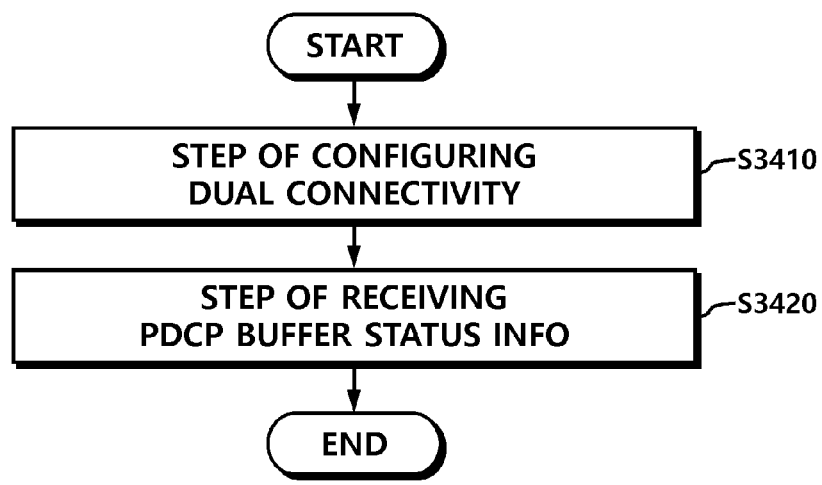
FIG. 34 is a flowchart illustrating an operation of a base station according to yet another embodiment of the present disclosure.

FIG. 34 is a flowchart illustrating an operation of a BS according to yet another embodiment of the present disclosure.

A method for receiving buffer status information by the first BS according to another embodiment of the present disclosure may include: configuring, by the first BS and the second BS, dual connectivity to the UE with respect to one or more logical channels or an LCG which is mapped to a split RB; and receiving amount of data available for transmission in a PDCP layer from the UE.

Referring to FIG. 34, in step S3410, the first BS may configure dual connectivity to the UE. Specifically, the first BS together with the second BS may configure dual connectivity to the UE with respect to one or more logical channels or an LCG which is mapped to a split RB. For example, as illustrated in FIG. 27 and FIG. 28, the first BS may split one or more bearers, and the first BS together with the second BS may configure dual connectivity to the UE.

In step S3420, the first BS may receive information on an amount of data available for transmission in a PDCP layer from the UE. The first BS allocates UL radio resources to the UE on the basis of the received BSR. In receiving the information on the amount of data available for transmission in the PDCP layer, the first BS may receive the exiting BSR including the information on the amount of data available for transmission in the PDCP layer according to the above-described embodiment of the present disclosure. When the amount of data available for transmission in the PDCP layer is received with being included in the existing BSR, the amount of data available for transmission in the PDCP layer may be not included in a BSR transmitted to the second BS but being included only in a BSR transmitted to the first BS, as in the third embodiment of the present disclosure.

As an example, information on the amount of data available for transmission in the PDCP layer may be received with being included only in the BSR received by the first BS, according to higher layer signaling. Specifically, information on the amount of data available for transmission in the PDCP layer may not be included in the BSR transmitted to the second BS.

The first BS may calculate radio resources to be allocated to the UE on the basis of the existing BSR by using the above-described methods. A specific calculation method may use the methods described in the above-described respective embodiments of the present disclosure.

The first BS may allocate the calculated radio resources to the UE, and the first BS may receive UL data from the UE.

The second BS may perform an operation similar to that of the first BS. In this regard, when the information on the amount of data available for transmission in the PDCP layer is included only in a BSR transmitted to the first BS, the second BS may receive a BSR, from which the amount of data available for transmission in the PDCP layer is excluded.

With reference to the accompanying drawings, a description will be made of a configuration of a UE and that of a BS, of which operations required by the respective embodiments of the present disclosure may be performed.

Figure 35:
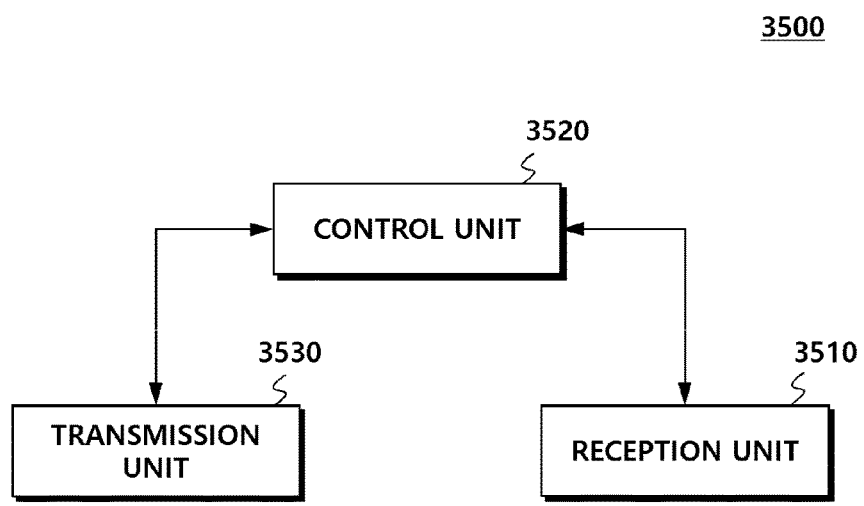
FIG. 35 is a view illustrating a configuration of the user equipment according to yet another embodiment of the present disclosure.

FIG. 35 is a view illustrating a configuration of the UE according to yet another embodiment of the present disclosure.

The UE for transmitting buffer status information, according to yet another embodiment of the present disclosure, may include: a control unit 3520 configured to configure one or more logical channels or an LCG, which is mapped to a split RB, so as to have dual connectivity to the first BS and the second BS; and a transmission unit 3530 configured to transmit, to the first BS or the second BS, information on an amount of data available for transmission in a PDCP layer of the one or more logical channels or the LCG which is mapped to the split RB.

Referring to FIG. 35, the UE 3500 according to yet another embodiment of the present disclosure may include a reception unit 3510, the control unit 3520, and the transmission unit 3530.

The reception unit 3510 receives DL control information, DL data, and a message from the BS through a corresponding channel. Specifically, the reception unit 3510 may receive DL information, such as UL radio resource allocation information.

The control unit 3520 controls the above-described operation of the UE which is required to configure dual connectivity with the first BS and the second BS required by the present disclosure. Also, the control unit 3520 may control an operation of the UE for distributing or dividing information on an amount of data available for transmission in a PDCP layer of a logical channel or an LCG configured in such a manner as to split a bearer, so as to be transmitted, according to the above-described respective embodiments of the present disclosure.

Also, the transmission unit 3530 transmits UL control information, UL data, and a message through a relevant channel.

Further, the UE may perform all operations required by the above-described respective embodiments of the present disclosure.

Figure 36:
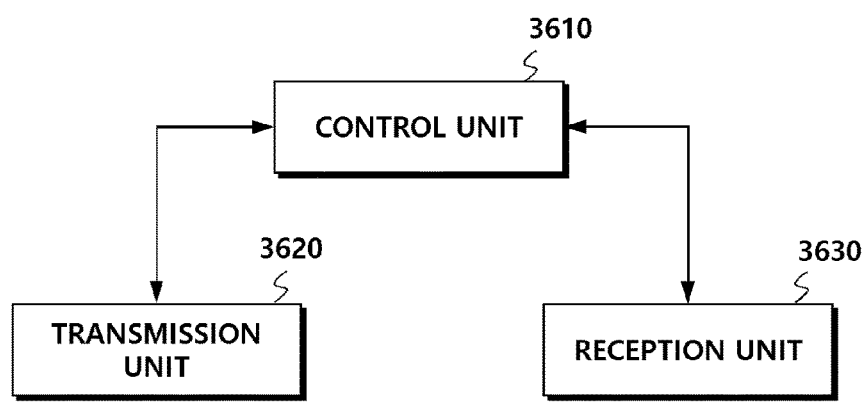
FIG. 36 is a view illustrating a configuration of the base station according to yet another embodiment of the present disclosure.

FIG. 36 is a view illustrating a configuration of the BS according to yet another embodiment of the present disclosure.

The first BS for receiving buffer status information, according to yet another embodiment of the present disclosure, may include: a control unit 3610 configured to configure dual connectivity with the second BS and the UE with respect to one or more logical channels or an LCG which is mapped to a split RB; and a reception unit 3630 configured to receive information on an amount of data available for transmission in a PDCP layer from the UE.

Referring to FIG. 36, the BS 3600 according to yet another embodiment of the present disclosure includes the control unit 3610, a transmission unit 3620, and the reception unit 3630.

The control unit 3610 together with the second BS may control an operation of the BS required to configure dual connectivity to the UE. Also, the control unit 3610 may allocate UL radio resources on the basis of a BSR received from the UE according to the respective embodiments of the present disclosure.

The transmission unit 3620 may transmit DL control information and a message to the UE.

The reception unit 3630 may receive, from the UE, information on an amount of data available for transmission in a PDCP layer. Specifically, the reception unit 3630 may receive the information on the amount of data available for transmission in the PDCP layer with being included in a BSR, according to the above-described embodiment of the present disclosure. In addition, the reception unit 3630 may receive a UL signal, a message, or data which is required by the present disclosure.

Further, the BS may perform all operations required by the above-described respective embodiments of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

The invention claimed is:

1. A method for transmitting buffer status information by a user equipment, the method comprising:
configuring one or more logical channels or a Logical Channel Group (LCG), which is mapped to a split radio bearer, to have dual connectivity to a first base station and a second base station based on higher layer signaling;
transmitting, by the user equipment, a first buffer status report (BSR) to the first base station; and transmitting, by the user equipment, a second BSR to the second base station, wherein only one of the first BSR and the second BSR includes Packet Data Convergence Protocol (PDCP) buffer status information, wherein the PDCP buffer status information includes information on an amount of data available for transmission in a PDCP layer of the one or more logical channels or the LCG;

wherein the only one of the first BSR and the second BSR for transmission of the PDCP buffer status information is determined based on the higher layer signaling; and wherein, the configuring comprises:

configuring the one or more logical channels or the LCG to include a BSR timer for each base station or for each cell group.

2. The method as claimed in claim 1, wherein:

the only one of the first BSR and the second BSR includes an available data amount calculated by adding up (i) the amount of data available for transmission in the PDCP layer and (ii) an amount of data available for transmission in a radio link control (RLC) layer for a corresponding base station receiving the only one of the first BSR and the second BSR; and the other of the first BSR and the second BSR includes an amount of data available for transmission in an RLC layer for a corresponding base station receiving the other of the first BSR and the second BSR.

3. The method as claimed in claim 1, wherein the PDCP buffer status information includes information on a total amount of data available for transmission in the PDCP layer of the one or more logical channels or the LCG mapped to the split radio bearer through the first base station and the second base station.

4. A method for receiving buffer status information by a base station, the method comprising:

configuring, by a first base station and a second base station, dual connectivity to a user equipment with respect to one or more logical channels or a Logical Channel Group (LCG), which is mapped to a split radio bearer, based on higher layer signaling;

receiving, by a first base station, a first buffer status report (BSR) from the user equipment; and receiving, by a second base station, a second BSR from the user equipment, wherein only one of the first BSR and the second BSR includes Packet Data Convergence Protocol (PDCP) buffer status information, wherein the PDCP buffer status information includes information on an amount of data available for transmission in a PDCP layer of the one or more logical channels or the LCG;

wherein the only one of the first BSR and the second BSR for transmission of the PDCP buffer status information is determined based on the higher layer signaling; and wherein the one or more logical channels or the LCG is configured to include a BSR timer for each base station or for each cell group.

5. The method as claimed in claim 4, wherein:

the only one of the first BSR and the second BSR includes an available data amount calculated by adding up (i) the amount of data available for transmission in the PDCP layer and (ii) an amount of data available for transmission in a radio link control (RLC) layer for a corresponding base station receiving the only one of the first BSR and the second BSR; and the other of the first BSR and the second BSR includes an amount of data available for transmission in an RLC layer for a corresponding base station receiving the other of the first BSR and the second BSR.

6. The method as claimed in claim 4, wherein the PDCP buffer status information includes information on a total amount of data available for transmission in the PDCP layer of the one or more logical channels or the LCG mapped to the split radio bearer through the first base station and the second base station.

7. A user equipment for transmitting buffer status information, the user equipment comprising:

a controller configured to configure one or more logical channels or a Logical Channel Group (LCG), which is mapped to a split radio bearer, to have dual connectivity to a first base station and a second base station based on higher layer signaling; and a transmitter configured to transmit a first buffer status report (BSR) to the first base station and to transmit a second BSR to the second base station, wherein only one of the first BSR and the second BSR includes Packet Data Convergence Protocol (PDCP) buffer status information, wherein the PDCP buffer status information includes information on an amount of data available for transmission in a PDCP layer of the one or more logical channels or the LCG;

wherein the only one of the first BSR and the second BSR for transmission of the PDCP buffer status information is determined based on the higher layer signaling; and wherein the controller configures the logical channel or the LCG to include a BSR timer for each base station or for each cell group according to the higher layer signaling.

8. The user equipment as claimed in claim 7, wherein:

the only one of the first BSR and the second BSR includes an available data amount calculated by adding up (i) the amount of data available for transmission in the PDCP layer and (ii) an amount of data available for transmission in a radio link control (RLC) layer for a corresponding base station receiving the only one of the first BSR and the second BSR; and the other of the first BSR and the second BSR includes an amount of data available for transmission in an RLC layer for a corresponding base station receiving the other of the first BSR and the second BSR.

9. The user equipment as claimed in claim 7, wherein the PDCP buffer status information includes information on a total amount of data available for transmission in the PDCP layer of the one or more logical channels or the LCG mapped to the split radio bearer through the first base station and the second base station.

* * * * *